(12) United States Patent
Uvarov et al.

(10) Patent No.: US 11,897,385 B2
(45) Date of Patent: *Feb. 13, 2024

(54) HEADLAMP ENCAPSULATED WITH CAMERA AND ARTIFICIAL INTELLIGENCE PROCESSOR TO ADJUST ILLUMINATION

(71) Applicant: Pony AI Inc., Grand Cayman (KY)

(72) Inventors: Timofey Uvarov, Los Gatos, CA (US); Kai Chen, San Jose, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,056

(22) Filed: Jan. 24, 2023

(65) Prior Publication Data
US 2023/0158942 A1    May 25, 2023

Related U.S. Application Data

(63) Continuation of application No. 16/998,303, filed on Aug. 20, 2020, now Pat. No. 11,560,083.

(51) Int. Cl.
| | |
|---|---|
| *B60Q 1/14* | (2006.01) |
| *B60Q 1/00* | (2006.01) |
| *H05B 47/125* | (2020.01) |
| *G06N 20/00* | (2019.01) |
| *G06N 5/04* | (2023.01) |
| *B60S 1/56* | (2006.01) |

(52) U.S. Cl.
CPC ........... *B60Q 1/143* (2013.01); *B60Q 1/0023* (2013.01); *G06N 5/04* (2013.01); *G06N 20/00* (2019.01); *H05B 47/125* (2020.01); *B60Q 2300/112* (2013.01); *B60Q 2300/116* (2013.01); *B60Q 2300/324* (2013.01); *B60Q 2300/45* (2013.01); *B60S 1/56* (2013.01)

(58) Field of Classification Search
CPC .................. B60Q 1/085; B60Q 1/1423; B60Q 2300/314; B60Q 2300/054; B60Q 2300/312; B60Q 2300/42; B60Q 2300/41
See application file for complete search history.

(56) References Cited

U.S. PATENT DOCUMENTS

| | | |
|---|---|---|
| 5,954,428 A | 9/1999 | Eichhorn et al. |
| 7,156,542 B2 | 1/2007 | Miller et al. |
| 9,562,662 B2 | 2/2017 | Lin et al. |
| 2021/0403015 A1* | 12/2021 | Kato ..................... B60W 50/06 |

* cited by examiner

*Primary Examiner* — Wei (Victor) Y Chan

(57) ABSTRACT

Provided herein is a headlamp assembly comprising a housing that encloses: a sensor that acquires data associated with a surrounding environment; a light source that illuminates a field of view comprising a portion of the surrounding environment; and one or more processors that analyze the acquired data and determine a direction, field of view, power, or an intensity of the illumination of the portion based on the analyzed data.

20 Claims, 49 Drawing Sheets

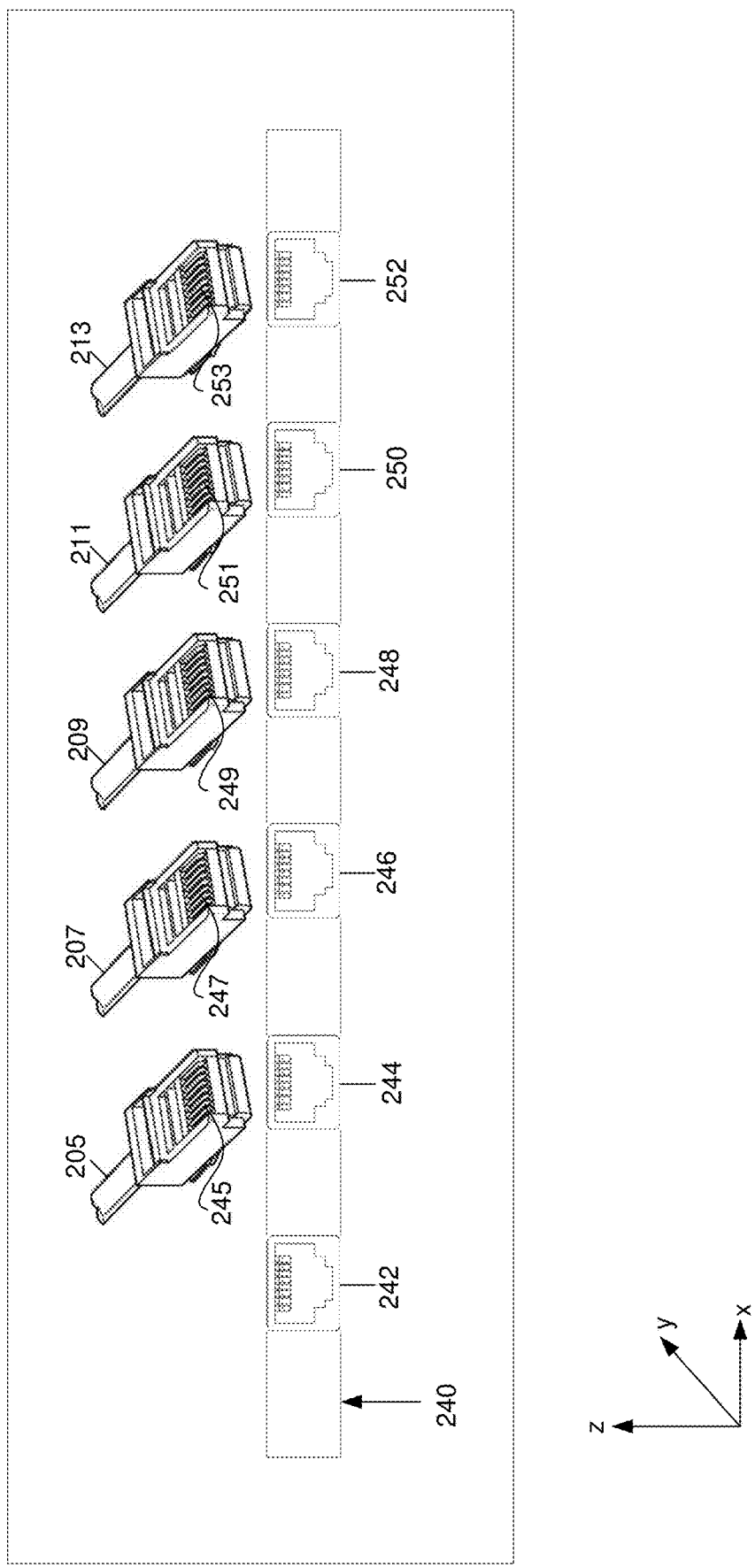

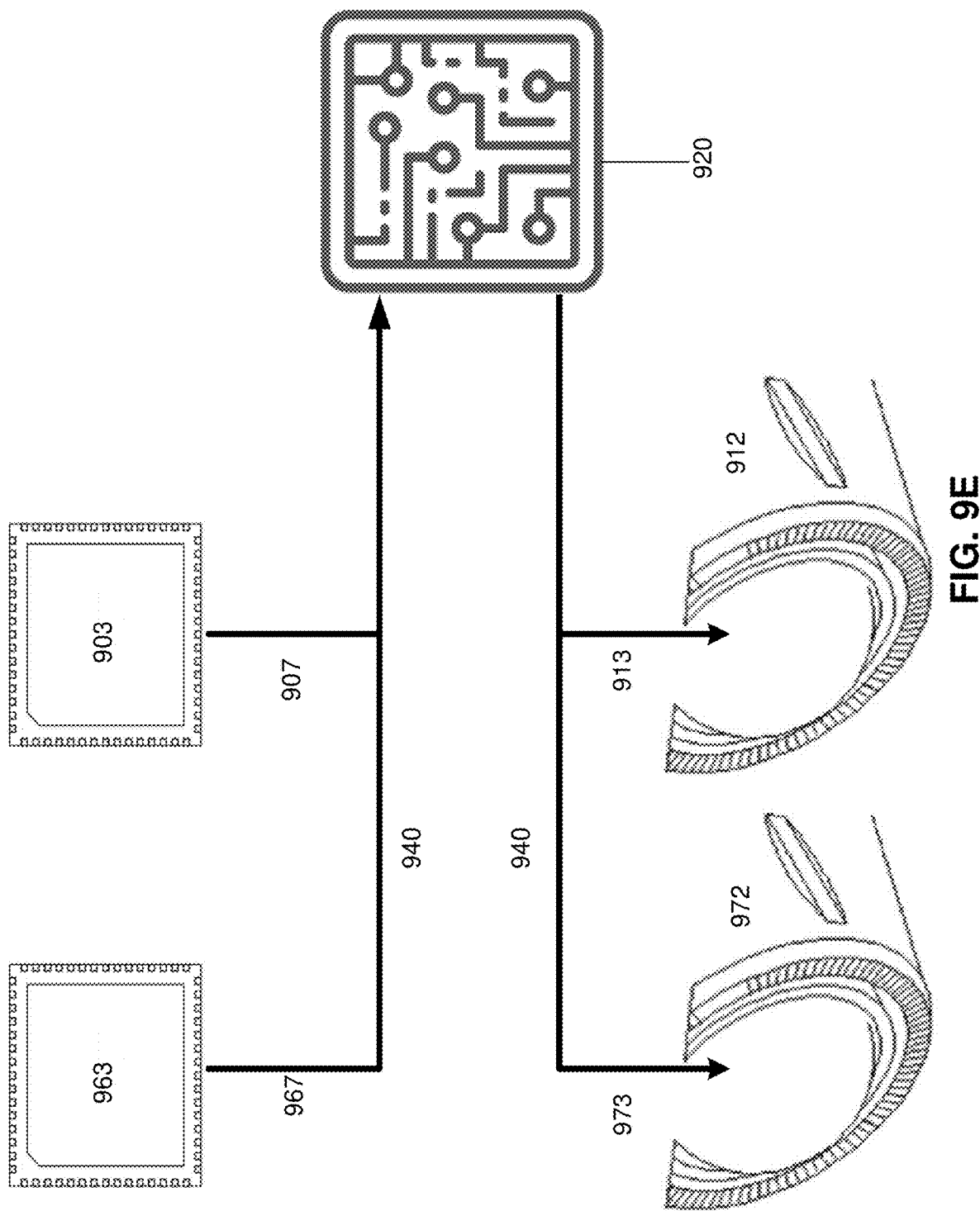

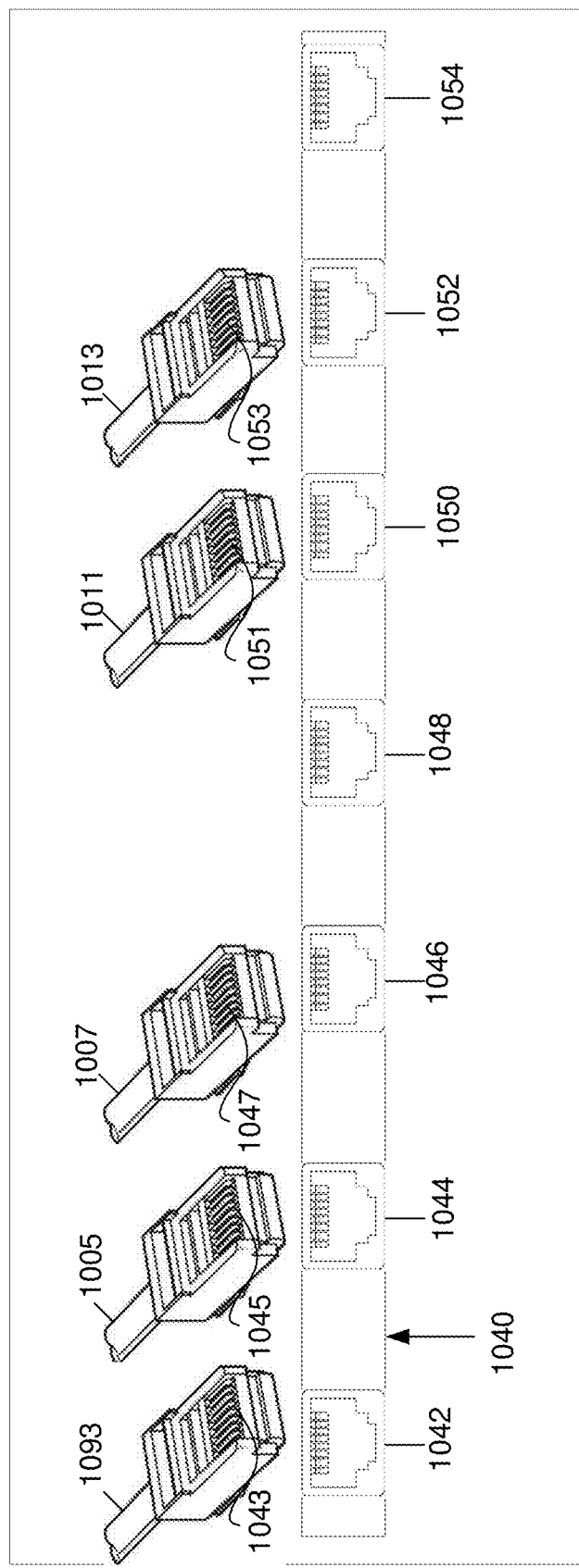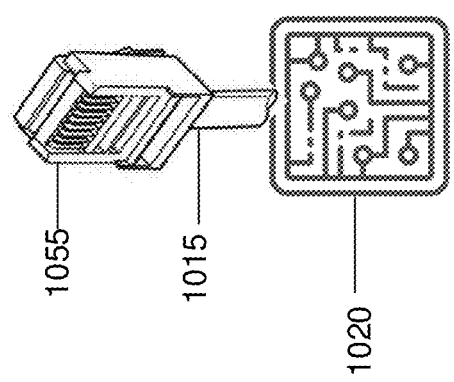
FIG. 10B

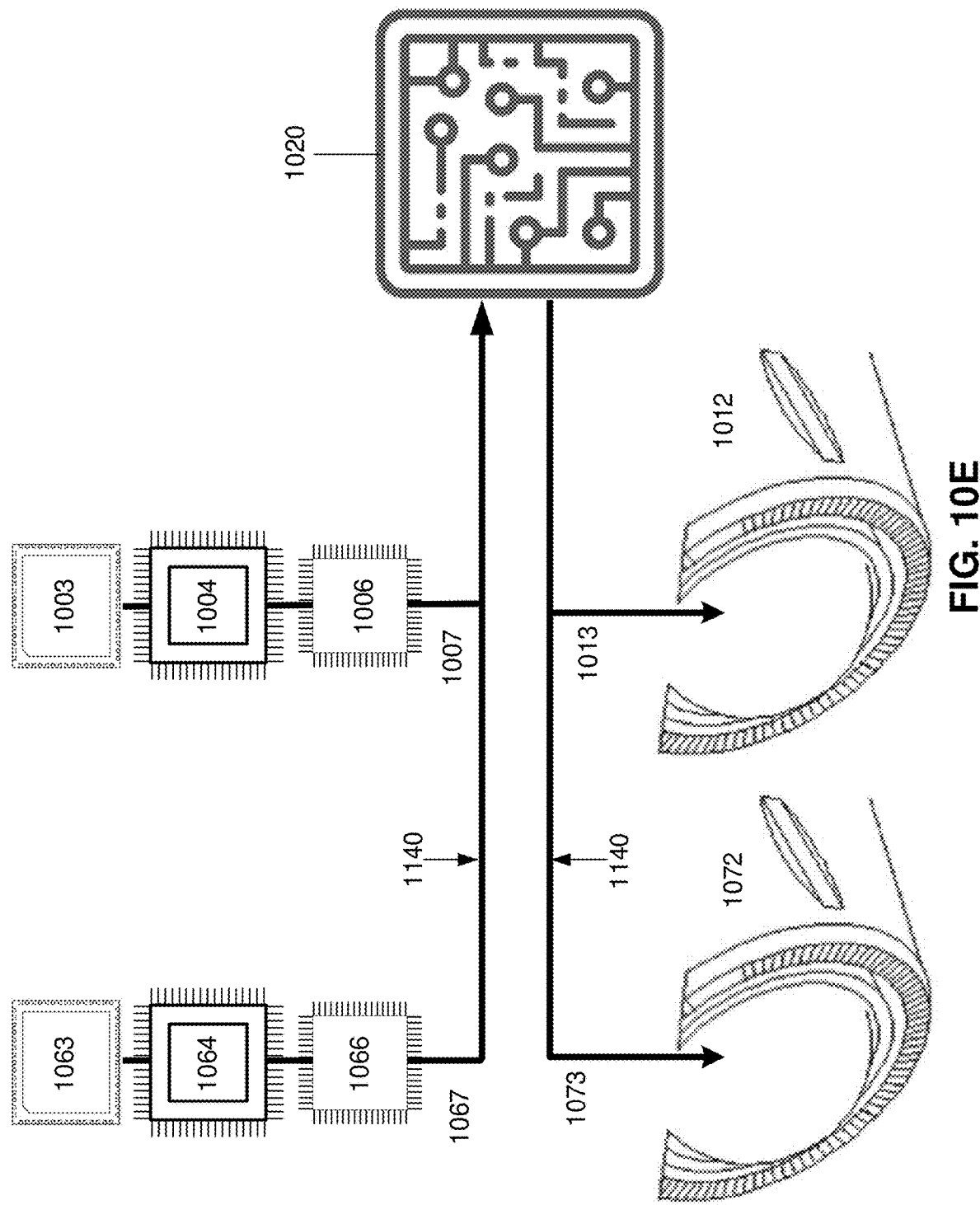

HEADLAMP ENCAPSULATED WITH CAMERA AND ARTIFICIAL INTELLIGENCE PROCESSOR TO ADJUST ILLUMINATION

CROSS REFERENCE TO RELATED APPLICATIONS

This application is a continuation of U.S. Ser. No. 16/998,303, filed Aug. 20, 2020, the content of which is incorporated by reference in its entirety into the present disclosure.

BACKGROUND

Headlamps on vehicles illuminate surroundings of a road so that drivers of the vehicles detect potential hazards and are aware of the surroundings. Types of headlights enclosed within the headlamps include halogen, xenon, high intensity discharge (HID), light emitting diode (LED), infrared, and laser. Settings of some headlights include high beam to provide extra light and illuminate a larger region, low beam or dipped lights that are directed forward and downwards to avoid excessive glare, daytime running lights which allow detection by other drivers on the road, and fog lights designed to penetrate through fog while avoiding reflection of light back to the driver. Headlamps in semi-autonomous or autonomous vehicles serve as the eyes of the vehicles.

SUMMARY

Described herein, in some embodiments, is a headlamp assembly comprising a housing that encloses: a sensor that acquires data associated with the surrounding environment; a light source that illuminates a portion of a surrounding environment; and one or more processors that analyze the acquired data and determine a direction, a field of view, an intensity, and/or a power of the illumination based on the analyzed data. In some embodiments, the one or more processors may determine a change in the direction, intensity, field of view, and/or the power of the illumination based on the analyzed data. In some embodiments, the power may indicate an on or off state of the illumination.

In some embodiments, the one or more processors may comprise: an artificial intelligence (AI) processor that analyzes the acquired data and determines the direction, the field of view, the intensity, or the power of the illumination based on the analyzed data; and a controller chip that controls the direction, the field of view, the intensity, and/or the power of the illumination. In some embodiments, the headlamp assembly may further comprise an image signal processor (ISP) that transforms the acquired data from the sensor before the AI processor analyzes the acquired data and a common bus that transmits data from the AI processor to the controller chip.

In some embodiments, the ISP may be integrated together with the AI processor on a chip. In other words, the ISP and the AI processor may be integrated or combined on a same chip.

In some embodiments, the headlamp assembly may further comprise: a second light source that illuminates a second portion of the surrounding environment. The headlamp assembly may further comprise one or more second processors that: analyze the acquired data, determine a second direction, a second field of view, a second intensity, and/or a second power of the illumination of the second portion based on the analyzed data, and control the second direction, the second field of view, the second intensity, and/or the second power based on the second determined direction, the second field of view, the second determined intensity, and/or the second power. In some embodiments, the one or more second processors may determine a change in the second direction, the second field of view, the second intensity, and/or the second power of the illumination of the second portion based on the analyzed data. The one or more processors may adjust the determined direction, the determined field of view, the determined intensity, and/or the determined power based on a weighted average of the determined direction and the second determined direction, a weighted average of the determined field of view and the second determined field of view, a weighted average of the determined intensity and the second determined intensity, and/or a weighted average of the determined power and the second determined power.

In some embodiments, the ISP may be integrated together with the sensor on a chip, for example, a second chip and the AI processor may be integrated together with the controller chip on a third chip.

In some embodiments, the one or more processors may comprise an artificial intelligence (AI) processor that analyzes the acquired data to determine a presence of one or more objects and determines an elevational change to be applied to the direction or the field of view of the illumination based on the determined presence of one or more other objects. In some embodiments, the one or more processors may additionally comprise a controller chip that changes the direction or the field of view based on the determined elevational change in the field of view.

In some embodiments, the one or more processors may comprise an artificial intelligence (AI) processor that obtains or determines a current or predicted slope of a road being driven by a vehicle on which the headlamp assembly is installed; and determines an elevational change to be applied to the direction or the field of view of the illumination based on the current or predicted slope of the road. The one or more processors may comprise a controller chip that changes the direction or the field of view based on the determined elevational change in the field of view.

In some embodiments, the AI processor may predict that the slope of the road comprises an upward slope and determines an upward change to be applied to the direction or the field of view in response to the predicted slope.

In some embodiments, the one or more processors may comprise: an artificial intelligence (AI) processor that obtains or determines a current or predicted International Roughness Index (IRI) of a road being driven by a vehicle on which the headlamp assembly is installed; and determines an elevational change to be applied to the direction or the field of view of the illumination based on the current or predicted IRI. The one or more processors may comprise a controller chip that changes the direction or the field of view based on the determined elevational change in the direction or the field of view.

In some embodiments, the one or more processors may determine that the predicted IRI is at least a threshold value and determine a downward change to be applied to the direction or the field of view in response to the predicted IRI.

In some embodiments, the one or more processors may comprise: an artificial intelligence (AI) processor that analyzes the acquired data to determine a presence of one or more objects and determines a lateral change to be applied to the direction or the field of view of the illumination based on the determined presence of the one or more objects. The one or more processors may comprise a controller chip that changes the direction or the field of view based on the determined lateral change in the direction or the field of view.

In some embodiments, the AI processor may determine or obtain a current direction or a planned direction of a vehicle on which the headlamp assembly is assembled, analyze the acquired data to determine a presence of an object moving in an opposite direction to the current direction or the planned direction and within a current field of view illuminated by the light source, and determine a lateral change to be applied to the current field of view such that the changed field of view no longer encompasses the object. In some embodiments, the controller chip may change the current field of view based on the determined lateral change in the field of view.

In some embodiments, the AI processor may determine or obtain a current direction or a planned direction of a vehicle on which the headlamp assembly is installed or assembled, analyze the acquired data to determine or predict a presence of an object outside a current field of view illuminated by the light source but within a threshold distance of the current direction or the planned direction and determine a lateral change to be applied to the current field of view to encompass the object, which may, for example, be predicted to be a pedestrian. In some embodiments, the controller chip may change the current field of view based on the determined lateral change in the current field of view.

In some embodiments, the AI processor may determine or obtain a current velocity or a predicted velocity of a vehicle on which the headlamp assembly is assembled, determines an operational state of the vehicle based on the current velocity or the predicted velocity, and determines a lateral change to be applied to the direction or the field of view based on the determined operational state. In some embodiments, the controller chip may change the direction or the field of view based on the determined lateral change in the direction or the field of view.

In some embodiments, the light source may comprise one or more beams. The one or more processors may comprise an artificial intelligence (AI) processor that analyzes the acquired data to determine a presence of an object and determines a change in a voltage to be applied to the one or more beams based on the determined presence of the object. The one or more processors may comprise a controller chip that controls the voltage applied to the one or more beams based on the determined change in the voltage.

In some embodiments, the AI processor may determine whether the object is moving towards the headlamp assembly; and in response to determining the object is moving towards the headlamp assembly, determine to decrease the voltage to be applied to the one or more beams.

In some embodiments, the one or more processors may comprise an artificial intelligence (AI) processor that determines a dust or particulate concentration of one or more components of the sensor by analyzing the acquired data. The one or more processors may comprise a controller chip that controls an operation of a cleaner based on the determined dust or the particulate concentration. The headlamp assembly may further comprise a cleaner configured to clean the one or more components of the sensor based on the dust or the particulate concentration.

In some embodiments, the one or more processors may further determine a duty cycle of the illumination based on the analyzed data.

Various embodiments of the present disclosure provide a method implemented by a system as described above.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2B illustrates an example diagram of a back view of the headlamp assembly in accordance with the embodiment shown in FIG. 2A.

FIG. 5A illustrates an example diagram of a front view of a headlamp assembly in accordance with an embodiment.

FIGS. 5B-5C illustrate a process of synchronization between left and right headlamps.

FIG. 6A illustrates an example diagram of a front view of a headlamp assembly in accordance with an embodiment.

FIG. 6B illustrates a process of synchronization between left and right headlamps.

FIG. 7 illustrates an example diagram of a front view of a headlamp assembly in accordance with an embodiment.

FIG. 8 illustrates an example diagram of a front view of a headlamp assembly in accordance with an embodiment.

FIGS. 9A-9E, and 10A-10E illustrate how a vehicular computer system such as an electronic control unit (ECU) within the vehicle, external to a headlamp assembly, may control operations and/or parameters associated with a light source.

FIG. 9A illustrates an example diagram of a front view of a headlamp assembly which feeds input to and may be controlled by a vehicular computer system such as an electronic control unit (ECU) within the vehicle in accordance with an embodiment.

FIG. 9B illustrates an example diagram of a back view of the headlamp assembly in accordance with the embodiment shown in FIG. 9A.

FIG. 9C illustrates a connection between a sensor and the vehicular computer system.

FIG. 9D illustrates an example diagram of a front view of a headlamp assembly which feeds input to and may be controlled by a vehicular computer system such as an electronic control unit (ECU) within the vehicle in accordance with an embodiment. For example, the headlamp assembly of FIG. 9D may be complementary to that of FIG. 9A.

FIG. 9E illustrates an example diagram of a communication mechanism between two headlamp assemblies, such as a left headlamp and a right headlamp, in accordance with the embodiment of FIG. 9A and FIG. 9D.

FIG. 10A illustrates an example diagram of a front view of a headlamp assembly which feeds input to and may be controlled by a vehicular computer system such as an electronic control unit (ECU) within the vehicle in accordance with an embodiment.

FIG. 10B illustrates an example diagram of a back view of the headlamp assembly in accordance with the embodiment shown in FIG. 10A.

FIG. 10C illustrates a connection between an AI processor and the vehicular computer system.

FIG. 10D illustrates an example diagram of a front view of a headlamp assembly which feeds input to and may be controlled by a vehicular computer system such as an electronic control unit (ECU) within the vehicle in accordance with an embodiment. For example, the headlamp assembly of FIG. 10D may be complementary to that of FIG. 10A.

FIG. 10E illustrates an example diagram of a communication mechanism between two headlamp assemblies, such as a left headlamp and a right headlamp, in accordance with the embodiment of FIG. 10A and FIG. 10D.

DETAILED DESCRIPTION

The current technology provides a headlamp assembly in which an intensity, power, direction, field of view, pattern, and/or duty cycle of illumination provided by a light source enclosed with the headlamp is effectively adjusted based on detected surrounding conditions. In some examples, such adjustments may increase an intensity of illumination at an upcoming turn or curve, change an angle or direction of the illumination on a sloping or bumpy road, or when another object such as a vehicle or pedestrian is detected. Other adjustments may account for weather and/or environment conditions such as decreased visibility caused by fog.

The current technology, in one embodiment, enhances the functionality of a headlamp by enclosing or encapsulating, within a housing of the headlamp, a sensor such as a camera, an artificial intelligence (AI) processor that predicts or determines objects and/or conditions on a road being driven, and outputs a change to be made to an intensity and/or a field of view illuminated by a headlight beam, and a controller chip that controls the intensity and/or the field of view of the headlight beam. The headlight beam may be a visible light or infrared light source. The headlight beam may be controlled by the controller chip and/or a computer such as an electronic control unit (ECU) within a vehicle or an edge computer. Thus, the headlamp may operate within a vehicle or independently from the vehicle. Additionally, the sensor may be protected from external elements because it is enclosed or encapsulated within an interior of the headlamp.

Figure 1A:
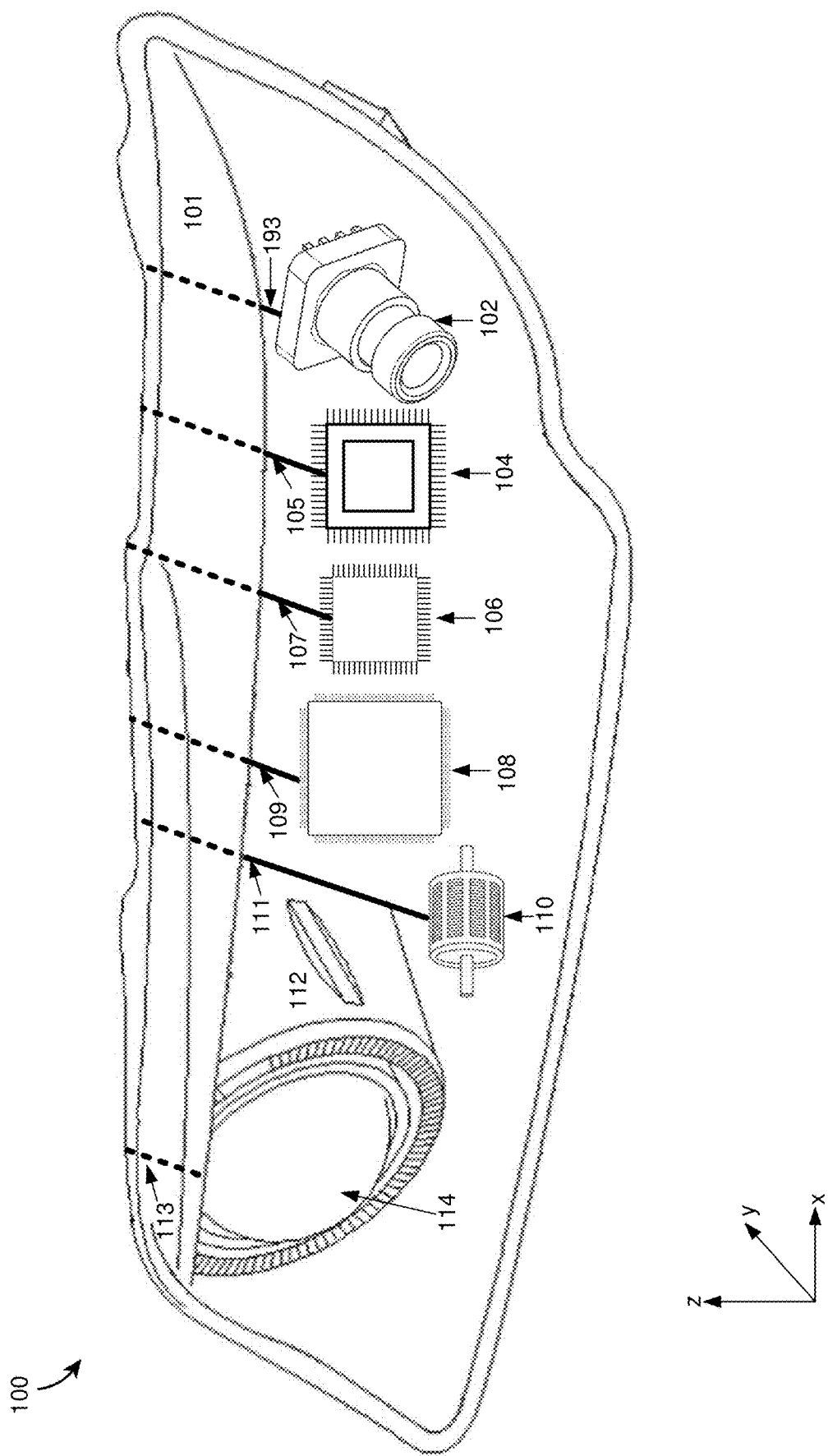
FIG. 1A illustrates an example diagram of a front view of a headlamp assembly in accordance with an embodiment.

FIG. 1A illustrates an example diagram of a front view of a headlamp assembly 100 in accordance with an embodiment. The headlamp assembly 100 may include a hermetic housing or enclosure 101 and components in an interior of the enclosure 101. The components may include a sensor 102 such as a camera sensor or a video camera sensor, which may include, for example, a complementary metal oxide semiconductor (CMOS) sensor or a charged coupled device (CCD) 103, as will be shown in FIG. 1C. The headlamp assembly 100 may also include an image signal processor (ISP) 104, an artificial intelligence (AI) processor 106, a controller 108, a motor 110, a headlight or light source 112, and a projector 114. The sensor 102 may capture data of a surrounding region, for example, in front of and to the sides of a surrounding region. A capture rate and/or resolution of the sensor 102 may be preset or may be adjusted by the controller 108 depending or based on conditions of the surrounding region. In some examples, if a density of objects such as vehicles and/or pedestrians, and/or if an environmental or weather condition compromises visibility, the AI processor 106 may determine or predict that the capture rate and/or resolution of the sensor 102 should be increased, and the controller 108 may accordingly increase the capture rate and/or resolution of the sensor 102. The data captured by the sensor 102 may be transmitted to and processed by the ISP 104. Functions of the ISP 104 may include demosaicing, noise reduction, auto exposure, auto focus, auto white balance, and stabilizing the data, for example, by suppressing vibrations detected by gyro sensors. The ISP 104 may be disposed on a separate chip or PCB board from other components of the sensor 102, such as the CMOS sensor or the CCD sensor 103. The processed data from the ISP 104 may be transmitted to the AI processor 106. The AI processor 106 may include a chip. The AI processor 106 may include a digital signal processor (DSP). In some embodiments, as will be shown in FIG. 1C, the ISP 104 and the AI processor 106 may both be integrated together on a common chip. Functions of the AI processor 106 may include predicting types of objects such as vehicles, pedestrians, traffic signs or signals, actions of the objects, and other conditions of the surroundings such as lighting or weather conditions from the processed data. The AI processor 106 may locate, identify, count, and track objects. Some examples of functions of the AI processor 106 may include, predicting a path to be travelled and characteristics or parameters of the path such as a curvature, slope, and/or terrain based on the image or video data, and/or based on a planned navigation route, predicting a degree of visibility ahead, and predicting relative importances of different regions. Furthermore, the AI processor 106 may predict an intensity, power, field of view, direction, pattern, and/or duty cycle of illumination, and/or other parameters of light to be emitted or provided by the light source 112, and/or a change in the aforementioned parameters of the light source 112, based on one or more predictions. The AI processor 106 may be trained using exemplary image data inputs and outputs that indicate a type or categorization of objects in the image data. Moreover, the AI processor 106 may be trained using the exemplary image data inputs and outputs that indicate particular weather and/or environmental conditions such as fog, precipitation, and smog, along with other situations such as a fire, detour, or road closure. For example, the AI processor 106 may be trained to identify that a yellow ribbon on a side of a road indicates a road closure, and that illumination may be decreased or diverted away from a closed section of a road. Additionally, the AI processor 106 may be trained using particular types or categorizations of objects, and/or particular weather or environmental conditions or other situations, as inputs, and outputs that indicate an intensity, field of view, pattern, and/or duty cycle of illumination to be emitted or provided by the light source 112. For example, if the AI processor 106 predicts that a visibility ahead is limited, the AI processor 106 may predict a decrease in the intensity of the illumination to be applied, so that the illumination does not illuminate regions beyond the predicted visibility.

The AI processor 106 may transmit, from a cable 107 such as an ethernet, Flat Panel Display Link (FPD-Link) or Gigabit Multimedia Serial Link (GMSL) cable, its predictions, to the controller 108. The cable 107 may link with and/or connect to a common bus 140 or a parallel bus, as will be shown in FIG. 1B. The controller 108 may include one or more processors on a chip. The controller 108 may include scalar and/or vector units, very long instruction word (VLIW), and single instruction, multiple data (SIMD) functions. The controller 208 may adjust a power consumption based on a size or scale of the required job. The controller 108 may control and/or change the intensity, power, direction, field of view, pattern, and/or duty cycle of illumination to be provided by the light source 112 based on the predictions from the AI processor 106, and/or a scheduled navigation path. The controller 108 may further take into account data, such as a steering wheel angle, rotations of wheels, angular position, acceleration, or speed, from high definition (HD) maps, accelerometers, speedometers, telemetry, gyroscope sensors, steering angle sensors, yaw rate sensors, wheel encoders, GPS, and windscreen or windshield sensors.

The controller 108 may control the motor 110 to move the light source 112 laterally along the x-y plane, elevationally along the z-axis, and/or rotationally. The motor 110 may comprise a piezo motor or a stepper motor. Alternatively or additionally, the controller 108 may control an amount, pattern, field of view, intensity, power, or profile of at least a portion of light emitted from the light source 112, and/or an amount, pattern, field of view, intensity, power, or profile of at least a portion of light passing through the projector 114. For example, the controller 108 may divert or redirect, and/or filter out at least a portion of the light emitted by the light source 112. In addition to or instead of the projector 114, the headlamp assembly 100 may include a reflector. In some examples, the controller 108 may diffract at least a portion of the light emitted by the light source 112, through a reflector or lens. In some examples, the controller 108 may adjust a focal length of the light source 112 by moving the light source 112 along a normal axis of the reflector or lens. In some embodiments, the light source 112 may include halogen, xenon, high intensity discharge (HID), light emitting diode (LED), and/or laser. The light source may be an infrared or visible light source. In some embodiments, the light source 112 may include multiple beams, such as an arrangement having one main beam and multiple supplementary or auxiliary beams. The controller 108 may control an intensity, field of view, intensity, power, direction, and/or duty cycle of each of the beams individually or control numerous beams collectively. The projector 114 may, in some examples, be a digital light processing (DLP) or other projector.

Figure 1B:
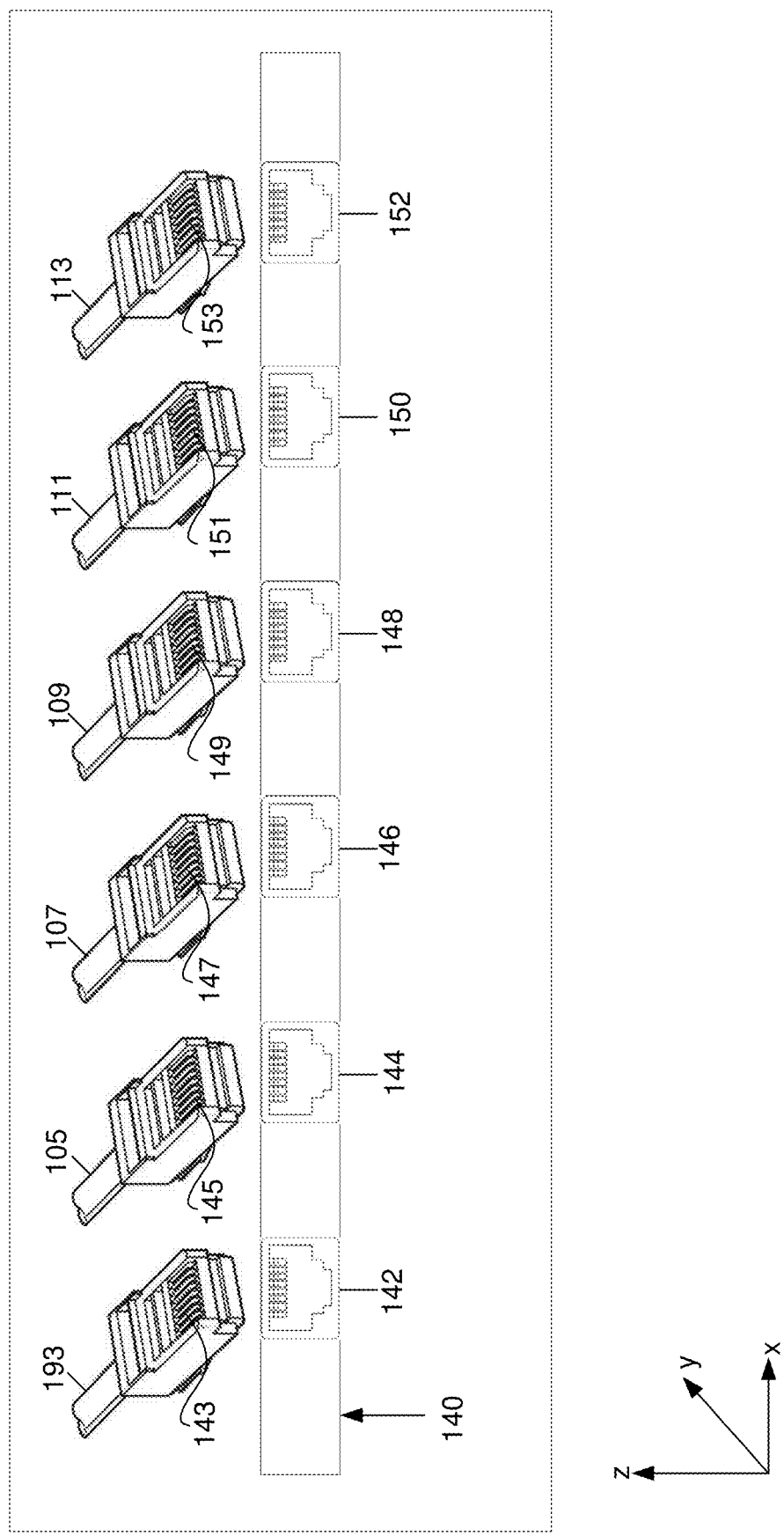
FIG. 1B illustrates an example diagram of a back view of the headlamp assembly in accordance with the embodiment shown in FIG. 1A.

In some embodiments, at least some of the components may be linked or connected, or otherwise communicate with one another, via the common bus 140, as shown in FIGS. 1A and 1B. Cables 193, 105, 107, 109, 111, and 113 may connect the sensor 102, the ISP 104, the AI processor 106, the controller 108, the motor 110, and the headlight or light source 112, respectively, to the common bus 140. The cables 193, 105, 107, 109, 111, and 113 may comprise ethernet, Flat Panel Display Link (FPD-Link) or Gigabit Multimedia Serial Link (GMSL) cables.

FIG. 1B illustrates an example diagram of a back view of the headlamp assembly 100 in accordance with the embodiment shown in FIG. 1A. The bus 140, such as a common bus, may enable the cables 193, 105, 107, 109, 111, and/or 113 to be connected to the bus 140 on a back surface of the headlamp assembly 100. The bus 140 may comprise ports 142, 144, 146, 148, 150, and/or 152 to which respective sockets or connectors 143, 145, 147, 149, 151, and/or 153 of the cables 193, 105, 107, 109, 111, and/or 113 may be connected. Other variations may also be possible. For example, the cables 193, 105, 107, 109, 111, and/or 113 may be connected and/or otherwise facilitate communication and/or data transmission among the components of the headlamp assembly 100 without physical connection to ports, sockets or connectors or by physical connection in other manners.

Figure 1C:
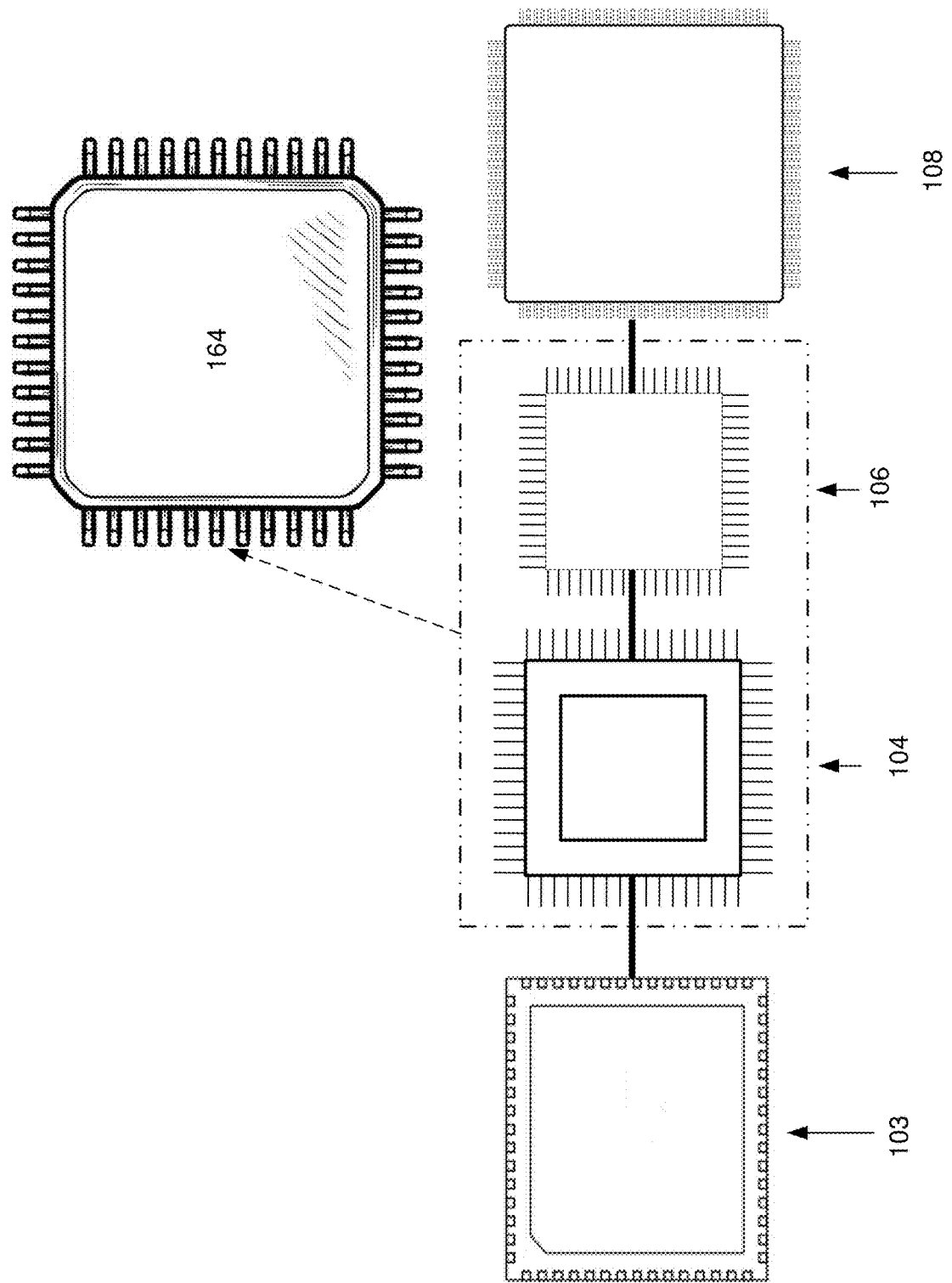
FIG. 1C illustrates a diagram of an organization of components of the headlamp assembly, in accordance with the embodiment shown in FIG. 1A.

FIG. 1C illustrates a diagram of an organization of components of the headlamp assembly 100, in accordance with the embodiment shown in FIG. 1A. In FIG. 1C, the CMOS sensor or the CCD sensor 103 may be connected to or in communication with the ISP 104 and the AI processor 106. The ISP 104 and the AI processor 106 may be deployed or placed on a common chip or board, for example, chip 164. This common chip 164 may communicate with the controller 108 via the bus 140.

Figure 2A:
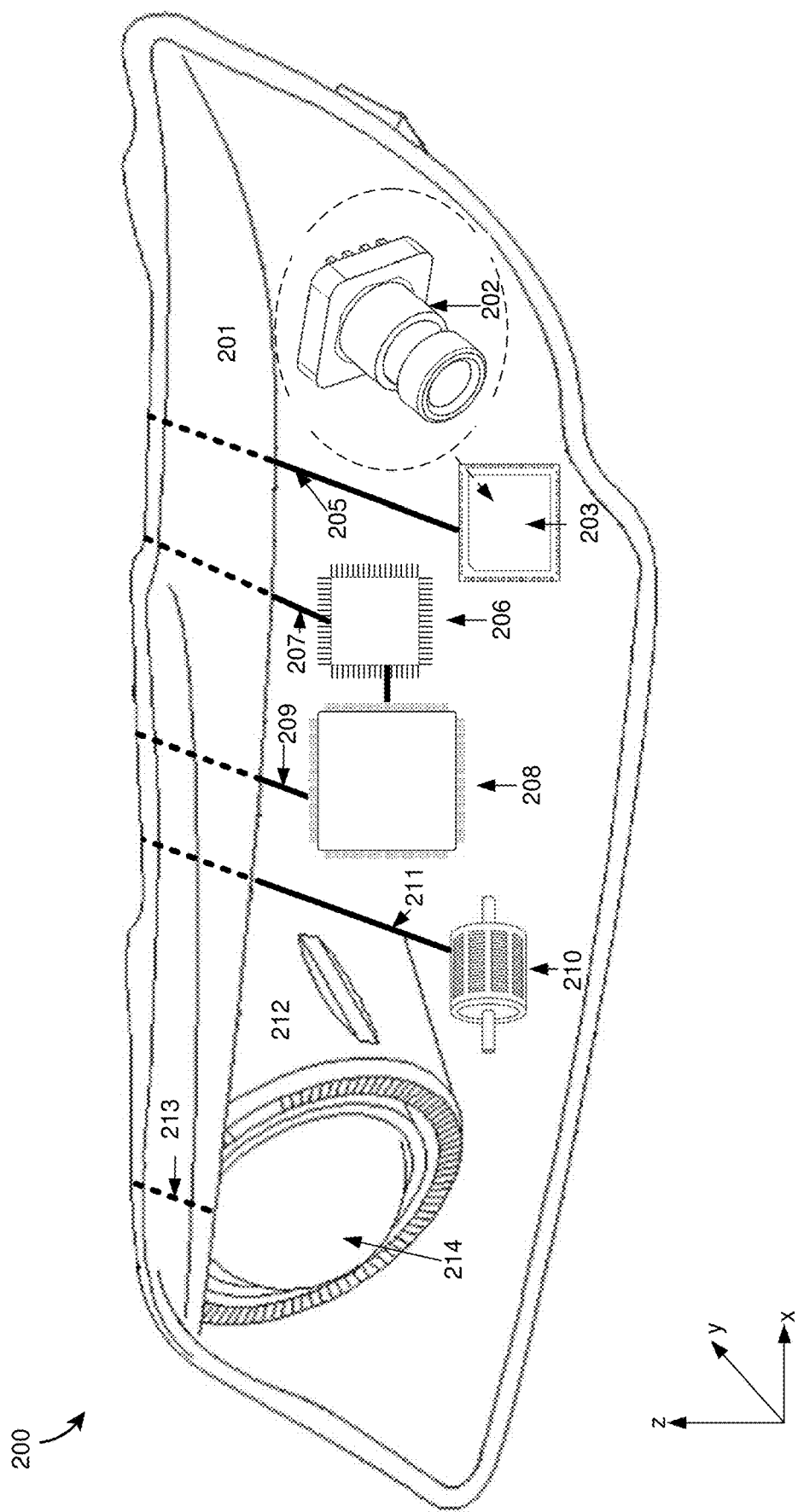
FIG. 2A illustrates an example diagram of a front view of a headlamp assembly in accordance with an embodiment.

FIG. 2A illustrates an example diagram of a front view of a headlamp assembly 100 in accordance with an embodiment. The headlamp assembly 200 may include a hermetic housing or enclosure 201 and components in an interior of the enclosure 201. The components may include a sensor 202 such as a camera sensor or a video camera sensor, which may include, for example, a CMOS sensor or a CCD sensor 203. The headlamp assembly 200 may also include an image signal processor (ISP) 204, an artificial intelligence (AI) processor 206, a controller 208, a motor 210, a headlight or light source 212, and a projector 214. In addition to or instead of the projector 214, the headlamp assembly 200 may include a reflector. The components of the headlamp assembly 200 may be implemented in a similar or same manner as the corresponding components of the headlamp assembly 100 of FIG. 1A. For example, the sensor 202, the CMOS or CCD sensor 203, the AI processor 206, the controller 208, the motor 210, the headlight or light source 212, and the projector 214 may be implemented as the sensor 102, the CMOS or CCD sensor 103, the AI processor 106, the controller 108, the motor 110, the headlight or light source 112, and the projector 114 of FIG. 1A, respectively, other than some of the aforementioned components being organized or connected differently in FIG. 2A compared to FIG. 1A. The controller 208 may include a digital signal processor (DSP). The controller 208 may include scalar and/or vector units, very long instruction word (VLIW), and single instruction, multiple data (SIMD) functions. The controller 208 may adjust a power consumption based on a size or scale of the required job. The controller 208 may be integrated, placed, or deployed together with the AI processor 206 on a common chip, as will be shown in FIG. 2C.

In some embodiments, at least some of the components may be linked or connected, or otherwise communicate with one another, via a common bus 240, as shown in FIGS. 2A and 2B. Cables 205, 207, 209, 211, and 213 may connect the CMOS or CCD sensor 203, the AI processor 206, the controller 208, the motor 210, and the headlight or light source 212, respectively, to the common bus 240. The cables 205, 207, 209, 211, and 213 may comprise ethernet, Flat Panel Display Link (FPD-Link) or Gigabit Multimedia Serial Link (GMSL) cables.

FIG. 2B illustrates an example diagram of a back view of the headlamp assembly 200 in accordance with the embodiment shown in FIG. 2A. The bus 240, such as a common bus, may enable the cables 205, 207, 209, 211, and/or 213 to be connected to the bus 240 on a back surface of the headlamp assembly 200. The bus 240 may comprise ports 242, 244, 246, 248, 250, and/or 252 to which respective sockets or connectors including 245, 247, 249, 251, and/or 253 of the cables 205, 207, 209, 211, and/or 213 may be connected. Other variations may also be possible. For example, the cables 205, 207, 209, 211, and/or 213 may be connected and/or otherwise facilitate communication and/or data transmission among the components of the headlamp assembly 200 without physical connection to ports, sockets or connectors or by physical connection in other manners.

Figure 2C:
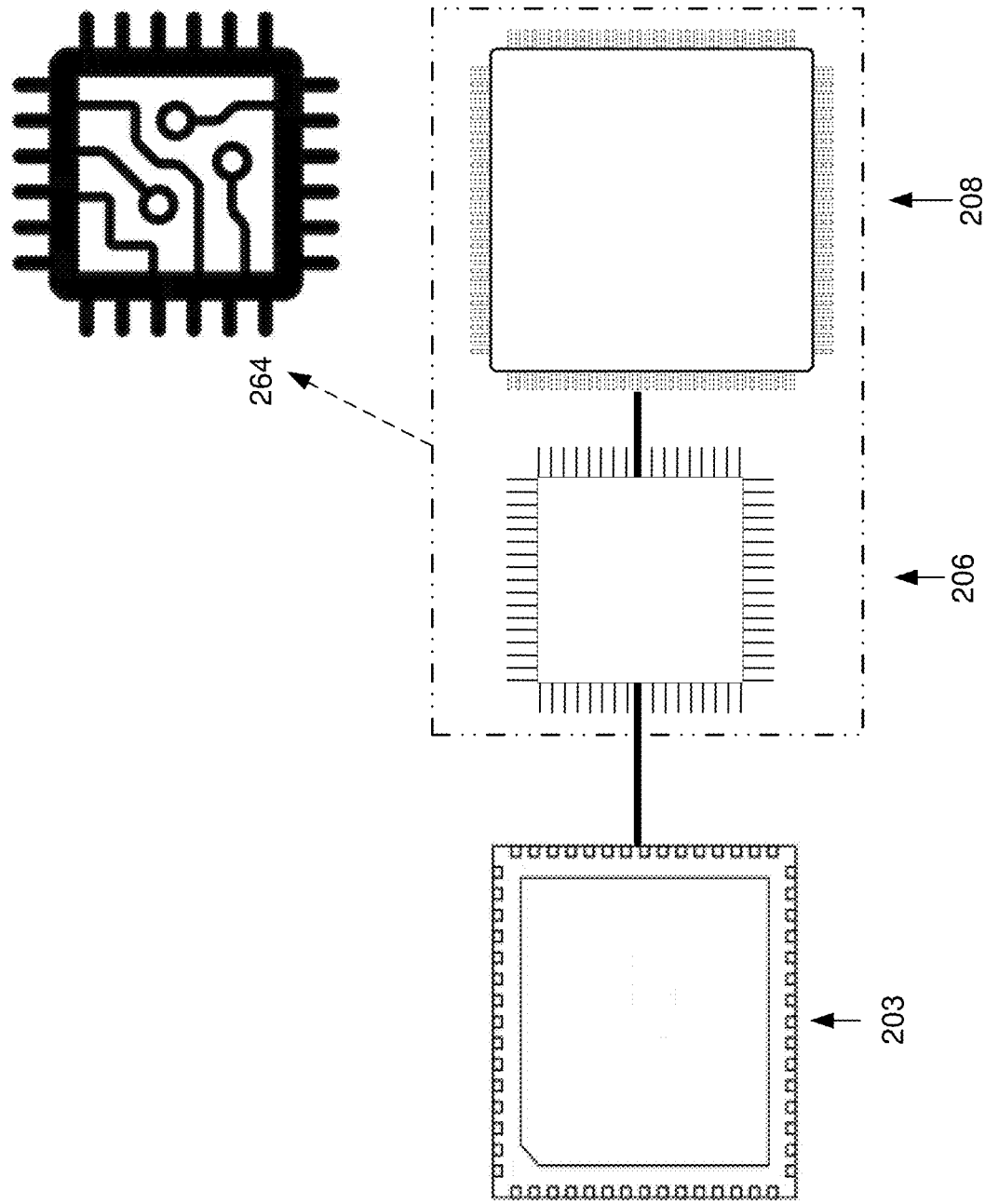
FIG. 2C illustrates a diagram of an organization of components of the headlamp assembly 200, in accordance with the embodiment shown in FIG. 2A.

FIG. 2C illustrates a diagram of an organization of components of the headlamp assembly 200, in accordance with the embodiment shown in FIG. 2A. In FIG. 2C, the CMOS or CCD sensor 203 may be connected to or in communication with the AI processor 206 and the controller 208. The AI processor 206 and the controller 208 may be deployed or placed on a common chip or board, for example, chip 264. This common chip 264 may communicate with the CMOS or CCD sensor 203 via the bus 240.

Figure 3:
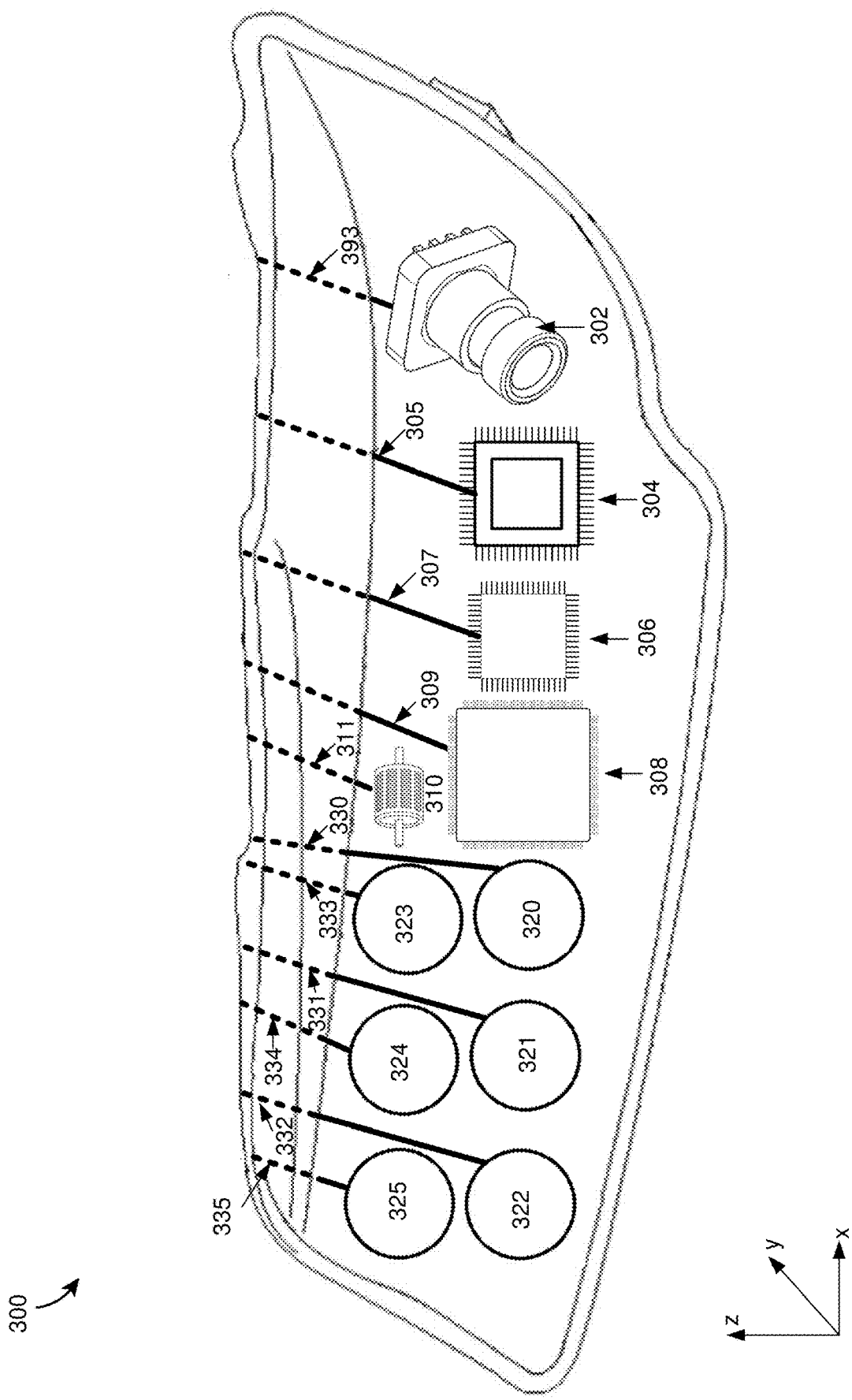
FIG. 3 illustrates an example diagram of a front view of a headlamp assembly in accordance with an embodiment.

FIG. 3 illustrates an example diagram of a front view of a headlamp assembly 300 in accordance with an embodiment. The headlamp assembly 300 may include a hermetic housing or enclosure 301 and components in an interior of the enclosure 301. The components may include a sensor 302 such as a camera sensor or a video camera sensor, which may include, for example, a CMOS sensor or a CCD sensor. The headlamp assembly 300 may also include an image signal processor (ISP) 304, an artificial intelligence (AI) processor 306, a controller 308, a motor 310, and one or more light sources including beams 320, 321, 322, 323, 324, and 325. Each of the beams 320, 321, 322, 323, 324, and 325 may permeate through a projector or a reflector. The components of the headlamp assembly 300 may be implemented in a similar or same manner as the corresponding components of the headlamp assembly 100 of FIG. 1A. For example, the sensor 302, the ISP 304, the AI processor 306, the controller 308, and the motor 310, may be implemented as the sensor 102, the ISP 104, the AI processor 106, the controller 108, and the motor 110 of FIG. 1A, respectively.

In some embodiments, the ISP 304 and the AI processor 306 may be integrated together, deployed, or placed onto or into a common chip, similar or conceptually same as that as shown in FIG. 1C. The controller 308 may control and/or change the intensity, power, field of view, direction, pattern, and/or duty cycle of illumination to be emitted or provided by each of the beams 320 to 325 based on the predictions from the AI processor 306, and/or a scheduled navigation path. In some embodiments, the control of each of the beams 320 to 325 may be independent of the other beams. By controlling individual beams, the controller 308 may selectively illuminate certain regions with increased intensity such as those corresponding to pedestrians, while decreasing an intensity of other regions such as those corresponding to moving vehicles on an opposite side of a road. The controller 308 may control the motor 310 to move one of the beams 320 to 325, such as the beam 320, laterally along the x-y plane, elevationally along the z-axis, and/or rotationally. The controller 308 may, in some examples, control an amount, direction, field of view, power, intensity, pattern, or profile of at least a portion of light emitted by at least one of the beams 320 to 325. For example, the controller 108 may divert or redirect, and/or filter out at least a portion of the light emitted by at least one of the beams 320 to 325. In some embodiments, the beams 320 to 325 may include halogen, xenon, high intensity discharge (HID), light emitting diode (LED), and/or laser. The beams 320 to 325 may be infrared or visible light.

In some embodiments, at least some of the components may be linked or connected, or otherwise communicate with one another, via a common bus or parallel bus, similar or conceptually same as that shown in previous FIGS. 1B and 2B. Cables 393, 305, 307, 309, 311, 330, 331, 332, 333, 334, and 335 may connect the sensor 302, the ISP 304, the AI processor 306, the controller 308, the motor 310, and the one or more light sources including beams 320, 321, 322, 323, 324, and 325 to a common bus. The cables 303, 305, 307, 309, 311, 330, 331, 332, 333, 334, and 335 may comprise ethernet, Flat Panel Display Link (FPD-Link) or Gigabit Multimedia Serial Link (GMSL) cables.

Figure 4:
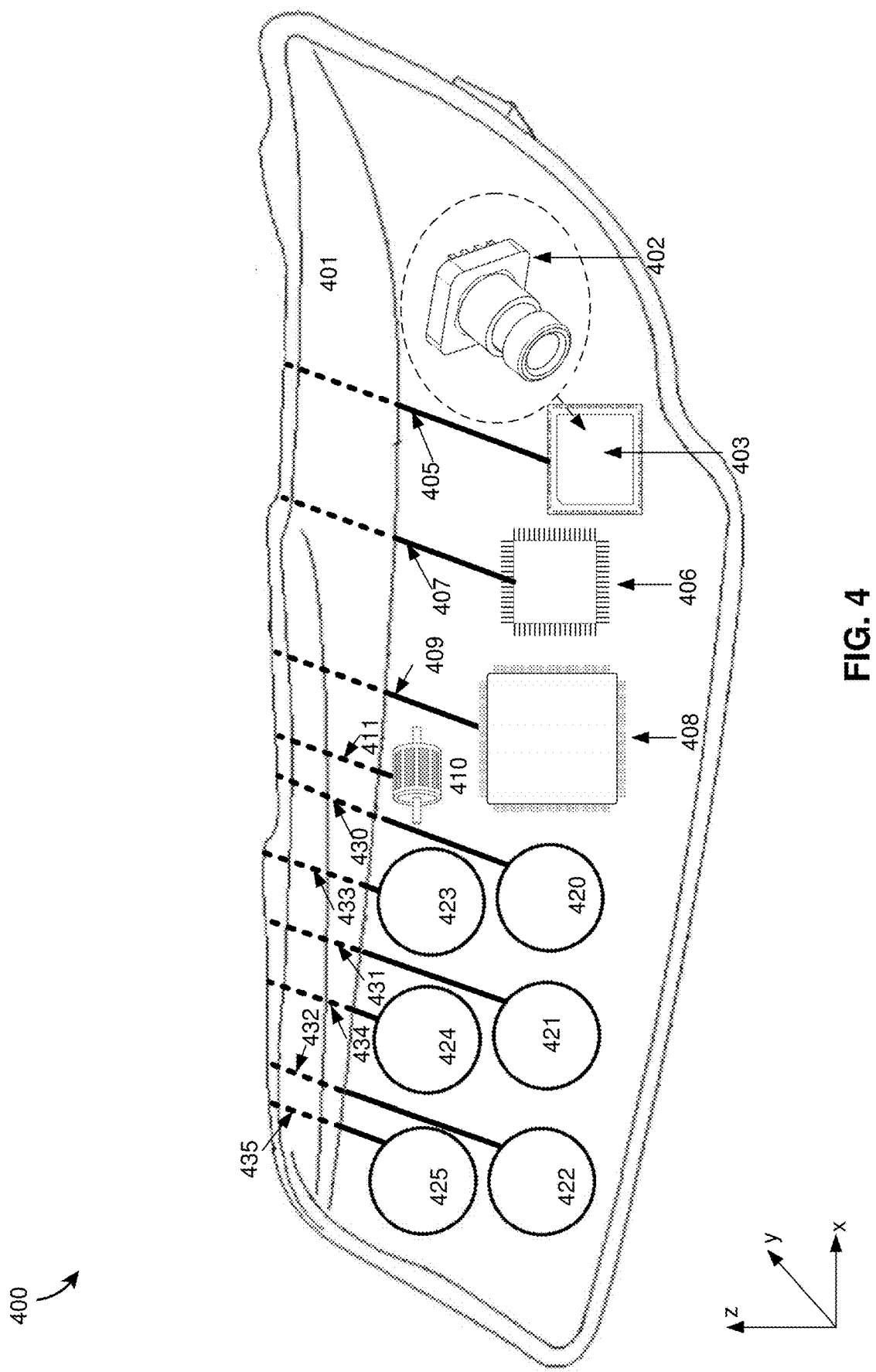
FIG. 4 illustrates an example diagram of a front view of a headlamp assembly in accordance with an embodiment.

FIG. 4 illustrates an example diagram of a front view of a headlamp assembly 400 in accordance with an embodiment. The headlamp assembly 400 may include a hermetic housing or enclosure 401 and components in an interior of the enclosure 401. The components may include a sensor 402 such as a camera sensor or a video camera sensor, which may include, for example, a CMOS sensor or a CCD sensor 403. The headlamp assembly 400 may also include an image signal processor (ISP) 404, an artificial intelligence (AI) processor 406, a controller 408, a motor 410, and one or more light sources including beams 420, 421, 422, 423, 424, and 425. The sensor 402, the CMOS or CCD sensor 403, the AI processor 406 and the motor 410, may be implemented as the sensor 202, the CMOS or CCD sensor 203, the AI processor 206, and the motor 210 of FIG. 2A, respectively. The beams 420 to 425 may be implemented as the beams 320 to 325 of FIG. 3. The controller 408 may be implemented as the controller 308 of FIG. 3. The controller 408 may be integrated together, deployed, or placed with the AI processor 406 on a common chip, similar or conceptually same as that as shown in FIG. 2C.

In some embodiments, at least some of the components may be linked or connected, or otherwise communicate with one another, via a common bus or parallel bus, similar or conceptually same as that shown in previous FIGS. 1B and 2B. Cables 405, 407, 409, 411, 430, 431, 432, 433, 434, and 435 may connect the sensor 403, the AI processor 406, the controller 408, the motor 410, and the one or more light sources including beams 420, 421, 422, 423, 424, and 425 to a common bus. The cables 405, 407, 409, 411, 430, 431, 432, 433, 434, and 435 may comprise ethernet, Flat Panel Display Link (FPD-Link) or Gigabit Multimedia Serial Link (GMSL) cables.

FIGS. 5A, 5B, 5C, 6A, 6B, 7, and 8 illustrate headlamp assemblies and operations thereof that may be implemented on a left side. These headlamp assemblies may be implemented together with, complementary with, and/or opposite the headlamp assemblies shown in FIGS. 1A, 1B, 2A, 2B, 3, and 4, which may be implemented on a right side. FIGS.

5B, 5C, and 6B further illustrate a synchronization process between two opposing headlamps.

Figure 5A:
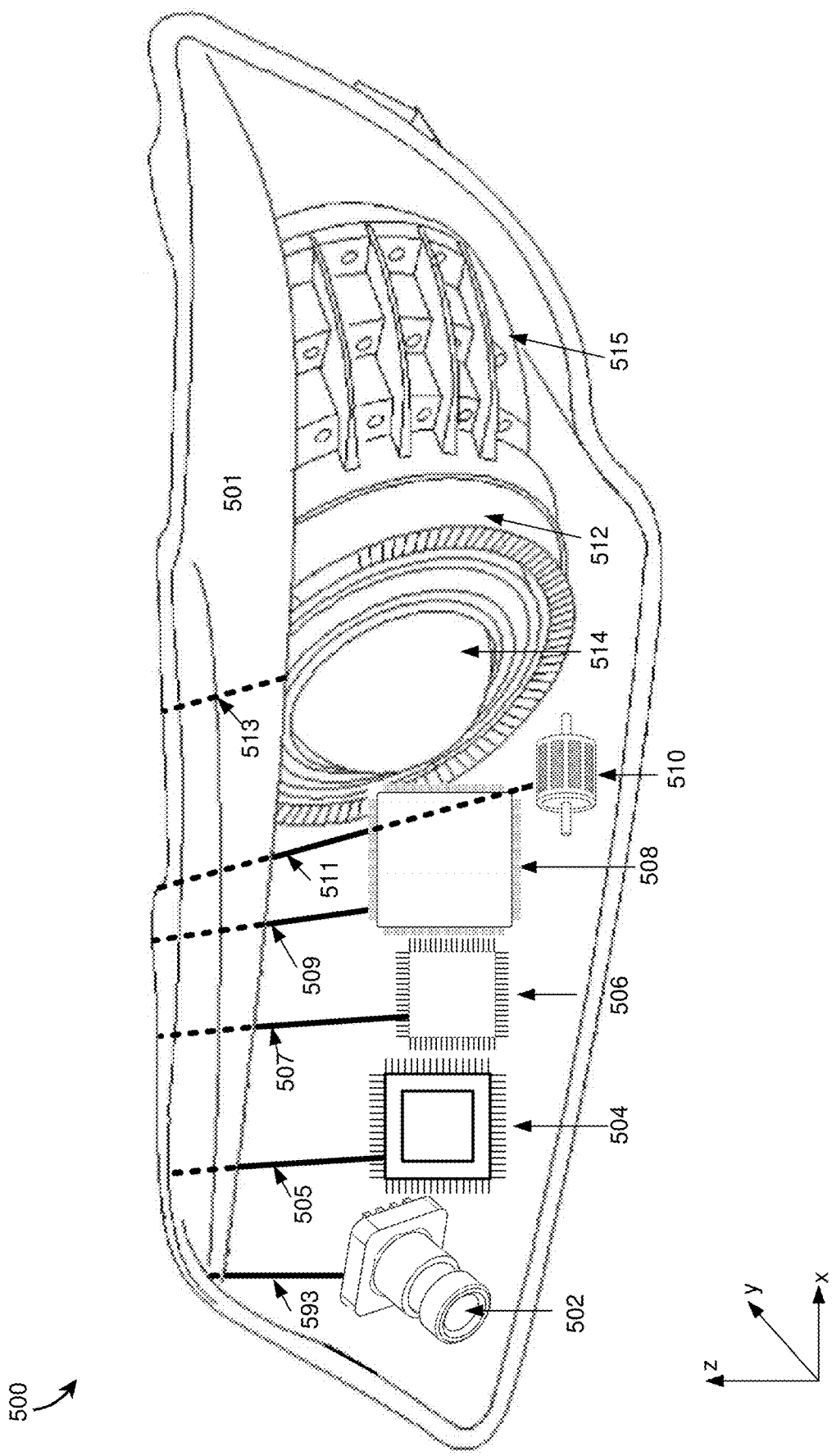
FIGS. 5A, 5B, 6A, 6B, 7, and 8 illustrate headlamp assemblies and operations thereof that may be implemented on a left side, for example, in combination with and opposite of the headlamp assemblies as described in FIGS. 1A, 2A, 3, and 4.

FIG. 5A illustrates an example diagram of a front view of a headlamp assembly 500 in accordance with an embodiment. The headlamp assembly 500 may be implemented together and/or complementary with the headlamp assembly 100 of FIG. 1A. The headlamp assembly 500 may be a left headlamp assembly, while the headlamp assembly 100 may be a right headlamp assembly. The headlamp assembly 500 may include a hermetic housing or enclosure 501 and components in an interior of the enclosure 501. The components may include a sensor 502 such as a camera sensor or a video camera sensor, which may include, for example, a CMOS sensor or a CCD sensor 503, as will be shown in FIG. 5B. The headlamp assembly 500 may also include an image signal processor (ISP) 504, an artificial intelligence (AI) processor 506, a controller 508, a motor 510, a headlight or light source 512, a turn signal 513, and a projector 514. In addition to or instead of the projector 514, the headlamp assembly 200 may include a reflector. The components of the headlamp assembly 500 may be implemented in a similar or same manner as the corresponding components of the headlamp assembly 100 of FIG. 1A. For example, the sensor 502, the CMOS or the CCD sensor 503, the ISP 504, the AI processor 506, the controller 508, the motor 510, the headlight or light source 512, and the projector 514 may be implemented as the sensor 102, the CMOS or the CCD sensor 103, the ISP 104, the AI processor 106, the controller 108, the motor 110, the headlight or light source 112, and the projector 114 of FIG. 1A, respectively. The ISP 504 and the AI processor 506 may be deployed or placed on a common chip or board, for example, a chip 564, as shown in FIG. 5C, and similar or conceptually same as that as shown in FIG. 1C.

In some embodiments, at least some of the components may be linked or connected, or otherwise communicate with one another, via a common bus, similar or conceptually same as that as shown in FIG. 1B. Cables 593, 505, 507, 509, 511, and 513 may connect the sensor 502, the ISP 504, the AI processor 506, the controller 508, the motor 510, and the headlight or light source 512, respectively, to the common bus. The cables 593, 505, 507, 509, 511, and 513 may comprise ethernet, Flat Panel Display Link (FPD-Link) or Gigabit Multimedia Serial Link (GMSL) cables.

Figure 5B:
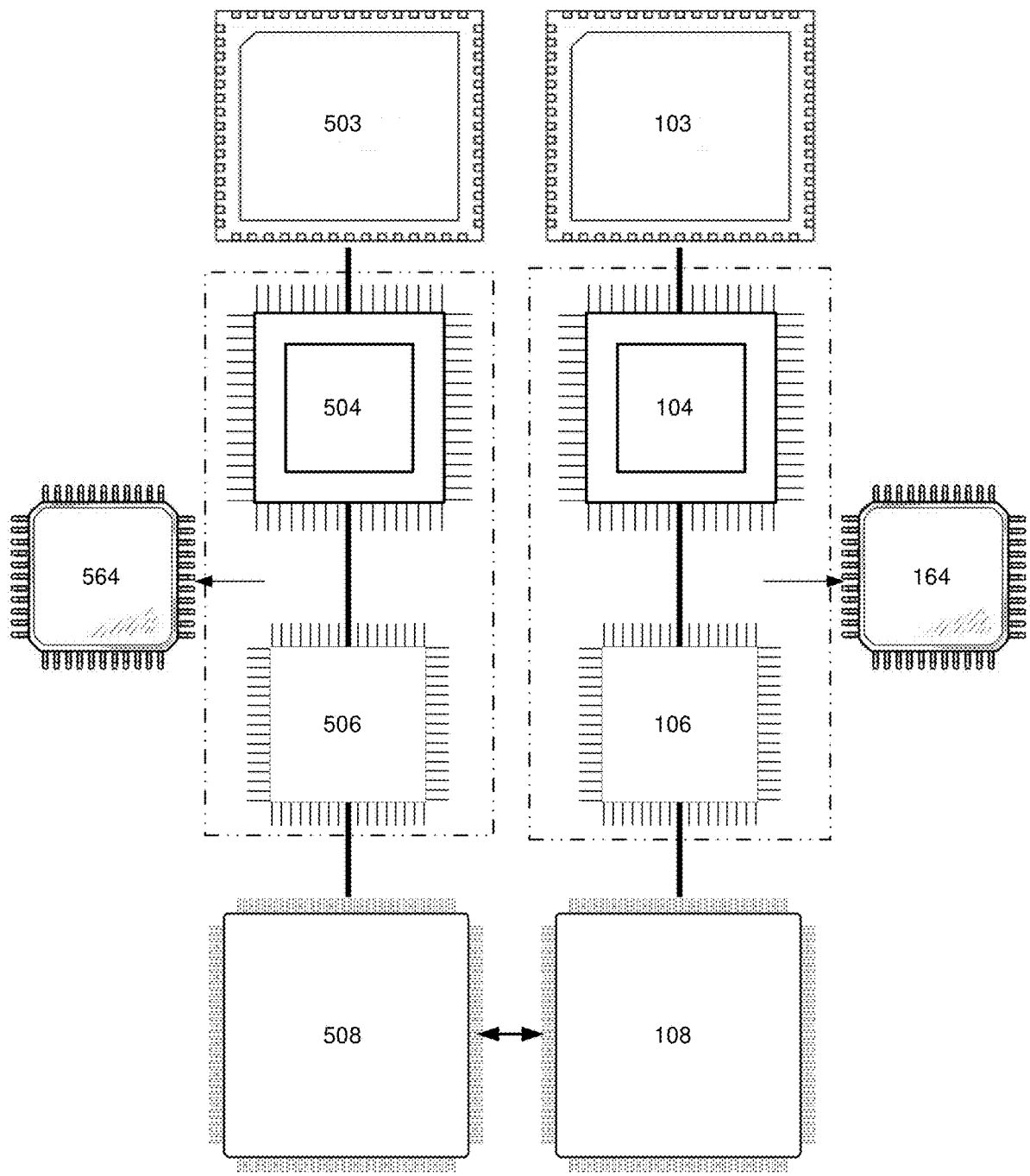

FIG. 5B illustrates a process of synchronization between left and right headlamps, for example, if the headlamp assembly 500 is implemented together with the headlamp assembly 100. In FIG. 5B, following two separate predictions by the AI processors 106 and 506 corresponding to the right and left headlamps 102 and 502, at the controlling stage, at least one of the controllers 108 and 508 may synchronize the controlling of parameters of the right and left headlamps 102 and 502. On the left headlamp assembly corresponding to the headlamp assembly 500, the ISP 504 may process a raw image or video captured by the components of the sensor 502 such as the CMOS or the CCD sensor 503. The ISP 504 may transmit the processed image or video to the AI processor 506, which may output predictions of the surrounding environment and/or a direction, intensity, power, field or view, and/or duty cycle of illumination by the light source 512 to the controller 508. The controller 508 may control or adjust parameters such as the aforementioned parameters of the illumination of the light source 512 based at least in part on the predictions by the AI processor 506. On the right headlamp assembly corresponding to the headlamp assembly 100, an analogous process may be implemented. During the synchronization, at least one of the controller 508 or the controller 108 may synchronize the parameters of the illumination with the corresponding parameters of the other headlamp. For example, the controller 508 may obtain an average or weighted average of the intensity of illumination of the light source 512 and the intensity of illumination of the light source 112, as determined by the controller 108, and further adjust the intensity of illumination of the light source 512 based on the weighted average. An amount or degree of synchronization may be calculated from an algorithm. For example, if the degree of synchronization is low, the amount of adjustment based on the weighted average may be low. The degree of synchronization regarding a direction or field of view of the two headlamps may be based on a concentration or density of entities to be illuminated or to avoid being illuminated. For example, if each headlamp is illuminating regions with a low concentration or density of entities, such as a single pedestrian, the degree of synchronization may be low. However, if one of the headlamps is illuminating a region with a high concentration of entities such as other vehicles or obstacles, the two headlamps may synchronize with a high degree towards that region because that region may have a relatively high importance.

Figure 5C:
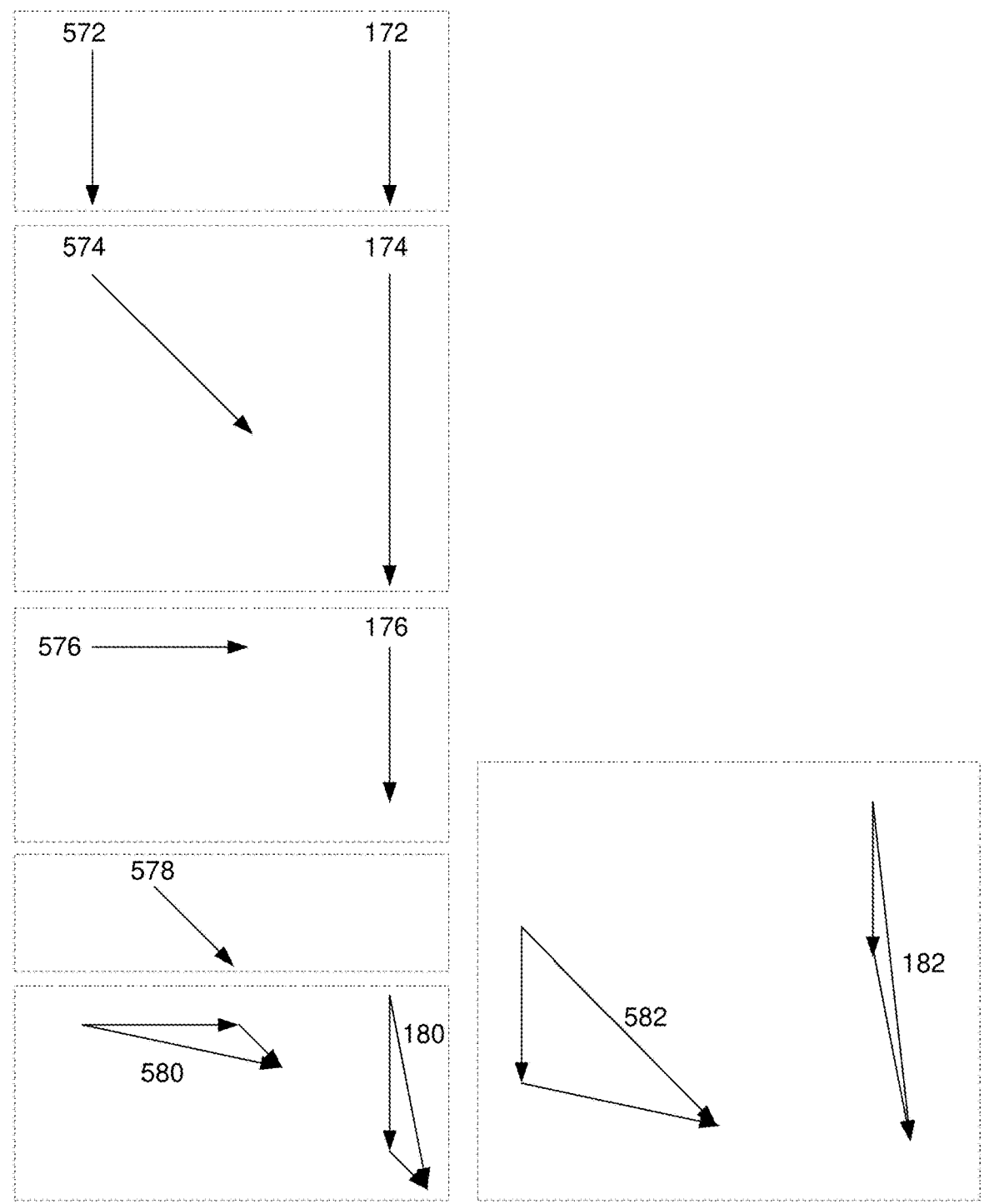

FIG. 5C illustrates an exemplary operation of the synchronization concept. Initial vectors 572 and 172 indicate directions of illumination of the left and right headlights or light sources 512 and 112, respectively. Next, the vectors 574 and 174 indicate updated calculations of directions of illumination from the controllers 508 and 108. Next, the vectors 576 and 176 indicate a change, difference, or delta between the updated calculations and the initial vectors. In particular, the vector 576 indicates a change between the vector 574 and the vector 572, and the vector 176 indicates a change between the vector 174 and the vector 172. The vectors 576 and 176 may then be averaged to obtain an average vector 578. The vectors 574 and 174, or the vectors 576 and 176, may be adjusted based on a weight of the average vector 578. For example, if the weight is zero, then no adjustment is made and the average vector 578 is not considered. The left and right headlights or light sources 512 and 112 may be adjusted by different weights. For example, the left headlight or light source 512 may be adjusted by 30 percent of the average vector 578, and the right headlight or light source 112 may be adjusted by 40 percent of the average vector 578. Vector 580 may be obtained by summing the vector 576 and 40 percent of the vector 578, and vector 180 may be obtained by summing the vector 176 and 30 percent of the vector 578. Vectors 580 and 180 may be summed to the initial vectors 572 and 172, respectively, to obtain final weighted calculation vectors 582 and 182. A weight may be determined based on a relative importance of a feature or region illuminated by the headlights or light sources 512 and 572 according to the updated calculations of the directions in the vectors 574 and 174, as described above. Synchronization of other parameters such as intensity may be conducted in a same or similar manner.

Figure 6A:
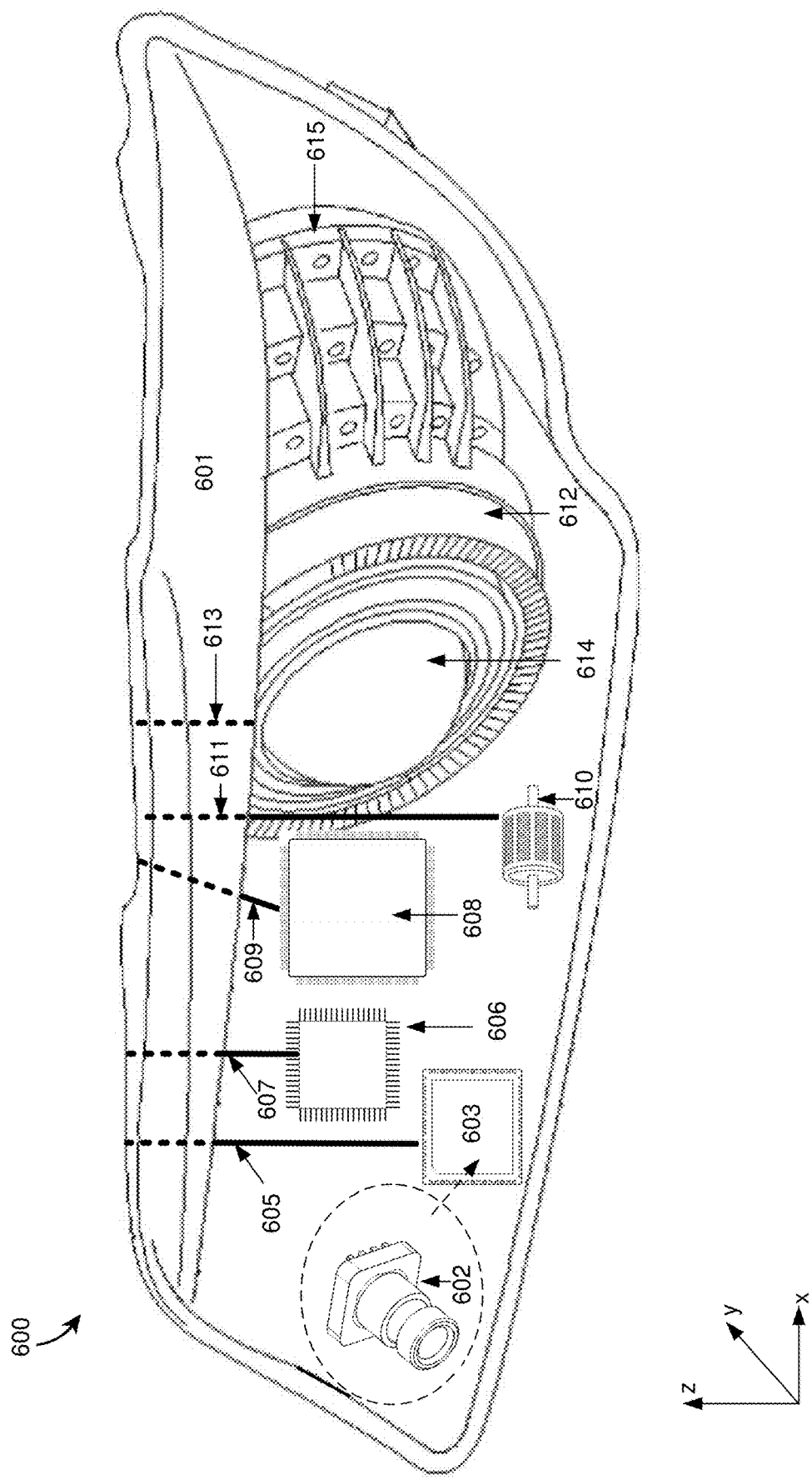

FIG. 6A illustrates an example diagram of a front view of a headlamp assembly 600 in accordance with an embodiment. The headlamp assembly 600 may be implemented together and/or complementary with the headlamp assembly 200 of FIG. 2A. The headlamp assembly 600 may be a left headlamp assembly, while the headlamp assembly 200 may be a right headlamp assembly. The headlamp assembly 600 may include a hermetic housing or enclosure 601 and components in an interior of the enclosure 601. The components may include a sensor 602 such as a camera sensor or a video camera sensor, which may include, for example, a CMOS sensor or a CCD sensor 603. The headlamp assembly 600 may also include an artificial intelligence (AI) processor 606, a controller 608, a motor 610, a headlight or light source 612, a turn signal 615, and a projector 614. In addition to or instead of the projector 614, the headlamp assembly 600 may include a reflector. The components of the headlamp assembly 600 may be implemented in a similar or same manner as the corresponding components of the headlamp assembly 100 of FIG. 2A. For example, the sensor 602, the CMOS or the CCD sensor 603, the AI processor 606, the controller 608, the motor 610, the headlight or light source 612, and the projector 614 may be implemented as the sensor 202, the CMOS or the CCD sensor 203, the AI processor 206, the controller 208, the motor 210, the headlight or light source 212, and the projector 214 of FIG. 2A, respectively.

In some embodiments, at least some of the components may be linked or connected, or otherwise communicate with one another, via a common bus, similar or conceptually same as that shown in FIG. 1B. Cables 605, 607, 609, 611, and 613 may connect the CMOS sensor or CCD sensor 603, the ISP 604, the AI processor 606, the controller 608, the motor 610, and the headlight or light source 612, respectively, to the common bus. The cables 605, 607, 609, 611, and 613 may comprise ethernet, Flat Panel Display Link (FPD-Link) or Gigabit Multimedia Serial Link (GMSL) cables.

Figure 6B:
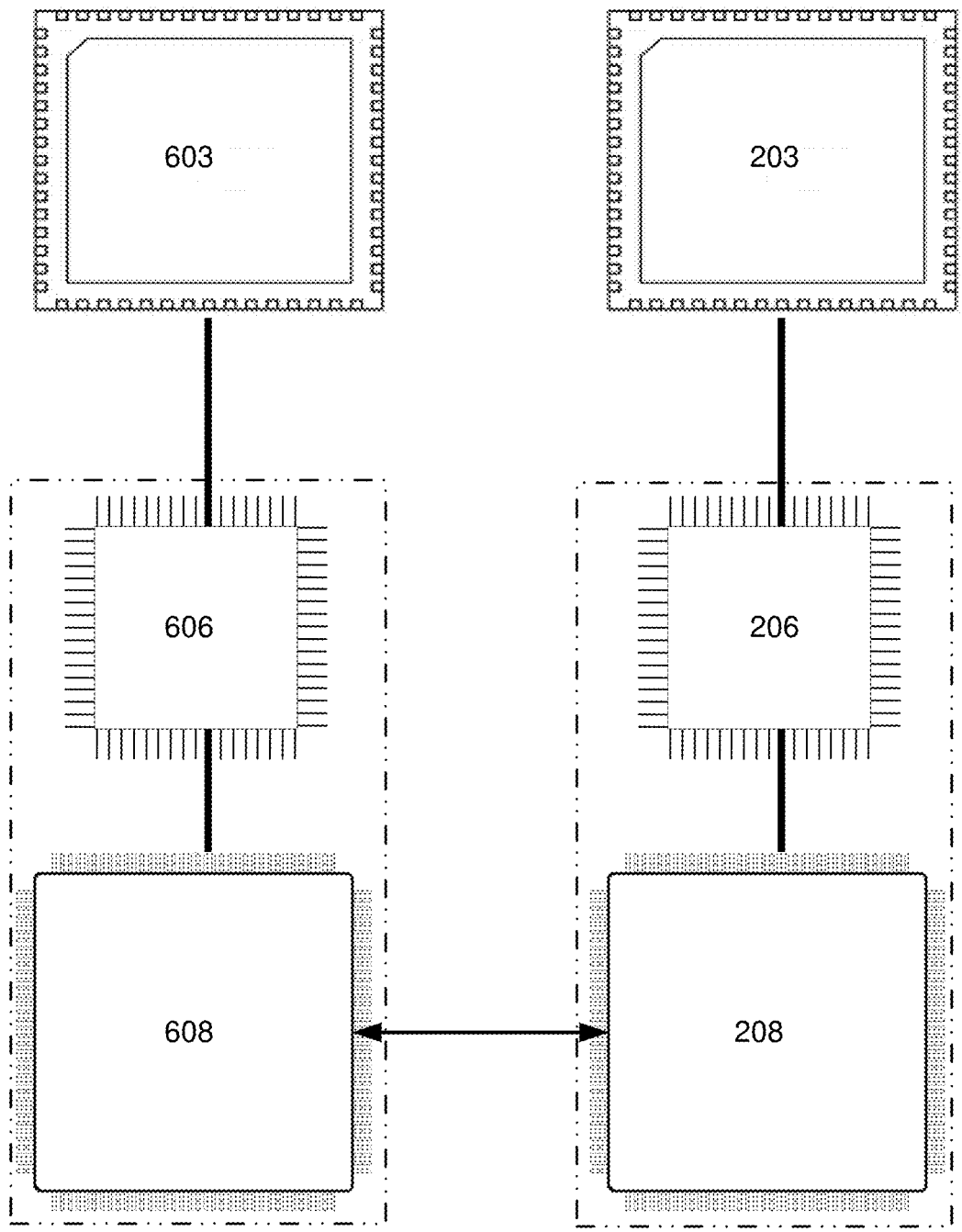

FIG. 6B illustrates a process of synchronization between left and right headlamps, for example, if the headlamp assembly 600 is implemented together with the headlamp assembly 200. The process of synchronization is similar or conceptually same as that shown in FIG. 5B. On the left headlamp assembly corresponding to the headlamp assembly 600, the ISP 604 may process a raw image or video captured by the components of the sensor 602 such as the CMOS or the CCD sensor 603. The ISP 604 may transmit the processed image or video to the AI processor 606, which may output predictions of the surrounding environment and/or a direction, intensity, power, field or view, and/or duty cycle of illumination by the light source 612 to the controller 608. The controller 608 may control or adjust any parameters such as the aforementioned parameters of the illumination of the light source 612 based at least in part on the predictions by the AI processor 606. On the right headlamp assembly corresponding to the headlamp assembly 200, an analogous process may be implemented. The principle of synchronization by the controller 608 and/or the controller 208 may follow that described in FIG. 5B.

Figure 7:
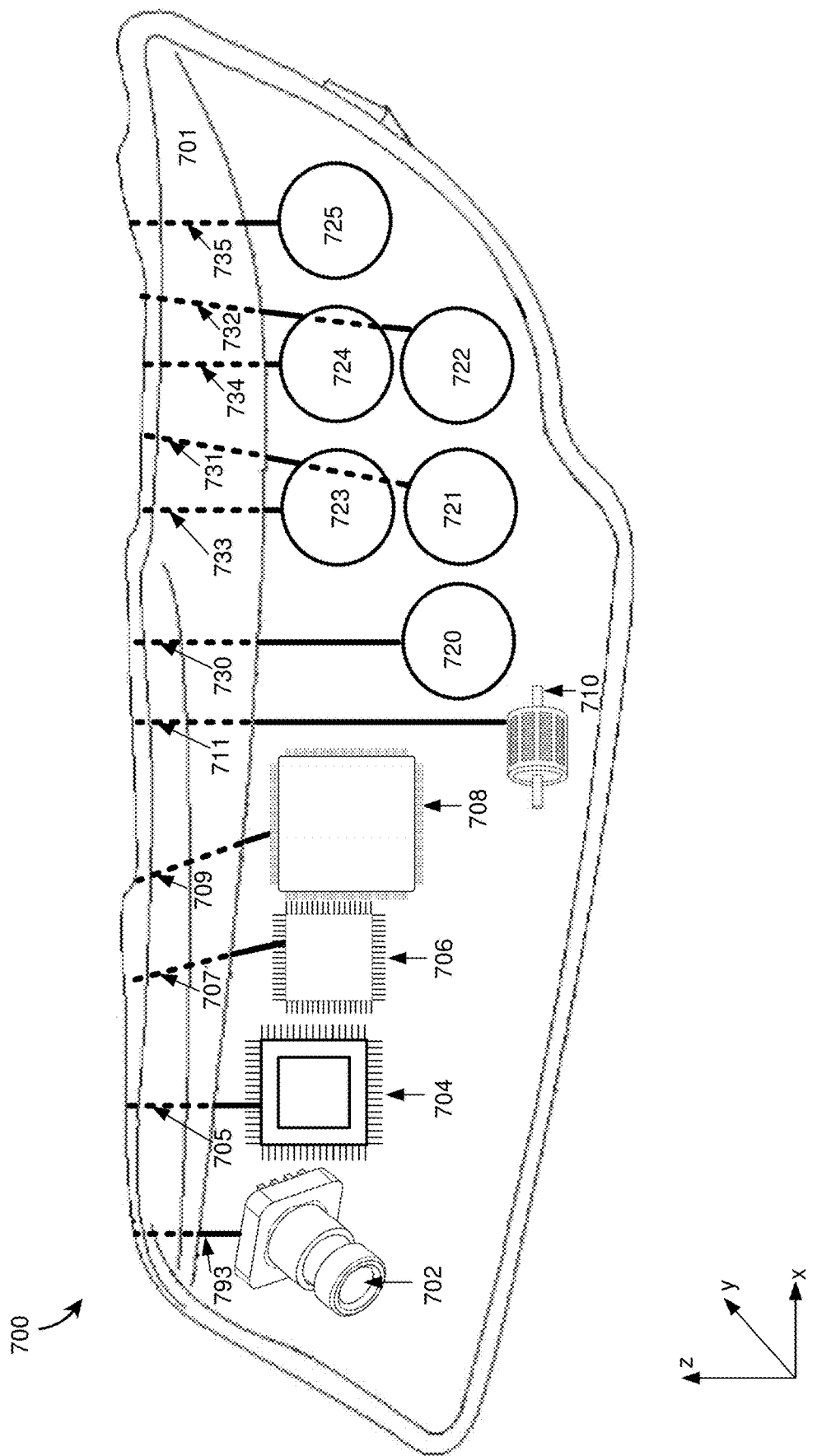

FIG. 7 illustrates an example diagram of a front view of a headlamp assembly 700 in accordance with an embodiment. The headlamp assembly 700 may be implemented together and/or complementary with the headlamp assembly 300 of FIG. 3. The headlamp assembly 700 may be a left headlamp assembly, while the headlamp assembly 300 may be a right headlamp assembly. The headlamp assembly 700 may include a hermetic housing or enclosure 701 and components in an interior of the enclosure 701. The components may include a sensor 702 such as a camera sensor or a video camera sensor, which may include, for example, a CMOS sensor or a CCD sensor. The headlamp assembly 700 may also include an image signal processor (ISP) 704, an artificial intelligence (AI) processor 706, a controller 708, a motor 710, and one or more light sources including beams 720, 721, 722, 723, 724, and 725. Each of the beams 720, 721, 722, 723, 724, and 725 may permeate through a projector or a reflector. The components of the headlamp assembly 700 may be implemented in a similar or same manner as the corresponding components of the headlamp assembly 300 of FIG. 3. The headlamp assembly 700 may further include a turn signal. In some embodiments, the ISP 704 and the AI processor 706 may be integrated into and/or deployed or placed on a common chip, similar or conceptually same as that as shown in FIG. 1C. In some embodiments, at least some of the components may be linked or connected, or otherwise communicate with one another, via a common bus, similar or conceptually same as that as shown in FIG. 1B. Cables 793, 705, 707, 709, 711, 730, 731, 732, 733, 734, and 735 may connect the sensor 702, the ISP 704, the AI processor 706, the controller 708, the motor 710, and the one or more light sources including beams 720, 721, 722, 723, 724, and 725 to the common bus. The cables 793, 705, 707, 709, 711, 730, 731, 732, 733, 734, and 735 may comprise ethernet, Flat Panel Display Link (FPD-Link) or Gigabit Multimedia Serial Link (GMSL) cables.

Figure 8:
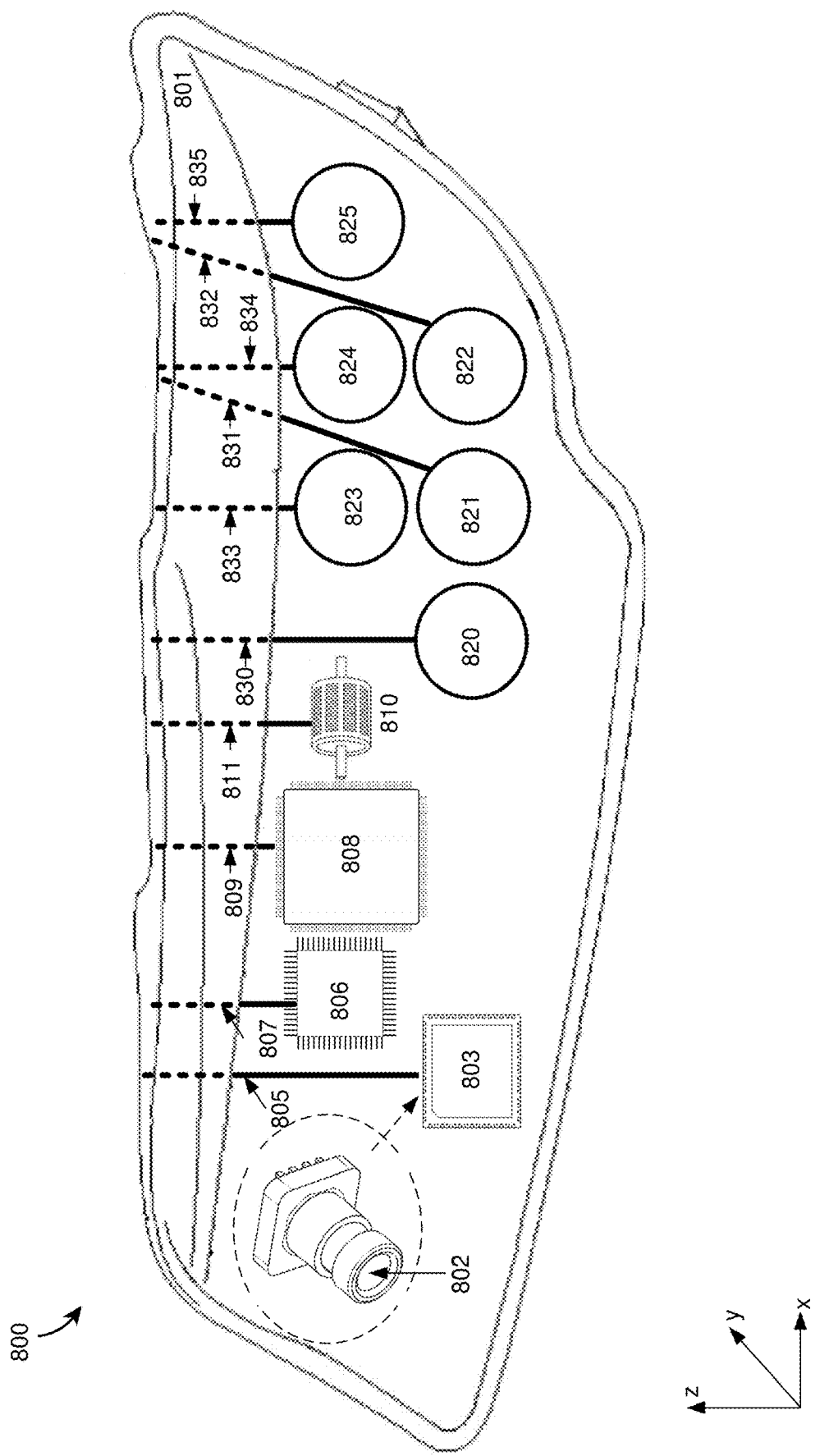

FIG. 8 illustrates an example diagram of a front view of a headlamp assembly 800 in accordance with an embodiment. The headlamp assembly 800 may be implemented together and/or complementary with the headlamp assembly 400 of FIG. 4. The headlamp assembly 800 may be a left headlamp assembly, while the headlamp assembly 400 may be a right headlamp assembly. The headlamp assembly 800 may include a hermetic housing or enclosure 801 and components in an interior of the enclosure 801. The components may include a sensor 802 such as a camera sensor or a video camera sensor, which may include, for example, a CMOS sensor or a CCD sensor 803. The headlamp assembly 800 may also include an image signal processor (ISP) 804, an artificial intelligence (AI) processor 806, a controller 808, a motor 810, and one or more light sources including beams 820, 821, 822, 823, 824, and 825. Each of the beams 820, 821, 822, 823, 824, and 825 may permeate through a projector or a reflector. The components of the headlamp assembly 800 may be implemented in a similar or same manner as the corresponding components of the headlamp assembly 400 of FIG. 4. The headlamp assembly 800 may further include a turn signal. In some embodiments, at least some of the components may be linked or connected, or otherwise communicate with one another, via a common bus, similar or conceptually same as that as shown in FIG. 2B. Cables 805, 807, 809, 811, 830, 831, 832, 833, 834, and 835 may connect the CMOS sensor or the CCD sensor 803, the AI processor 806, the controller 808, the motor 810, and the one or more light sources including beams 820, 821, 822, 823, 824, and 825 to the common bus. The cables 805, 807, 809, 811, 830, 831, 832, 833, 834, and 835 may comprise ethernet, Flat Panel Display Link (FPD-Link) or Gigabit Multimedia Serial Link (GMSL) cables. The controller 808 and the AI processor 806 may be deployed or placed together on a common chip, similar or conceptually same as that as shown in FIG. 2C.

FIGS. 9A-9E and 10A-10E illustrate how a vehicular computer system such as an electronic control unit (ECU) within the vehicle external to a headlamp assembly, may control operations and/or parameters associated with a light source. For example, the assemblies and/or operations of FIGS. 9A-9E and 10A-10E may be used in a L3 or L4 mode.

Figure 9A:
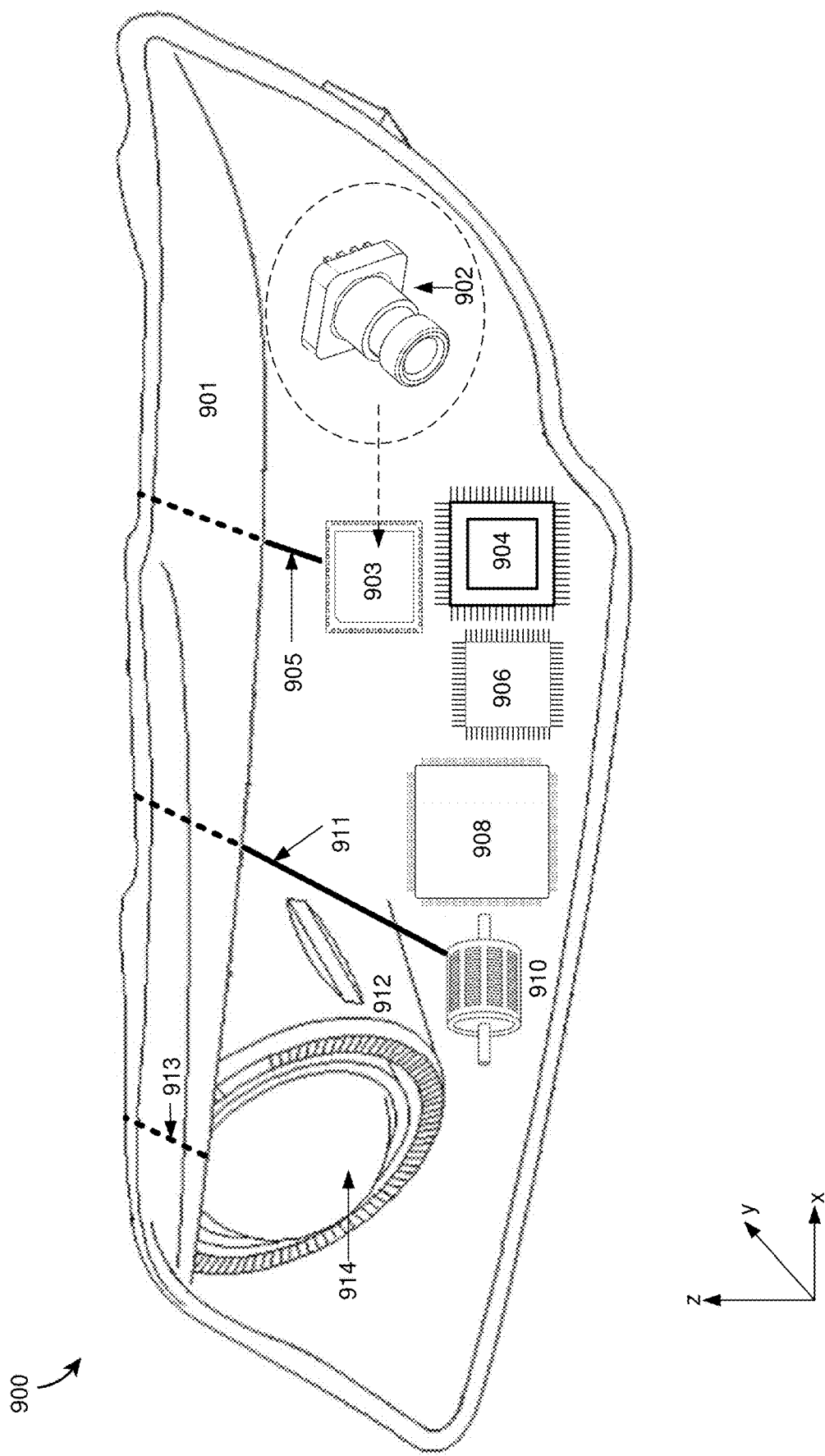

FIG. 9A illustrates an example diagram of a front view of a headlamp assembly 900 which feeds input to and may be controlled by a vehicular computer system such as an electronic control unit (ECU) within the vehicle in accordance with an embodiment. Thus, in FIG. 9A, the headlamp assembly 900 may be controlled by an electronic control unit (ECU) 920 within the vehicle, as will be shown in FIG. 9B, instead of an internal controller, such as a controller 908 inside the headlamp assembly 900. The headlamp assembly 900 may include a hermetic housing or enclosure 901 and components in an interior of the enclosure 901. The components may include a sensor 902 such as a camera sensor or a video camera sensor, which may include, for example, a CMOS sensor or a CCD sensor 903. The CMOS sensor or CCD sensor 903 may be directly connected or otherwise communicate with the ECU 920. via a cable 905 connected to a common bus 940, as will be shown in FIG. 9B. Thus, at least one of an ISP 904, an AI processor 906, and the controller 908 may be bypassed. The ECU 920 may perform functions previously or otherwise performed by one of the ISP 904, the AI processor 906, or the controller 908 to control and/or change the intensity, field of view, power, direction, pattern, and/or duty cycle of illumination to be provided by a light source 912, either directly or through a motor 910 to actuate or rotate the light source 912. The ECU 920 may, additionally or alternatively, control an intensity, field of view, power, direction, amount, pattern, or profile of at least a portion of light emitted from the light source 912, and/or an intensity, field of view, power, direction, amount, pattern, or profile of at least a portion of light passing through a projector 914. The ECU 920 may control the light source 912 using high definition (HD) maps, GPS, accelerometers, speedometers, telemetry, gyroscope sensors, steering angle sensors, yaw rate sensors, wheel encoders, GPS, and windscreen or windshield sensors. The sensor data may include a steering wheel angle, rotations of wheels, angular position, acceleration, or speed. The components of FIG. 9A may otherwise be implemented as the corresponding components as shown in previous figures, such as in FIG. 1A. Alternatively, the ECU 920 may control multiple beams, such as the beams 320 to 325 as shown in FIG. 3.

Figure 9B:
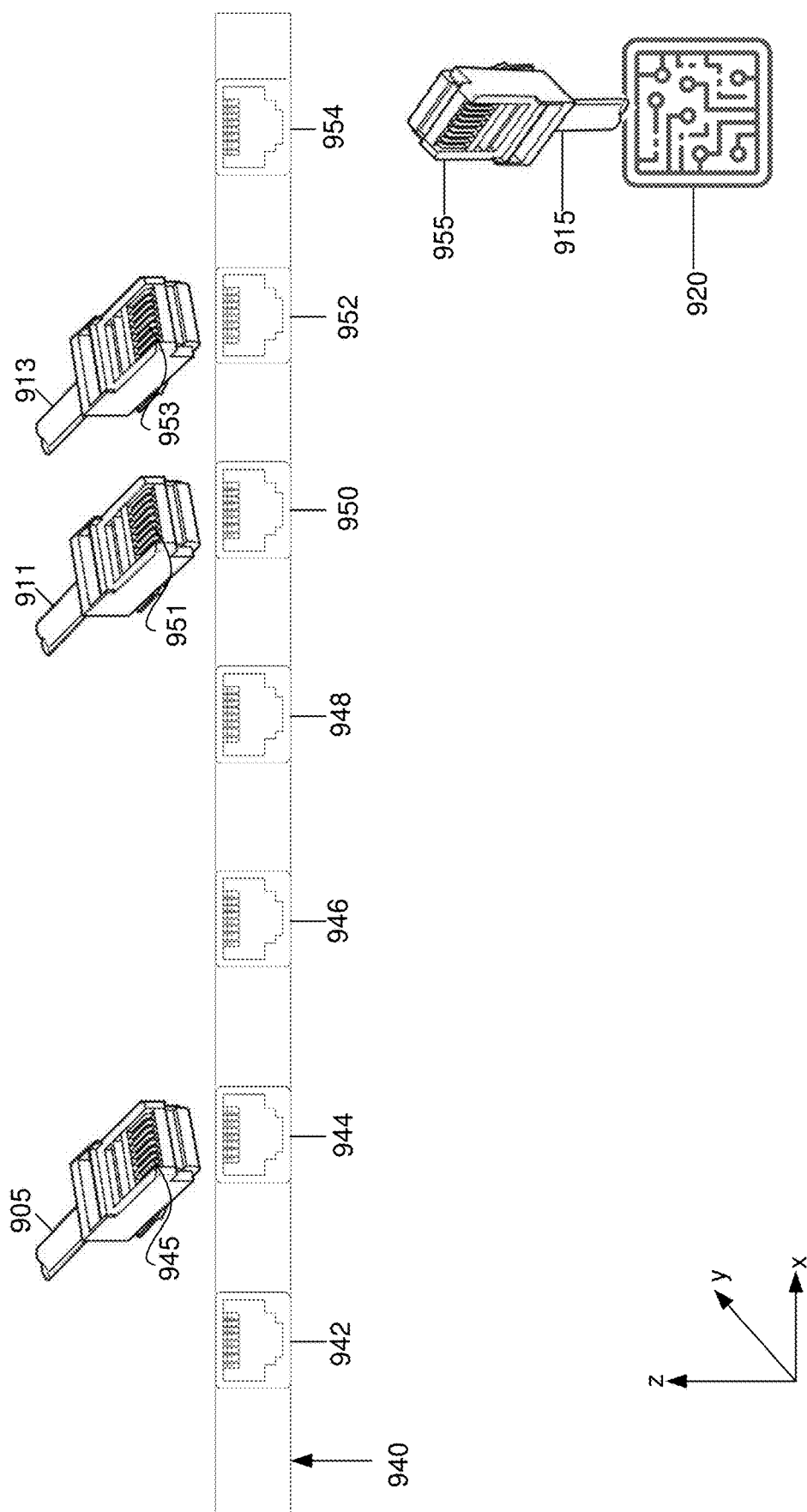
Figure 9C:
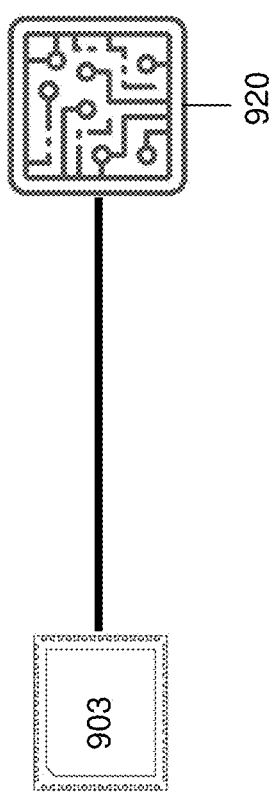

In some embodiments, at least some of the components may be linked or connected, or otherwise communicate with one another, via the common bus 940, as shown in FIGS. 9A and 9B. The cable 905, and cables 911, 913, and 915 may connect the CMOS sensor or CCD sensor 903, the motor 910, the headlight or light source 912, and the ECU 920, respectively, to the common bus 940. The cables 905, 911, and 913 may comprise ethernet, Flat Panel Display Link (FPD-Link) or Gigabit Multimedia Serial Link (GMSL) cables. The CMOS sensor or CCD sensor 903 may communicate with the ECU 920 by providing raw data, as shown in FIG. 9C.

FIG. 9B illustrates an example diagram of a back view of the headlamp assembly 900 in accordance with the embodiment shown in FIG. 9A. The bus 940, such as a common bus, may enable the cables 905, 911, and 913 to be connected to the bus 940 on a back surface of the headlamp assembly 900. The bus 940 may comprise ports 942, 944, 946, 948, 950, and/or 952 to which respective sockets or connectors may be connected. For example, a socket 945 corresponding to the cable 905 may be connected to the port 944, a socket 951 corresponding to the cable 911 may be connected to the port 950, a socket 953 corresponding to the cable 913 may be connected to the port 952, and a socket 955 corresponding to the cable 915 may be connected to the port 954. Other variations may also be possible. For example, the cables 905, 911, and/or 913 may be connected and/or otherwise facilitate communication and/or data transmission among the components of the headlamp assembly 900 without physical connection to ports, sockets or connectors or by physical connection in other manners.

Figure 9D:
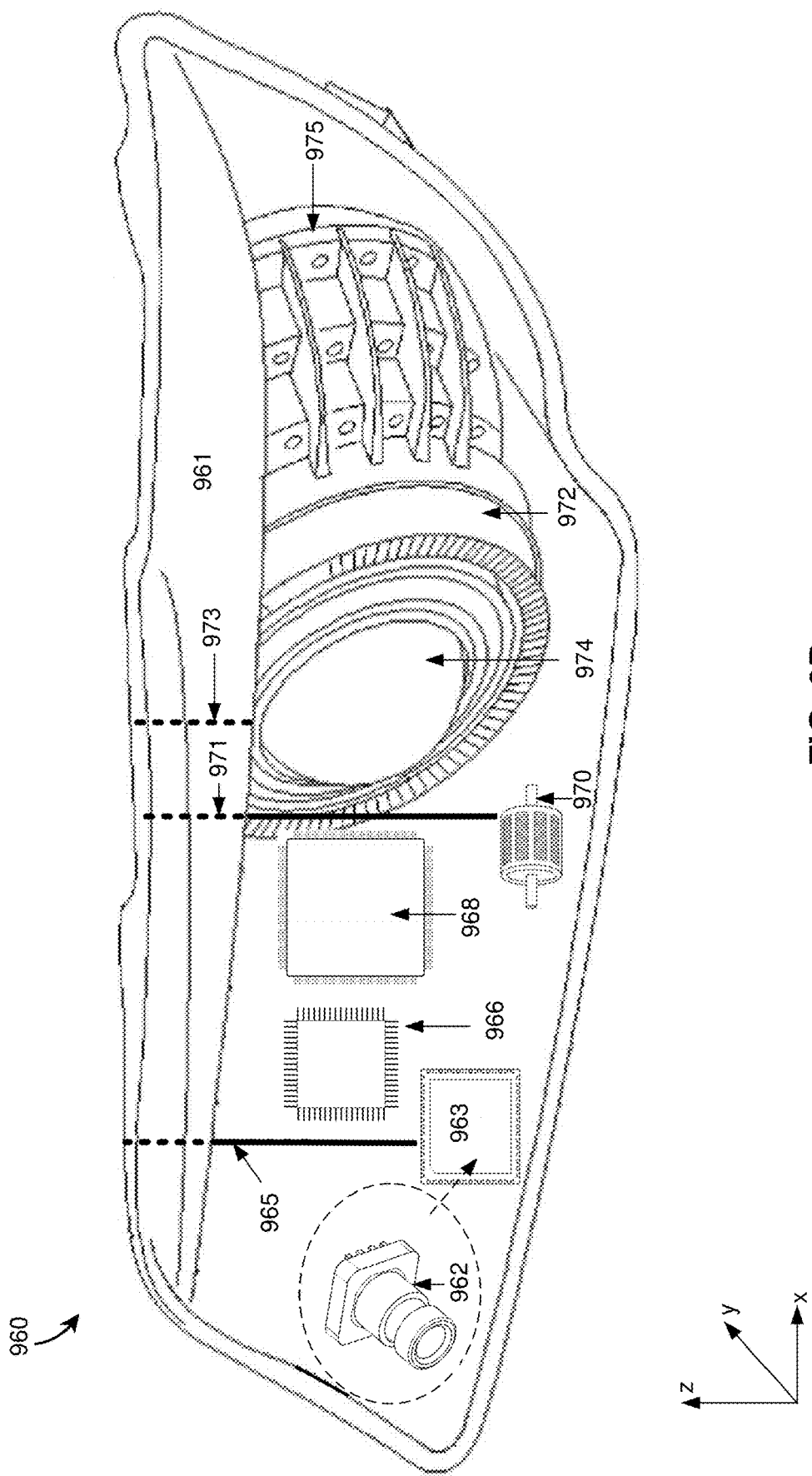

FIG. 9D illustrates a complementary headlamp assembly 960, for example, a left headlamp assembly, that may be implemented opposite of and together with the headlamp assembly 900, which may be a right headlamp assembly. The headlamp assembly 960 may include a hermetic housing or enclosure 961 and components in an interior of the enclosure 961. The components may include a CMOS sensor or CCD sensor 963, a cable 965 that connects or otherwise allows the CMOS sensor or CCD sensor 963 to communicate with the ECU 920 via a common bus such as the common bus 940, and a headlight or light source 972 to be connected to the ECU 920 via a cable 973, and controlled by the ECU 920. Other components may include an ISP, an AI processor 906, a controller 908, a motor 970 connected by a cable 971 to the common bus, a projector 974, and a turn signal 975. The components and operations of the headlamp assembly 960 may be implemented in a same or similar manner as the corresponding components and operations of the headlamp assembly 900.

FIG. 9E illustrates an example diagram of a communication mechanism between two headlamp assemblies, such as a left headlamp assembly 960 and a right headlamp assembly 900, in accordance with the embodiments of FIGS. 9A and 9D. In FIG. 9E, a raw camera or video camera signal from each of the CMOS or CCD sensor 903 and the CMOS or CCD sensor 963 may be provided to the ECU 920 via the cable 905 and the cable 965, respectively, through the bus 940. The ECU 920 may communicate with the light source 912 and/or the light source 972 through the bus 940 connected to the cables 913 and 973. The ECU 920 may control and/or change any operational parameters of or associated with light emitted from the light source 912 and/or the light source 972, and/or further process light emitted from the light source 912 and/or the light source 972.

Figure 10A:
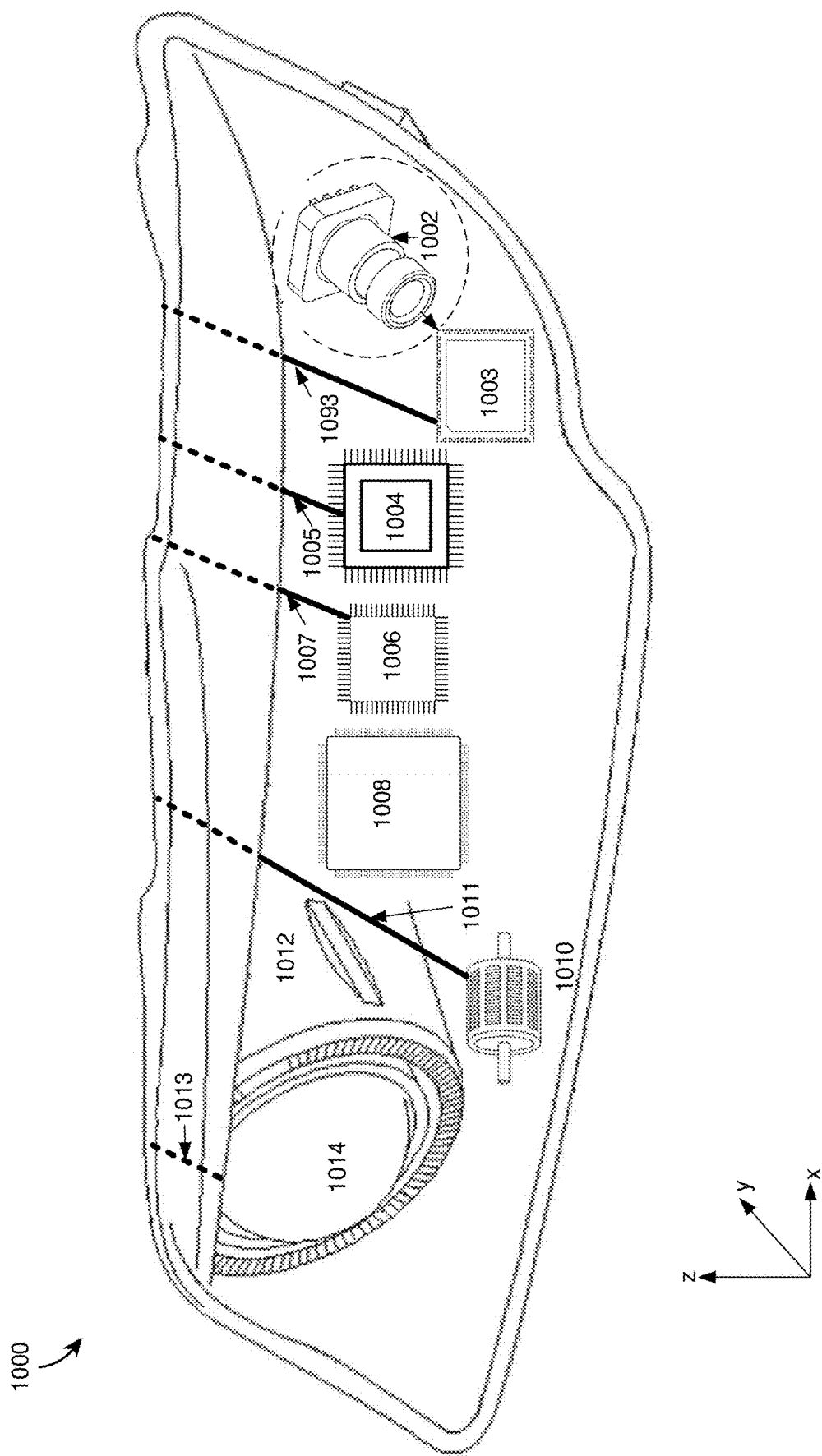

FIG. 10A illustrates an example diagram of a front view of a headlamp assembly 1000 which feeds input to and may be controlled by a vehicular computer system such as an electronic control unit (ECU) within the vehicle in accordance with an embodiment. Thus, in FIG. 10A, the headlamp assembly 1100 may be controlled by an electronic control unit (ECU) 1120 within the vehicle, as will be shown in FIG. 10B, instead of an internal controller, such as a controller 1108 inside the headlamp assembly 1100. The embodiment of FIG. 10A may be similar to that as shown in FIG. 9A, except that the ECU 1020 may receive processed data and/or predictions from an AI processor 1006 instead of raw sensor data from a CMOS or CCD sensor 1003.

The headlamp assembly 1000 may include a hermetic housing or enclosure 1001 and components in an interior of the enclosure 1001. The components may include a sensor 1002 such as a camera sensor or a video camera sensor, which may include, for example, the CMOS sensor or a CCD sensor 1003. The CMOS sensor or CCD sensor 1003 may be connected to or in communication with an ISP 1004 and the AI processor 1006. The AI processor 1006 may transmit or otherwise communicate its predictions to the ECU 1020 via a cable 1007 connected to a common bus 1040, as will be shown in FIG. 10B. Thus, the controller 1008 may be bypassed. The ECU 1020 may perform functions previously or otherwise performed by the controller 1008 to control and/or change the intensity, field of view, power, direction, pattern, and/or duty cycle of illumination to be provided by the light source 1012, either directly or through a motor 1010 to actuate or rotate the light source 1012. The ECU 1020 may, additionally or alternatively, control an amount, pattern, or profile of at least a portion of light emitted from the light source 1012, and/or a field of view, power, direction, amount, pattern, or profile of at least a portion of light passing through a projector 1014. The ECU 1020 may control the light source 1012 using high definition (HD) maps, GPS, accelerometers, speedometers, telemetry, gyroscope sensors, steering angle sensors, yaw rate sensors, wheel encoders, GPS, and windscreen or windshield sensors. The sensor data may include a steering wheel angle, rotations of wheels, angular position, acceleration, or speed, from accelerometers, speedometers, telemetry, gyroscope sensors, steering angle sensors, yaw rate sensors, wheel encoders, GPS, and windscreen or windshield sensors. The components of FIG. 10A may otherwise be implemented as the corresponding components as shown in previous figures, such as in FIG. 1A. Alternatively, the ECU 1020 may control multiple beams, such as the beams 320 to 325 as shown in FIG. 3.

Figure 10C:
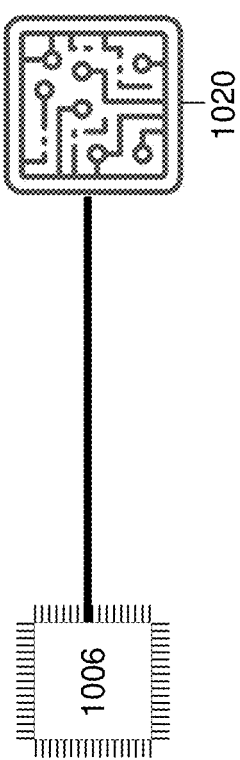

In some embodiments, at least some of the components may be linked or connected, or otherwise communicate with one another, via the common bus 1040, as shown in FIGS. 10A and 10B. Cables 1093, 1005, 1011, and 1013, and the cable 1007, may connect the CMOS sensor or CCD sensor 1003, the ISP 1004, the AI processor 1006, the motor 1010, the headlight or light source 1012, and the ECU 1020, respectively, to the common bus 1040. The cables 1093, 1005, 1007, 1011, and 1013, may comprise ethernet, Flat Panel Display Link (FPD-Link) or Gigabit Multimedia Serial Link (GMSL) cables. The AI processor 1006 may communicate with the ECU 1020 by providing predictions, as shown in FIG. 10C.

FIG. 10B illustrates an example diagram of a back view of the headlamp assembly 1000 in accordance with the embodiment shown in FIG. 10A. The bus 1040 may enable the cables 1093, 1005, 1007, 1011, and 1013, to be connected to the bus 1040 on a back surface of the headlamp assembly 1000. The bus 1040 may comprise ports 1042, 1044, 1046, 1048, 1050, 1052, and/or 1054, to which respective sockets or connectors may be connected. For example, a socket 1043 corresponding to the cable 1093 may be connected to the port 1044, a socket 1045 corresponding to the cable 1005 may be connected to the port 1044, a socket 1047 corresponding to the cable 1007 may be connected to the port 1046, a socket 1051 corresponding to the cable 1011 may be connected to the port 1050, a socket 1053 corresponding to the cable 1013 may be connected to the port 1052, and a socket 1055 corresponding to the cable 1015 may be connected to the port 1054. Other variations may also be possible. For example, the cables 1093, 1005, 1007, 1011, and/or 1013 may be connected and/or otherwise facilitate communication and/or data transmission among the components of the headlamp assembly 1000 without physical connection to ports, sockets or connectors or by physical connection in other manners.

Figure 10D:
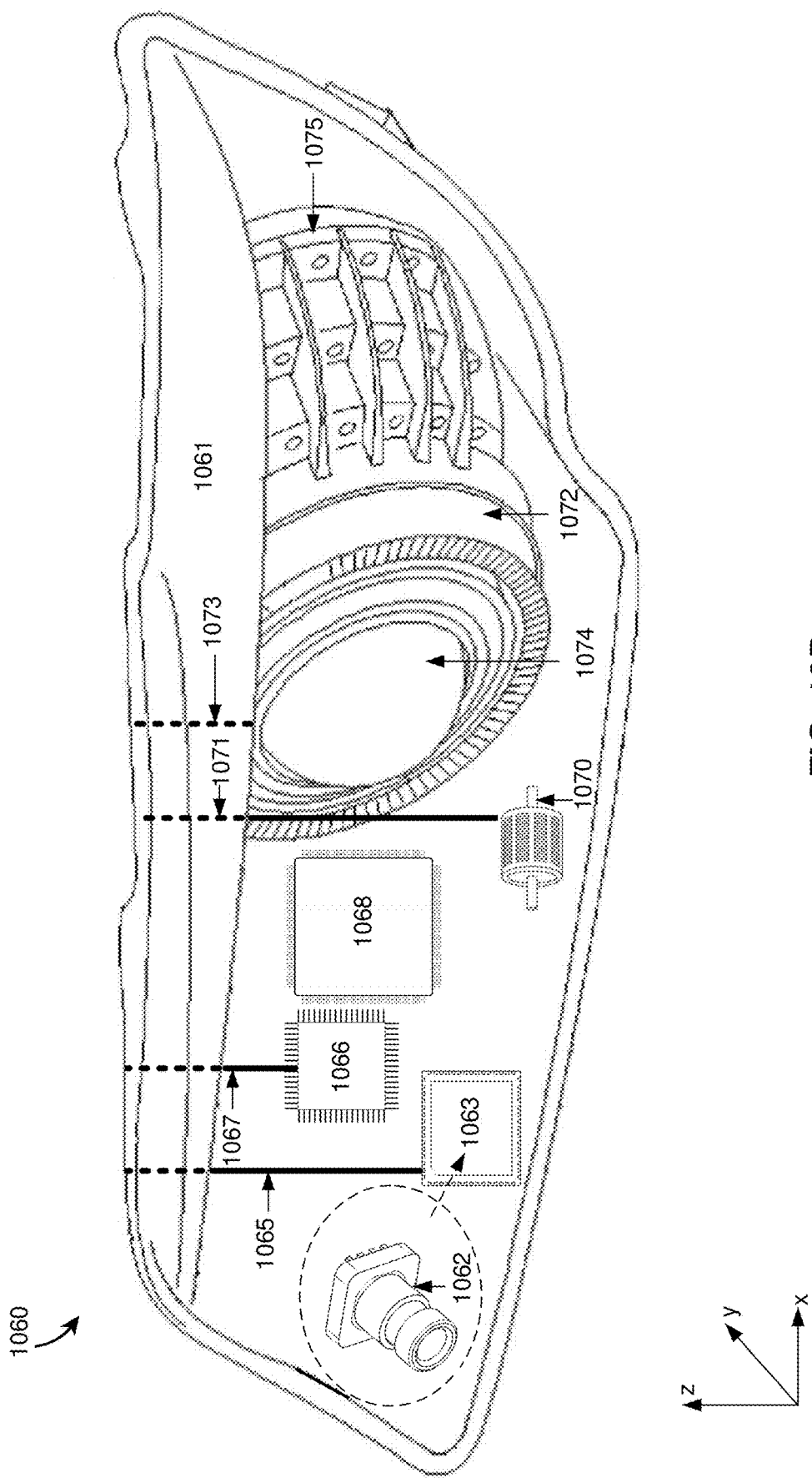

FIG. 10D illustrates a complementary headlamp assembly 1060, for example, a left headlamp assembly, that may be implemented opposite of and together with the headlamp assembly 1000, which may be a right headlamp assembly. The headlamp assembly 1060 may include a hermetic housing or enclosure 1061 and components in an interior of the enclosure 1061. The components may include a sensor 1062 which may include a CMOS sensor or CCD sensor 1063, an ISP, a cable 1065 that connects or otherwise allows the CMOS sensor or CCD sensor 1063 to communicate with an AI processor 1066 via a common bus such as the common bus 1040, a cable 1067 that allows the AI processor 1066 to communicate with the ECU 1020 via the common bus 1040, and a headlight or light source 1072 to be connected to the ECU 1020 via a cable 1073, and controlled by the ECU 1020. Other components may include the AI processor 1066, a controller 1068, a motor 1070 connected by a cable 1071 to the common bus, a projector 1074, and a turn signal 1075.

The components and operations of the headlamp assembly 1060 may be implemented in a same or similar manner as the corresponding components and operations of the headlamp assembly 1000.

FIG. 10E illustrates an example diagram of a communication mechanism between two headlamp assemblies, such as a left headlamp assembly 1060 and a right headlamp assembly 1000, in accordance with the embodiments of FIGS. 10A and 10D. In FIG. 10E, predictions or other processed data from the AI processor 1006 and the AI processor 1066 may be provided to the ECU 1020 via the cable 1007 and the cable 1067, respectively, through the common bus 1040. The ECU 1020 may communicate with the light source 1012 and/or the light source 1072 through the common bus 1040 connected to the cables 1013 and 1073. The ECU 1020 may control and/or change any operational parameters of or associated with light emitted from the light source 1012 and/or the light source 1072, and/or further process light emitted from the light source 1012 and/or the light source 1072.

Figure 11A:
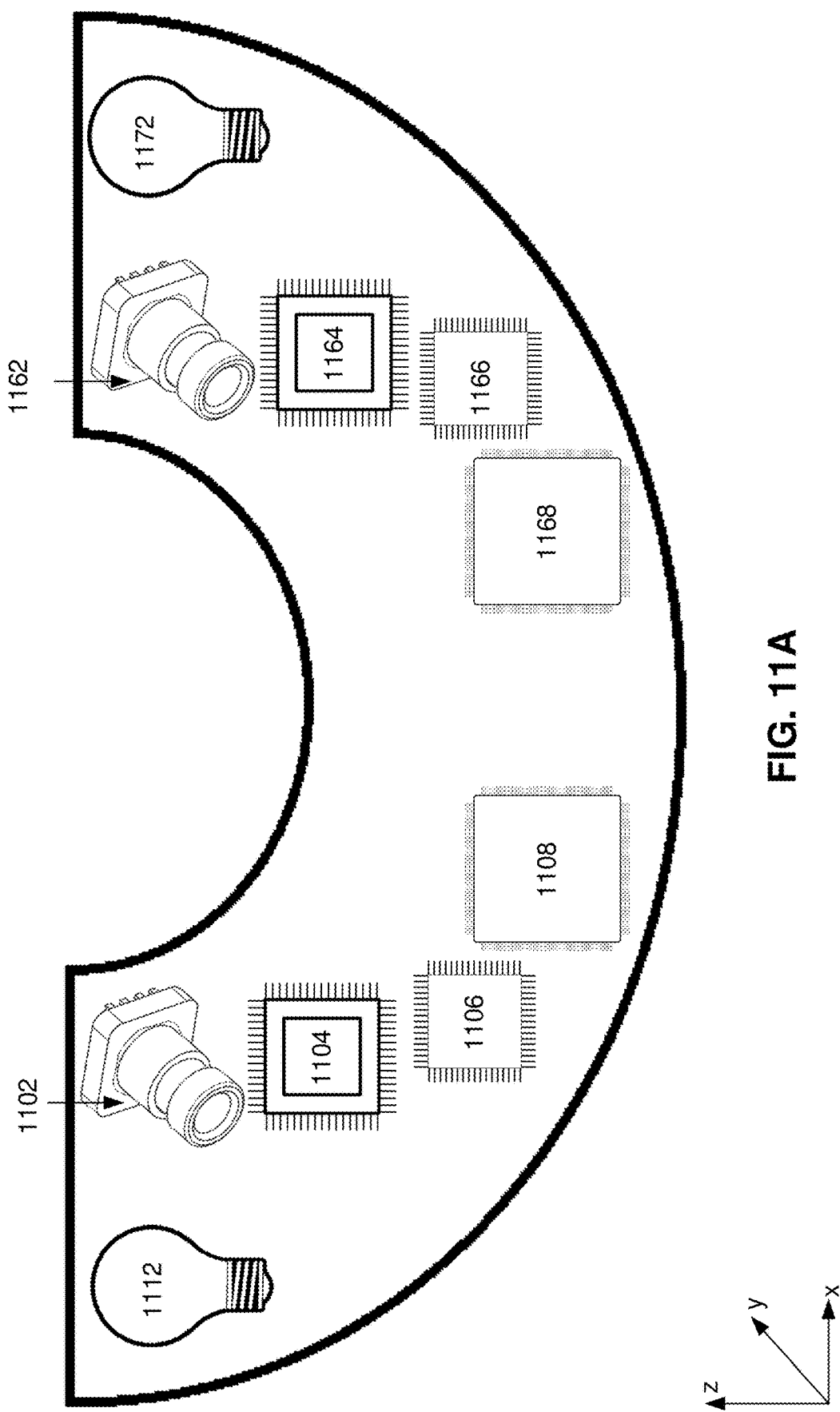
FIGS. 11A-11E illustrate example diagrams of how components of a left and right headlamp assembly may be combined.

FIGS. 11A-11E illustrate example diagrams of how components of a left and right headlamp assembly may be combined. In some embodiments, as shown in FIG. 11A a left headlamp assembly may include a left sensor 1162, a left ISP 1164, a left AI processor 1166, a left controller 1168, and a left light source 1172. A right headlamp assembly may include a right sensor 1102, a right ISP 1104, a right AI processor 1106, a right controller 1108, and a right light source 1112. The components of the left and right headlamp assemblies may be implemented in a same or similar manner to corresponding components described in any of the preceding FIGS. Here, the left and right headlamp assemblies may individually capture image and/or video data, process the captured data, make predictions, and control the respective light sources 1162 and 1112 individually or substantially individually.

Figure 11B:
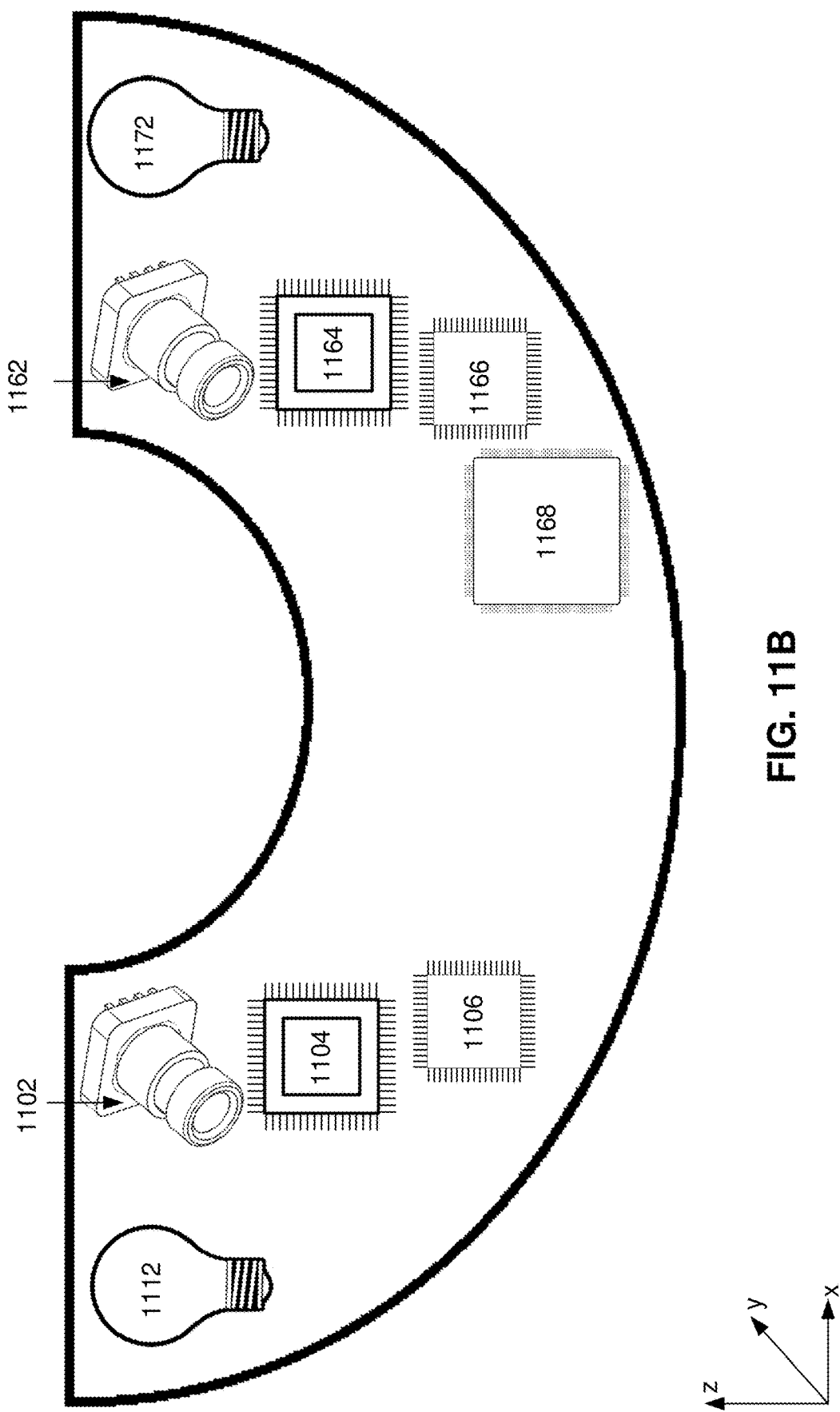

In FIG. 11B, the left headlamp assembly may include the left sensor 1162, the left ISP 1164, the left AI processor 1166, the left controller 1168, and the left light source 1172. The right headlamp assembly may include the right sensor 1102, the right ISP 1104, the right AI processor 1106, and the right light source 1112. The left controller 1168 may obtain predictions from both the left AI processor 1166 and the right AI processor 1106 through a common bus. The left controller 1168 may further control both the left light source 1172 and the right light source 1112 through the common bus. Thus, compared to FIG. 11A, in FIG. 11B, no controller is present in the right headlamp assembly and the left controller 1168 performs the functions that would otherwise be performed by the controller in the right headlamp assembly.

Figure 11C:
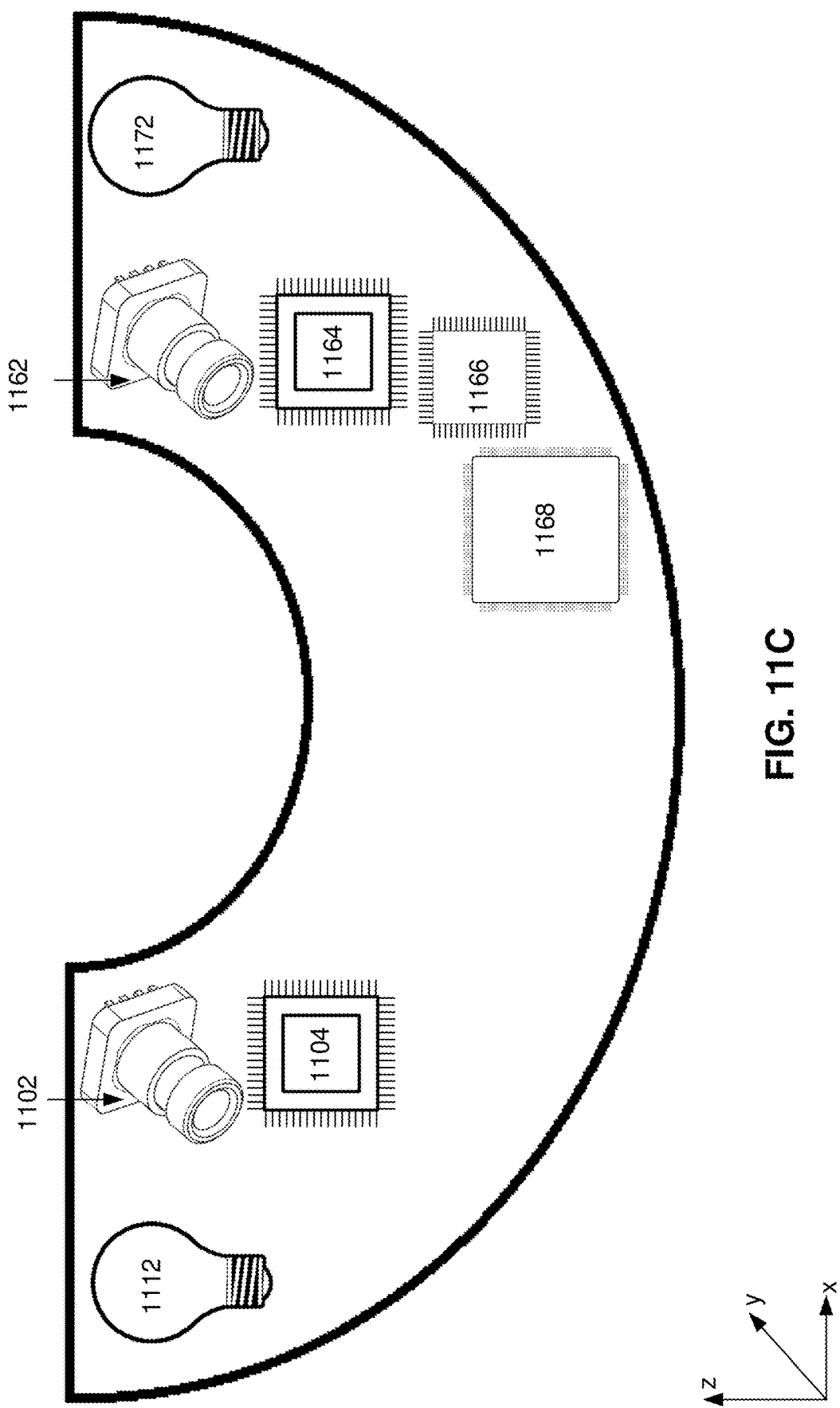

In FIG. 11C, the left headlamp assembly may include the left sensor 1162, the left ISP 1164, the left AI processor 1166, the left controller 1168, and the left light source 1172. The right headlamp assembly may include the right sensor 1102, the right ISP 1104, and the right light source 1112. The left AI processor 1166 may perform predictions for both the left and right light sources 1172 and 1112, after receiving data from both the left ISP 1164 and the right ISP 1104 through the common bus. Thus, the left AI processor 1166 may perform functions that would otherwise have been performed by a right AI processor. The left controller 1168 controls both the left and right light sources 1172 and 1112. Thus, compared to FIG. 11A, in FIG. 11C, no controller and no AI processor is present in the right headlamp assembly.

Figure 11D:
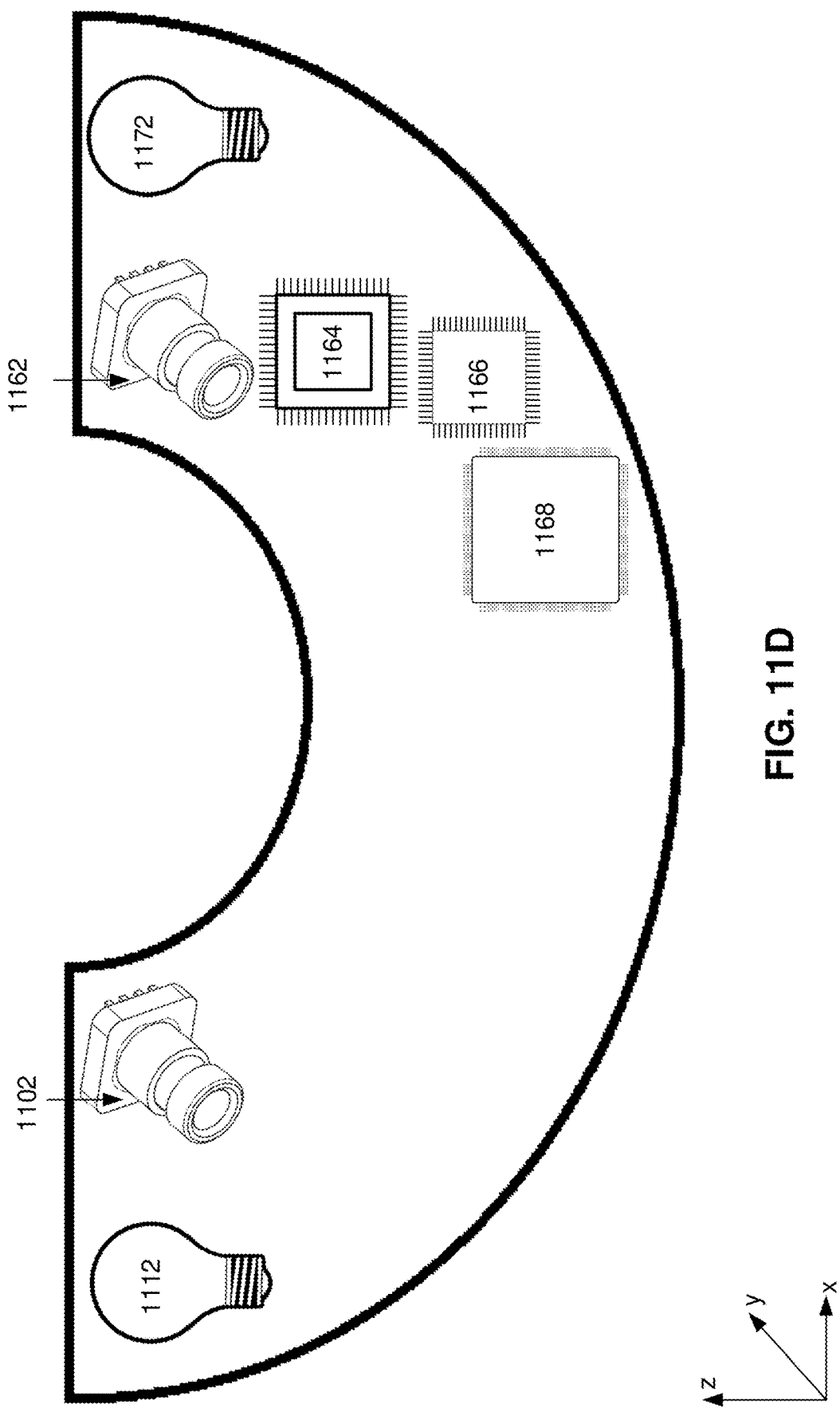

In FIG. 11D, the left headlamp assembly may include the left sensor 1162, the left ISP 1164, the left AI processor 1166, the left controller 1168, and the left light source 1172. The right headlamp assembly may include the right sensor 1102 and the right light source 1112. The left ISP 1164 may receive data from both the left sensor 1162 and the right sensor 1102, and perform the functions that otherwise would be performed by an ISP on the right. The left AI processor 1166 may perform predictions for both the left and right light sources 1172 and 1112, after receiving data from the left ISP 1164 through the common bus. Thus, the left AI processor 1166 may perform functions that would otherwise have been performed by a right AI processor. The left controller 1168 controls both the left and right light sources 1172 and 1112. Thus, compared to FIG. 11A, in FIG. 11D, no ISP, controller, and AI processor are present in the right headlamp assembly.

Figure 11E:
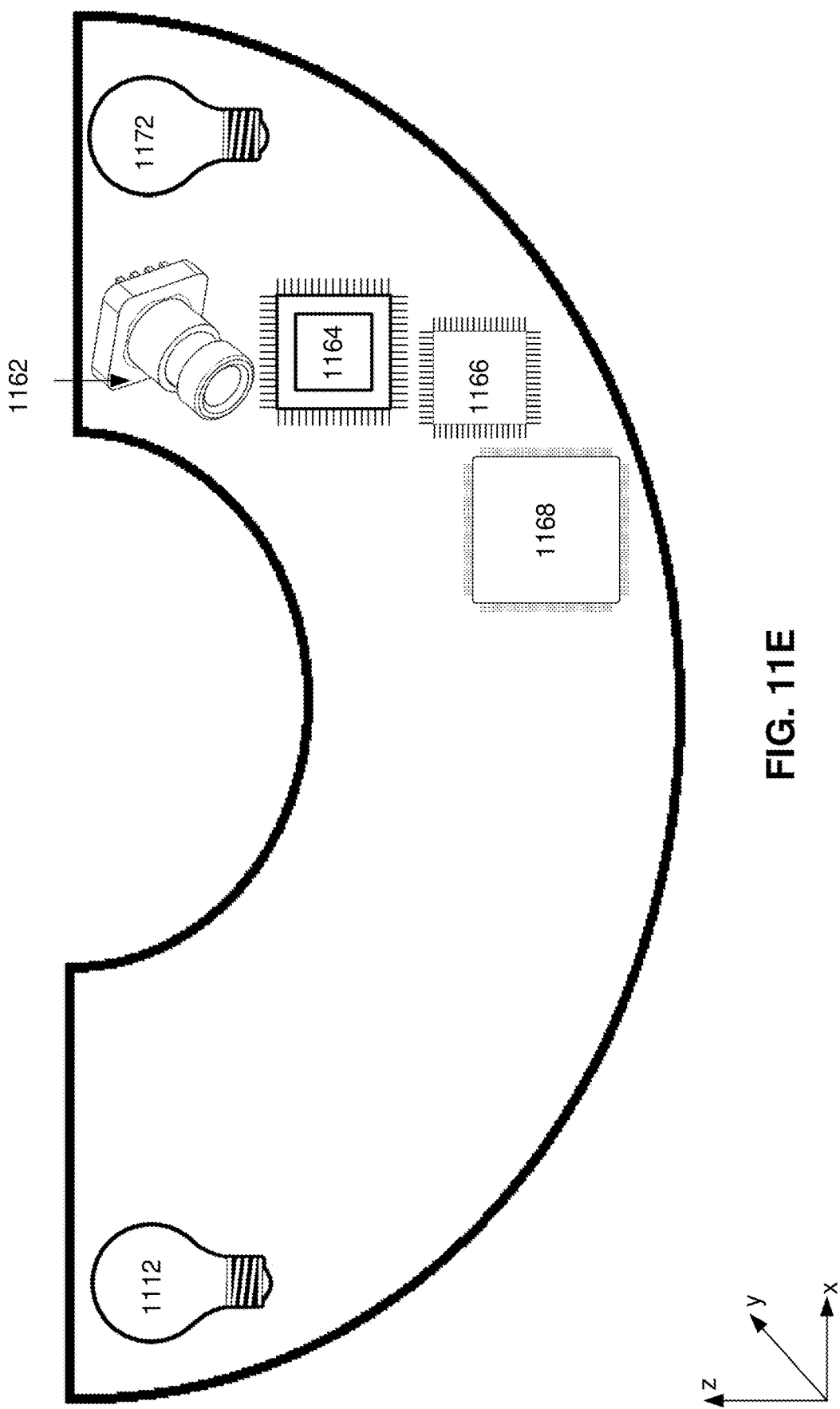

In FIG. 11E, the left headlamp assembly may include the left sensor 1162, the left ISP 1164, the left AI processor 1166, the left controller 1168, and the left light source 1172. The right headlamp assembly may include the right light source 1112. The left sensor 1162 may capture data; the ISP 1164 may receive data from the left sensor 1162 and perform the functions that otherwise would be performed by an ISP on the right. The left AI processor 1166 may perform predictions for both the left and right light sources 1172 and 1112, after receiving data from the left ISP 1164 through the common bus. Thus, the left AI processor 1166 may perform functions that would otherwise have been performed by a right AI processor. The left controller 1168 controls both the left and right light sources 1172 and 1112. Thus, compared to FIG. 11A, in FIG. 11E, no sensor, ISP, controller, and AI processor are present in the right headlamp assembly.

Thus, as shown in the variations of FIGS. 11A-11E, in a headlamp assembly having light sources on both left and right sides, it is contemplated that on any one side, no sensor, ISP, AI processor, and/or controller may be present, as long as the missing component is present on the other side.

Figure 12:
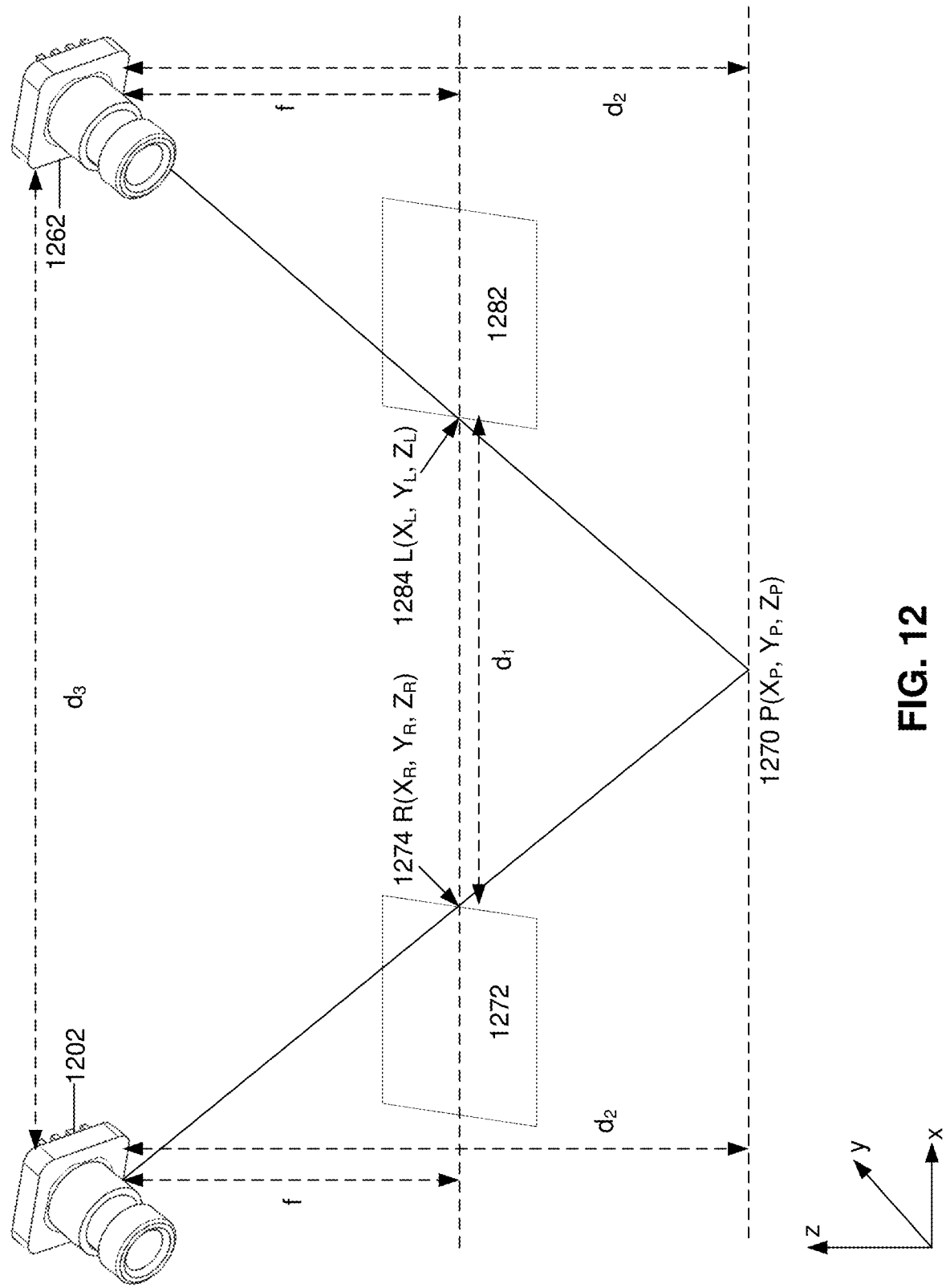
FIG. 12 illustrates an example diagram of an operational principle of a headlamp having a stereo vision feature.

FIG. 12, which may be implemented with any of the embodiments shown in FIGS. 11A-11D, illustrates an example diagram of an operational principle of a headlamp having a stereo vision feature. In FIG. 12, left and right sensors 1262 and 1202 may each have a focal length f and be separated by a baseline distance $d_3$. The left and right sensors 1262 and 1202 may be calibrated using a calibration target and acquiring images at different angles to calculate image distortion and determine a spatial relationship between the left and right sensors 1262 and 1202 The left and right sensors 1262 and 1202 may capture 2-dimensional left and right images at image planes 1282 and 1272, respectively. A point 1270 in real world, denoted as P and having coordinates $(X_P, Y_P, Z_P)$ may be projected onto the left and right image planes 1282 and 1272 at points 1284 and 1274, respectively. A distance with respect to a z-coordinate between the point 1270 and the left sensor 1262 may be $d_2$ and may be referred to as a depth. Likewise, a distance with respect to a z-coordinate between the point 1270 and the right sensor 1202 may be $d_2$. The points 1284 and 1274 may be a conjugate pair. The point 1284 may be denoted as L and have coordinates $(X_L, Y_L, Z_L)$. The point 1274 may be denoted as R and have coordinates $(X_R, Y_R, Z_R)$. Under an assumption, for simplicity, that the left and right sensors 1262 and 1202 are parallel to each other and that the coordinates $Y_L$ and $Y_R$ are the same, while the coordinates $Z_L$ and $Z_R$ are the same, a disparity, which measures a distance between the conjugate pair 1284 and 1274, may be determined according to the following:

$$X_L - X_R = d_3 * \frac{f}{d_2}. \tag{1}$$

The depth $d_2$ may be obtained according to:

$$d_2 = \frac{d_3 * f}{X_L - X_R}. \tag{2}$$

Figure 13:
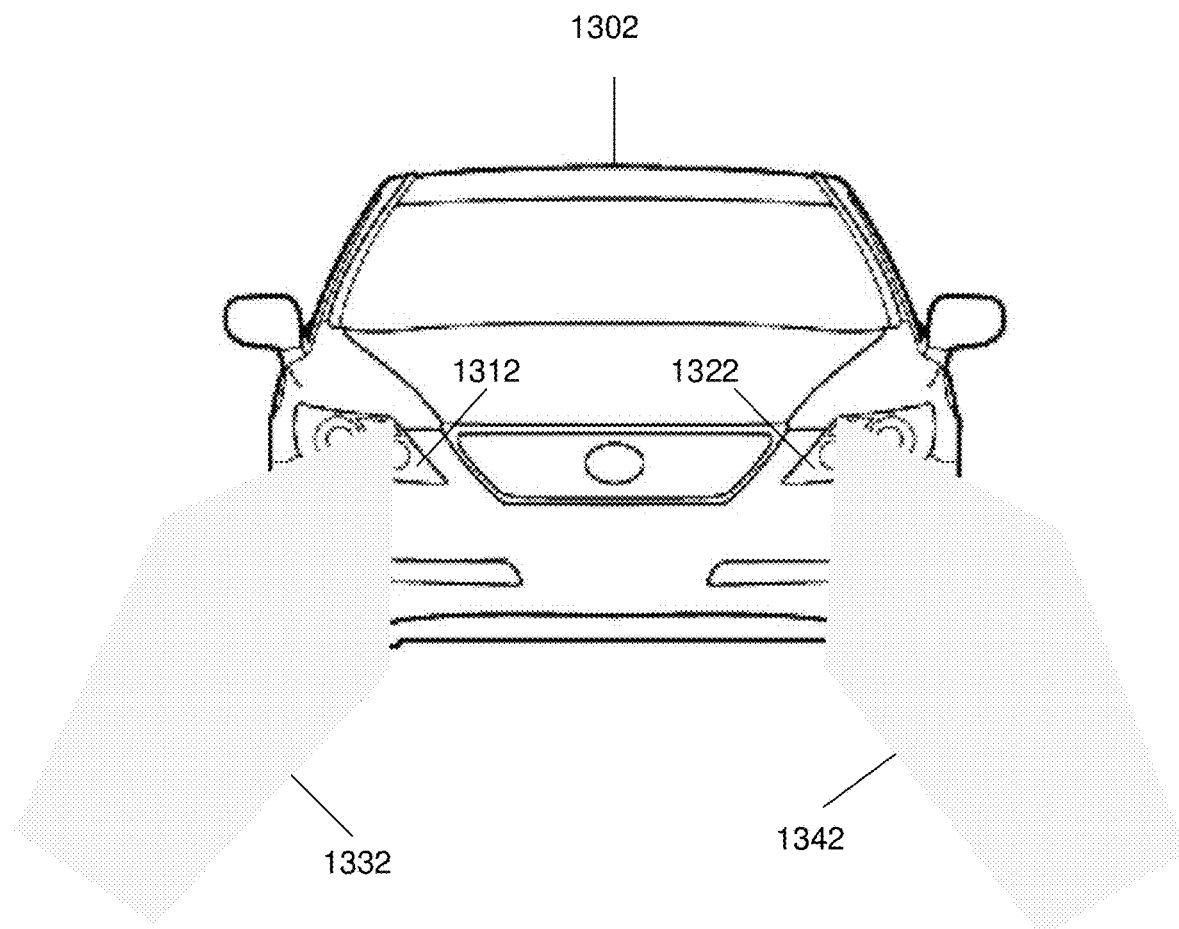
FIGS. 13-15, 16A-16B, and 17-24 illustrate example implementations of a left and right headlamp assembly.

FIGS. 13-15, 16A-16B, and 17-24 illustrate example implementations of a left and right headlamp assembly, which may be implemented with any headlamp assemblies previously described. In FIG. 13, a vehicle 1302 may include a right headlamp 1312 and a left headlamp 1322, which may emit a profile 1332 and a profile 1342 of light, respectively. The right headlamp 1312 may be implemented as any of the headlamp assemblies 100, 200, 300, 400, 900, or 1000. The left headlamp may be implemented as any of the headlamp assemblies 500, 600, 700, 800, 960, or 1060. The profile 1332 and the profile 1342 may indicate properties and parameters of the emitted light, including a direction and field of view of the emitted light with respect to a lateral, or x-y plane, which is parallel to a level road, and with respect to an elevational or z-axis, an intensity, a duty cycle which may indicate a proportion of time that the light is actually emitted, and a particular pattern of the emitted light, which may indicate particular directions or fields of view having increased intensity. An AI processor corresponding to each headlamp, as described previously, may obtain and output predictions of how the properties and parameters should be changed in response to conditions of surroundings, and a controller may change and control the properties and parameters based at least in part on the predictions from the AI processor. The foregoing description illustrates some examples of how the properties and parameters may be changed, for example, based on a predicted navigation path or lane that the vehicle 1302 is travelling in or changing to, and/or other factors.

Figure 14:
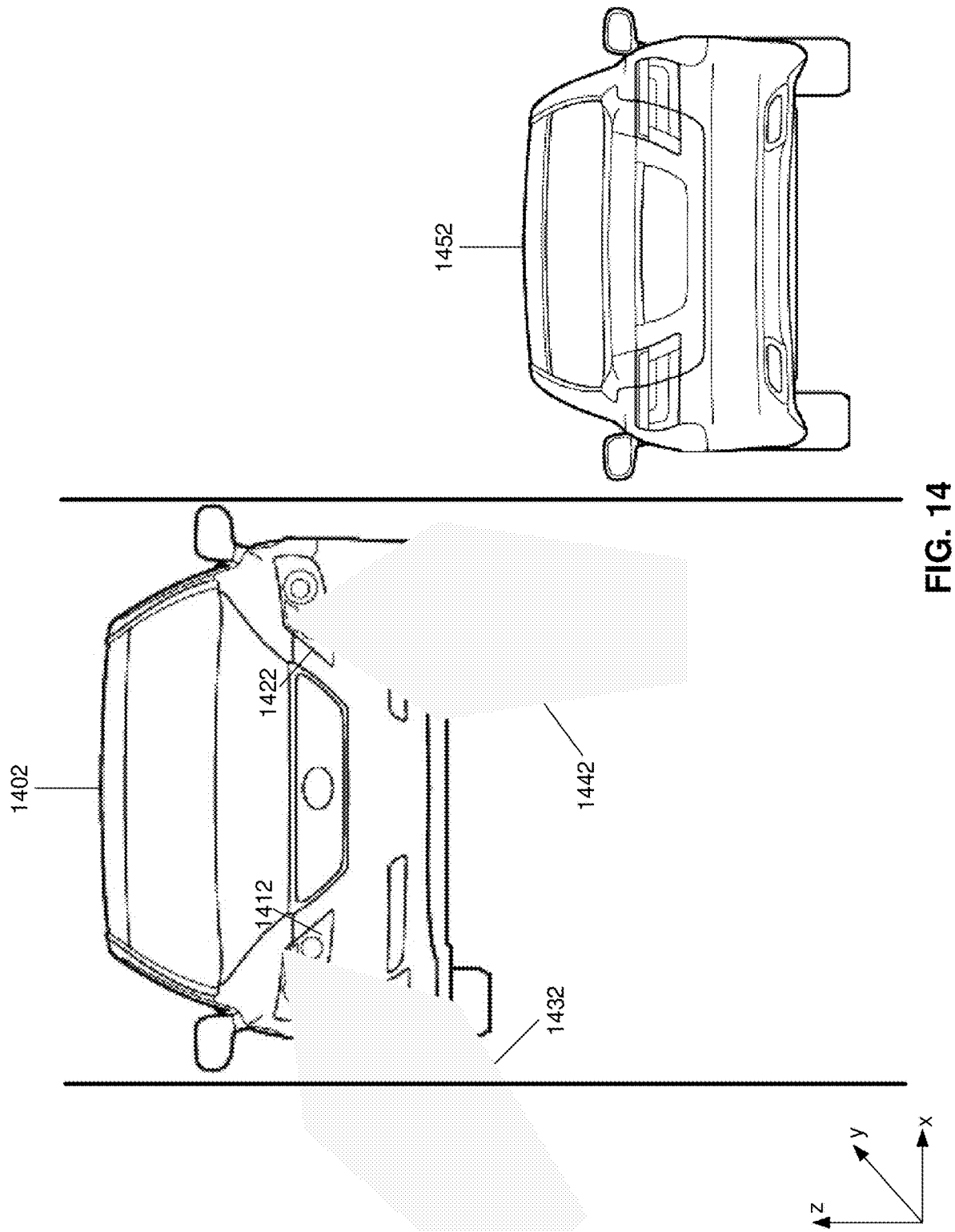

FIGS. 14, 15, 16A, and 16B illustrates how a headlamp may avoid blinding vehicles on an opposite side of a road. In FIG. 14, a vehicle 1402 may include a right headlamp 1412 and a left headlamp 1422, in which respective profiles 1432 and 1442 may be adjusted or changed as a result of an AI processor detecting or predicting a presence of a vehicle 1452 on the opposite side. In some embodiments, if the AI processor predicts or detects that the vehicle 1452 is not moving in a direction towards the vehicle 1402, the corresponding AI processors of the right headlamp 1412 and the left headlamp 1422 may predict or determine that the profiles 1432 and 1442 be unchanged and/or that the emitted light not be decreased in intensity and/or duty cycle with respect to the profiles 1332 and 1342. If the AI processor predicts or detects that the vehicle 1452 is moving in a direction towards the vehicle, the corresponding AI processor of the left headlamp 1422 may predict or determine that a field of view of the emitted light from the left headlamp 1422 and indicated by the profile 1442 should be adjusted or rotated laterally so that the profile 1442 does not coincide with a current or predicted path of the vehicle 1452. The corresponding AI processor of the right headlamp 1412 may perform a same or similar operation but may not be able to capture or detect the vehicle 1452, and/or determine that the light emitted from the right headlamp 1412 does not coincide with a path of the vehicle 1452 and thus determine to make no change. However, despite the AI processor determining to make no change to the profile 1432, the profile 1432 may still be adjusted or rotated laterally in accordance with the synchronization process to synchronize with the change in the profile 1442, as described in the process of FIG. 5B or FIG. 6B. For example, the field of view of the emitted light indicated by the profile 1432 from the right headlamp 1412 may be adjusted by a fraction of the amount of adjustment of the field of view of the emitted light from the left headlamp 1422.

In some embodiments, the AI processor may determine or predict an amount by which the field of view of the emitted light from the left headlamp 1422 is adjusted based on a density or number of vehicles on the opposite side. For example, a higher the density or the number of vehicles on the opposite side, a higher the predicted or determined amount of adjustment.

Figure 15:
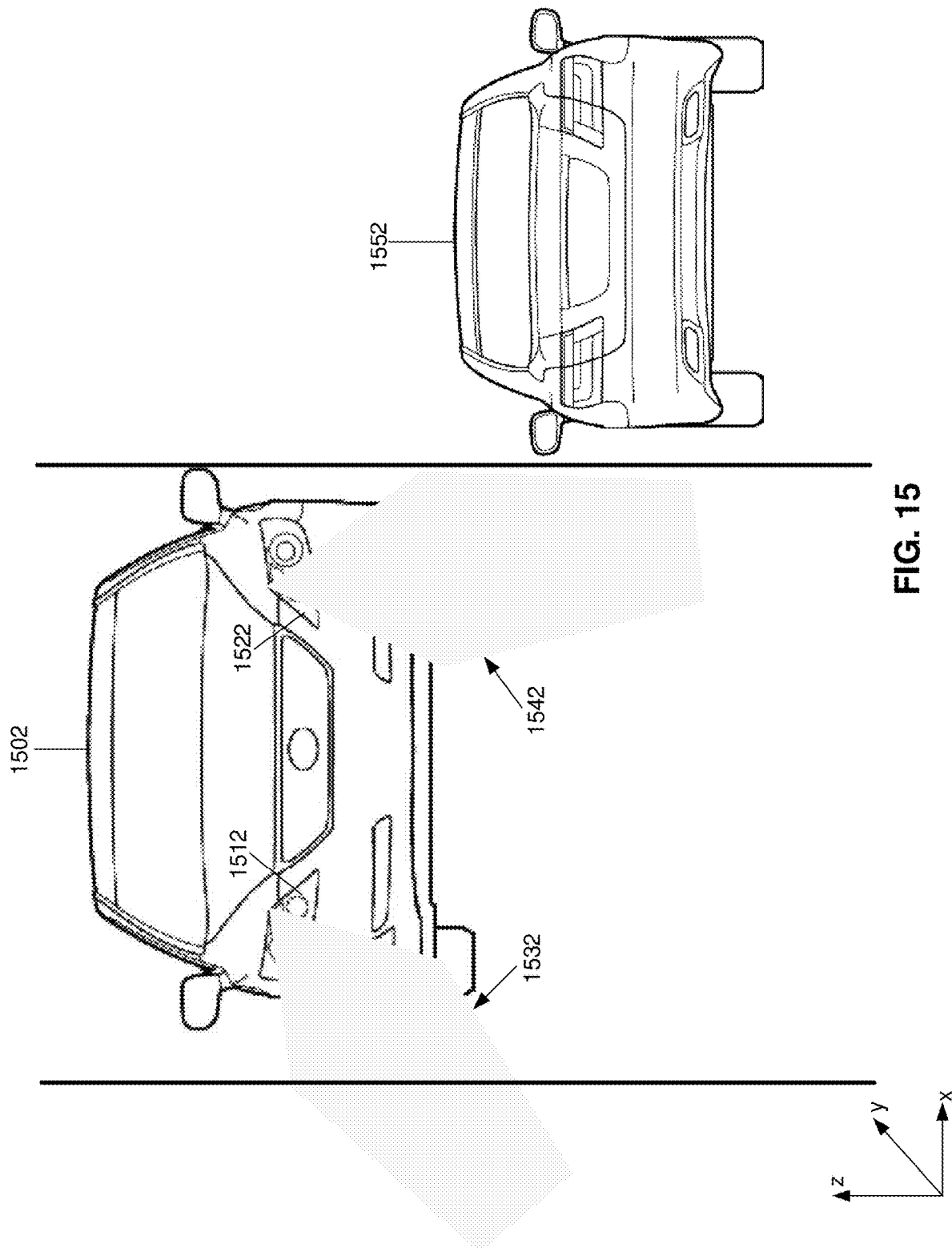

In FIG. 15, a vehicle 1502 may include a right headlamp 1512 and a left headlamp 1522, in which respective profiles 1532 and 1542 may be adjusted or changed as a result of an AI processor detecting or predicting a presence of a vehicle 1552 on the opposite side. In addition or instead of the lateral adjustment as shown in FIG. 14, the corresponding AI processor of the left headlamp 1522 may predict or determine that a field of view of the emitted light from the left headlamp 1522 and indicated by the profile 1542 should be adjusted or rotated elevationally downward so that the profile 1542 is directed closer to the ground and reduces a blinding effect on the vehicle 1552. The corresponding AI processor of the right headlamp 1512 may perform a same or similar operation but may not be able to capture or detect the vehicle 1552, and/or determine that the light emitted from the right headlamp 1512 does not coincide with a path of the vehicle 1552 and thus determine to make no change. However, despite the AI processor determining to make no change to the profile 1532, the profile 1532 may still be adjusted or rotated laterally in accordance with the synchronization process to synchronize with the change in the profile 1542, as described in the process of FIG. 5B or FIG. 6B. For example, the field of view of the emitted light indicated by the profile 1532 from the right headlamp 1512 may be adjusted by a fraction of the amount of adjustment of the field of view of the emitted light from the left headlamp 1522.

In some embodiments, the AI processor may determine or predict an amount by which the field of view of the emitted light from the left headlamp 1522 is adjusted based on a density or number of vehicles on the opposite side. For example, a higher the density or the number of vehicles on the opposite side, a higher the predicted or determined amount of adjustment.

Figure 16A:
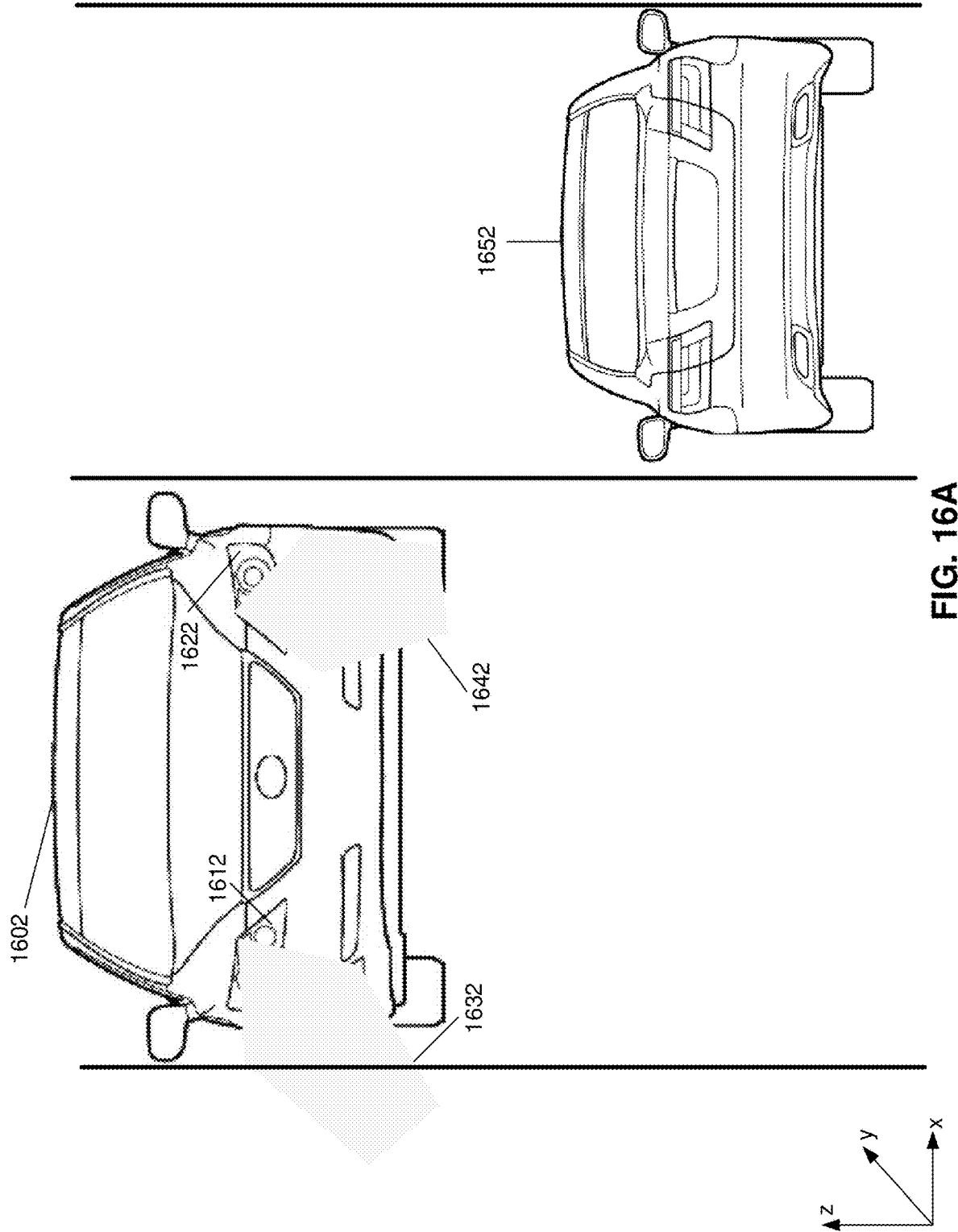

In FIG. 16A, a vehicle 1602 may include a right headlamp 1612 and a left headlamp 1622, in which respective profiles 1632 and 1642 may be adjusted or changed as a result of an AI processor detecting or predicting a presence of a vehicle 1652 on the opposite side. The corresponding AI processor of the left headlamp 1622 may, in addition or instead of the operations in FIG. 14 and FIG. 15, predict or determine to decrease an intensity and/or a duty cycle of the emitted light from the left headlamp 1622 and indicated by the profile 1642. The corresponding AI processor of the right headlamp 1612 may perform a same or similar operation but may not be able to capture or detect the vehicle 1652, and/or determine that the light emitted from the right headlamp 1612 does not coincide with a path of the vehicle 1652 and thus determine to make no change. However, despite the AI processor determining to make no change to the profile 1632, the profile 1632 may still be adjusted or rotated laterally in accordance with the synchronization process to synchronize with the change in the profile 1642, as described in the process of FIG. 5B or FIG. 6B. For example, the intensity of the emitted light from the right headlamp 1612 may also be reduced by a fraction or a same amount as the reduction in intensity of the emitted light from the left headlamp 1642.

In some embodiments, the AI processor may determine or predict an amount by which the intensity and/or duty cycle of the emitted light from the left headlamp 1622 is adjusted based on a density or number of vehicles on the opposite side. For example, a higher the density or the number of vehicles on the opposite side, a higher the predicted or determined amount of adjustment in intensity and/or duty cycle.

Figure 16B:
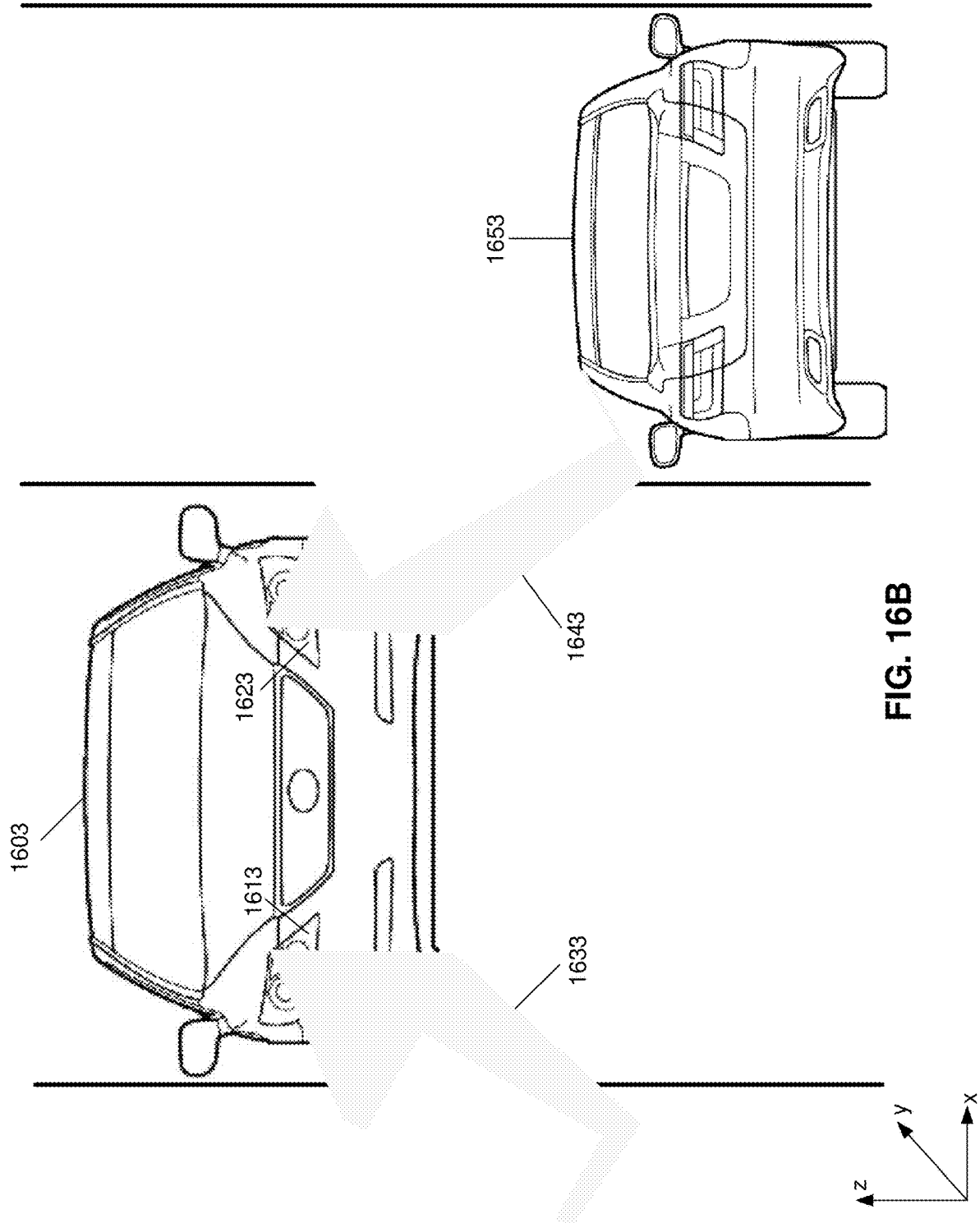

In FIG. 16B, an intensity or duty cycle of a portion of the emitted light, such as individual beams of the emitted light, may be adjusted. In FIG. 16B, a vehicle 1603 may include a right headlamp 1613 and a left headlamp 1623, in which respective profiles 1633 and 1643 emitted by the right headlamp 1613 and the left headlamp 1623 may be adjusted or changed as a result of an AI processor detecting or predicting a presence of a vehicle 1653 on the opposite side. The corresponding AI processor of the left headlamp 1623 may, in addition or instead of the operations in FIG. 14 and FIG. 15, predict or determine to decrease an intensity and/or a duty cycle of a portion of the emitted light indicated by the profile 1643, while keeping other portions or beams of the emitted light unchanged. The corresponding AI processor of the right headlamp 1613 may perform a same or similar operation but may not be able to capture or detect the vehicle 1653, and/or determine that the light emitted from the right headlamp 1613 does not coincide with a path of the vehicle 1653 and thus determine to make no change. However, despite the AI processor determining to make no change to the profile 1633, the profile 1633 may still be adjusted or rotated laterally in accordance with the synchronization process to synchronize with the change in the profile 1643, as described in the process of FIG. 5B or FIG. 6B. A portion of the profile 1633 may be also adjusted in intensity and/or duty cycle in accordance with the synchronization process as described in FIG. 5B or FIG. 6B.

Figure 17:
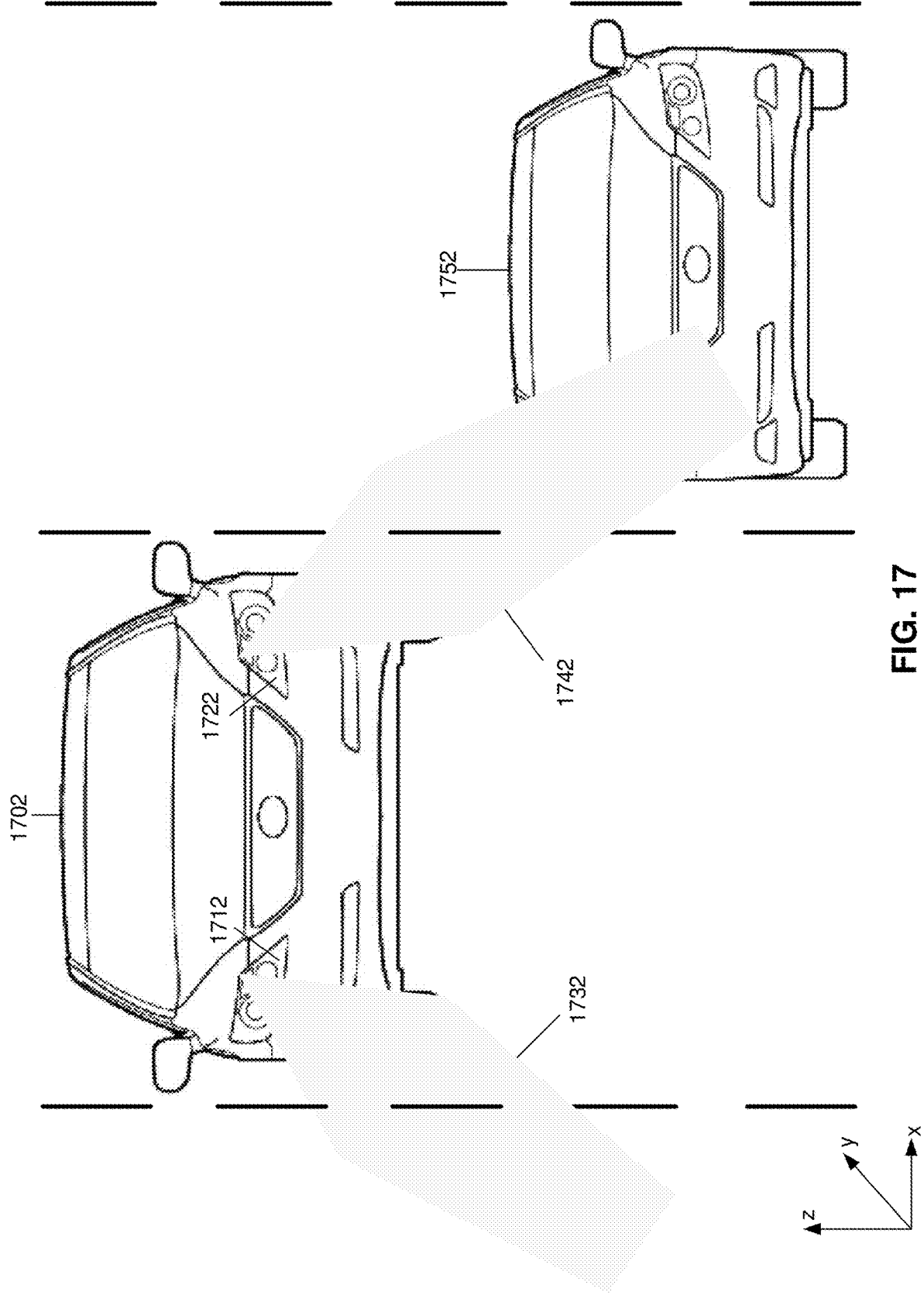

FIG. 17 illustrates how a headlamp may illuminate objects such as vehicles travelling in a same direction. In FIG. 17, a vehicle 1702 may include a right headlamp 1712 and a left headlamp 1722, in which respective profiles 1732 and 1742 may be adjusted or changed as a result of an AI processor detecting or predicting a presence of a vehicle 1752 on the opposite side. In some embodiments, the corresponding AI processor of the left headlamp 1722 may predict or determine that a field of view of the emitted light from the left headlamp 1722 and indicated by the profile 1742 should be adjusted or rotated laterally and/or be increased in intensity and/or duty cycle so that the profile 1742 illuminates the vehicle 1752. The corresponding AI processor of the right headlamp 1712 may perform a same or similar operation but may not be able to capture or detect the vehicle 1752, and/or determine that the light emitted from the right headlamp 1712 does not coincide with a path of the vehicle 1752 and thus determine to make no change. However, despite the AI processor determining to make no change to the profile 1732, the profile 1732 may still be adjusted or rotated laterally in accordance with the synchronization process to synchronize with the change in the profile 1742, as described in the process of FIG. 5B or FIG. 6B. The profile 1732 may also be adjusted or rotated laterally and/or be increased in intensity and/or duty cycle in accordance with the synchronization process as described in FIG. 5B or FIG. 6B. For example, the field of view of the emitted light indicated by the profile 1732 from the right headlamp 1712 may be adjusted by a fraction of the amount of adjustment of the field of view of the emitted light from the left headlamp 1722.

In some embodiments, the AI processor may determine or predict an amount by which the field of view of the emitted light from the left headlamp 1722 is adjusted, and/or an adjustment in intensity and/or duty cycle, based on a density or number of vehicles on the opposite side. For example, a higher the density or the number of vehicles on the opposite side, a higher the predicted or determined amount or adjustment. In some embodiments, if the determined or predicted adjustment of the field of view or the intensity also potentially results in blinding opposing vehicles moving toward the vehicle 1702, the AI processor may determine to reduce the amount of adjustment or the increase in intensity, or entirely eliminate the adjustment or the increase in intensity.

Figure 18:
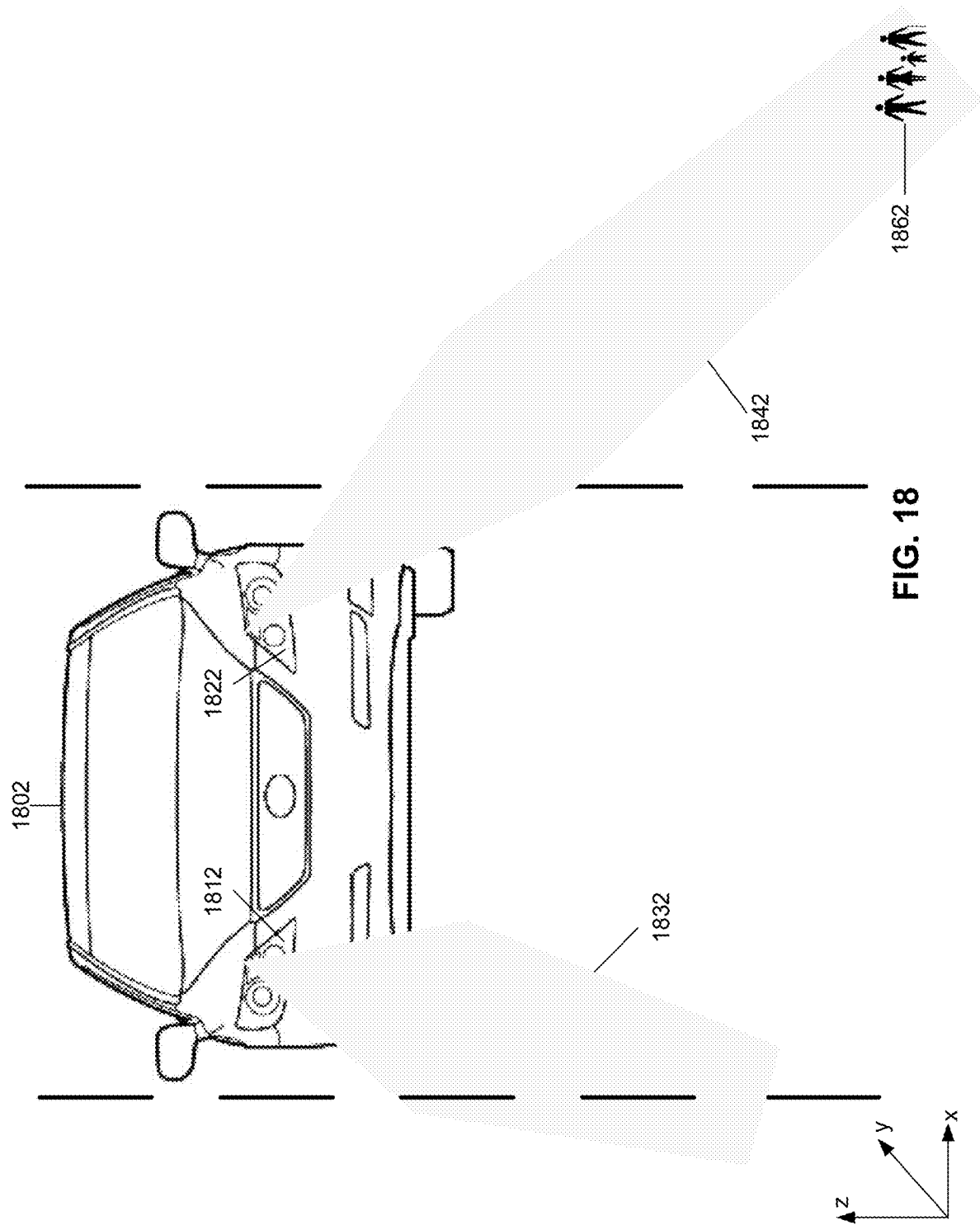

FIG. 18 illustrates how a headlamp may illuminate objects such as pedestrians. In FIG. 18, a vehicle 1802 may include a right headlamp 1812 and a left headlamp 1822, in which respective profiles 1832 and 1842 may be adjusted or changed as a result of an AI processor detecting or predicting a presence of a pedestrian 1862 on the opposite side. In some embodiments, the corresponding AI processor of the left headlamp 1822 may predict or determine that a field of view of the emitted light from the left headlamp 1822 and indicated by the profile 1842 should be adjusted or rotated laterally and/or be increased in intensity and/or duty cycle so that the profile 1842 illuminates the vehicle pedestrian 1862. The corresponding AI processor of the right headlamp 1812 may perform a same or similar operation but may not be able to capture or detect the vehicle 1852, and/or determine that the light emitted from the right headlamp 1812 does not coincide with a path of the vehicle 1852 and thus determine to make no change. However, despite the AI processor determining to make no change to the profile 1832, the profile 1832 may still be adjusted or rotated laterally in accordance with the synchronization process to synchronize with the change in the profile 1842, as described in the process of FIG. 5B or FIG. 6B. The profile 1832 may also be adjusted or rotated laterally and/or be increased in intensity and/or duty cycle in accordance with the synchronization process as described in FIG. 5B or FIG. 6B. For example, the field of view of the emitted light indicated by the profile 1832 from the right headlamp 1812 may be adjusted by a fraction of the amount of adjustment of the field of view of the emitted light from the left headlamp 1822.

In some embodiments, the AI processor may determine or predict an amount by which the field of view of the emitted light from the left headlamp 1822 is to be adjusted, and/or an adjustment in intensity and/or duty cycle, based on a density or number of pedestrians or other objects such as other obstacles on the opposite side. For example, a higher the density or the number of vehicles on the opposite side, a higher the predicted or determined amount or adjustment. In some embodiments, if the determined or predicted adjustment of the field of view or the intensity also potentially results in blinding opposing vehicles moving toward the vehicle 1802, the AI processor may determine to reduce the amount of adjustment or the increase in intensity, or entirely eliminate the adjustment or the increase in intensity.

Figure 19:
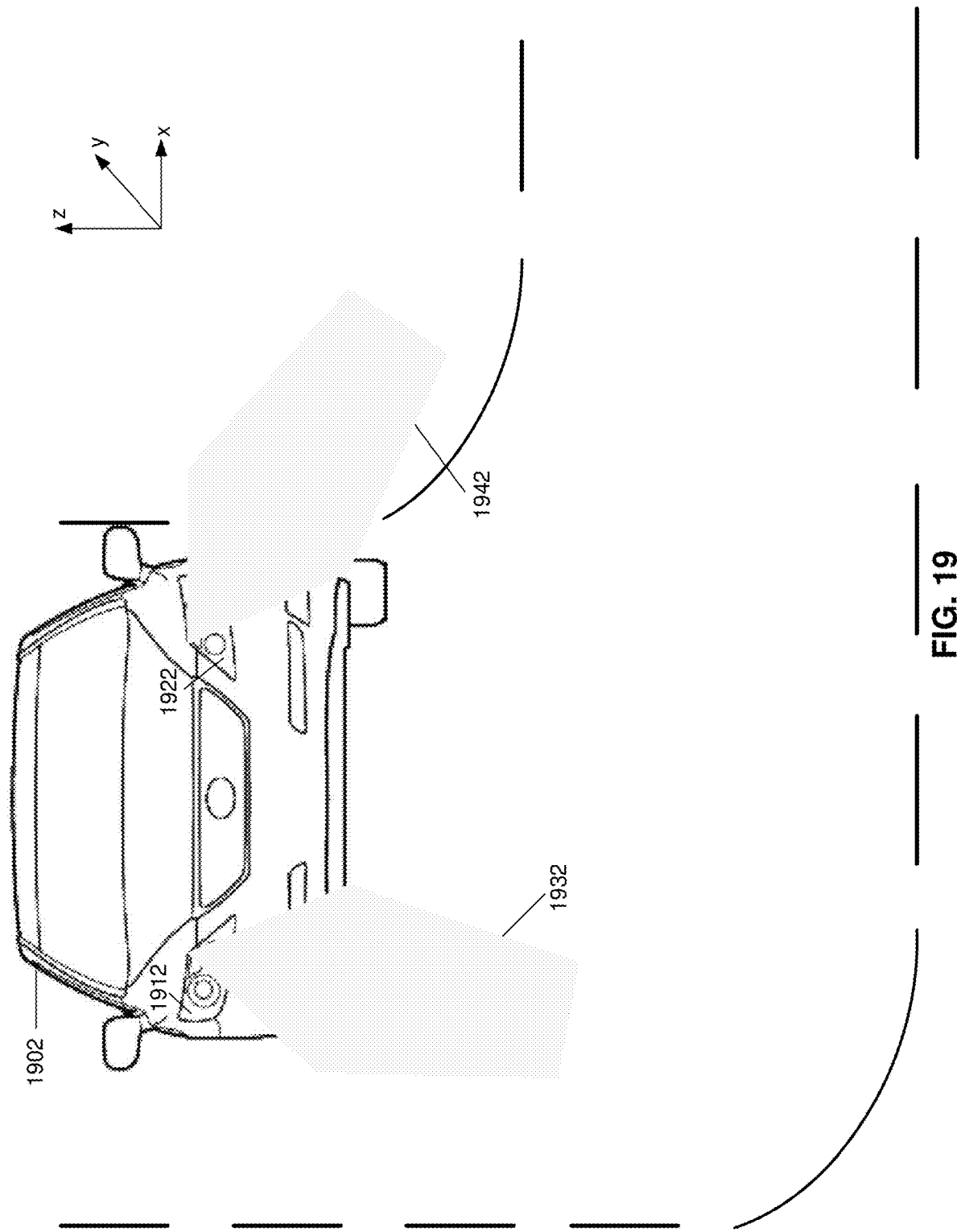

FIG. 19 illustrates how a headlamp may, based on a predicted path, adjust a direction or field of view. In FIG. 19, a vehicle 1902 may include a right headlamp 1912 and a left headlamp 1922, in which respective profiles 1932 and 1942 may be adjusted or changed as a result of a predicted change in direction of the vehicle 1902. For example, the vehicle 1902 may be approaching a left turn, and the field of view of light emitted by the right headlamp 1912 and/or the left headlamp 1922 may be laterally shifted or rotated before the left turn. In some embodiments, the corresponding AI processor of the left headlamp 1922 may predict or determine that a field of view of the emitted light from the left headlamp 1922 and indicated by the profile 1942 should be adjusted or rotated laterally to the left to illuminate an environment in a direction of the left turn. The corresponding AI processor of the right headlamp 1912 may perform a same or similar operation and adjust or rotate the emitted light from the right headlamp 1912 accordingly. The profiles 1432 and 1442 may still be further adjusted or rotated laterally in accordance with the synchronization as described in FIG. 5B or FIG. 6B.

In some embodiments, the AI processor may determine or predict an amount by which the field of view of the emitted light from the left headlamp 1822 is to be adjusted, based on a predicted angle of the left turn and/or an amount or density of traffic. In some embodiments, if the determined or predicted adjustment of the field of view also potentially results in blinding opposing vehicles moving toward the vehicle 1902, the AI processor may determine to reduce the amount of adjustment, or entirely eliminate the adjustment.

Figure 20:
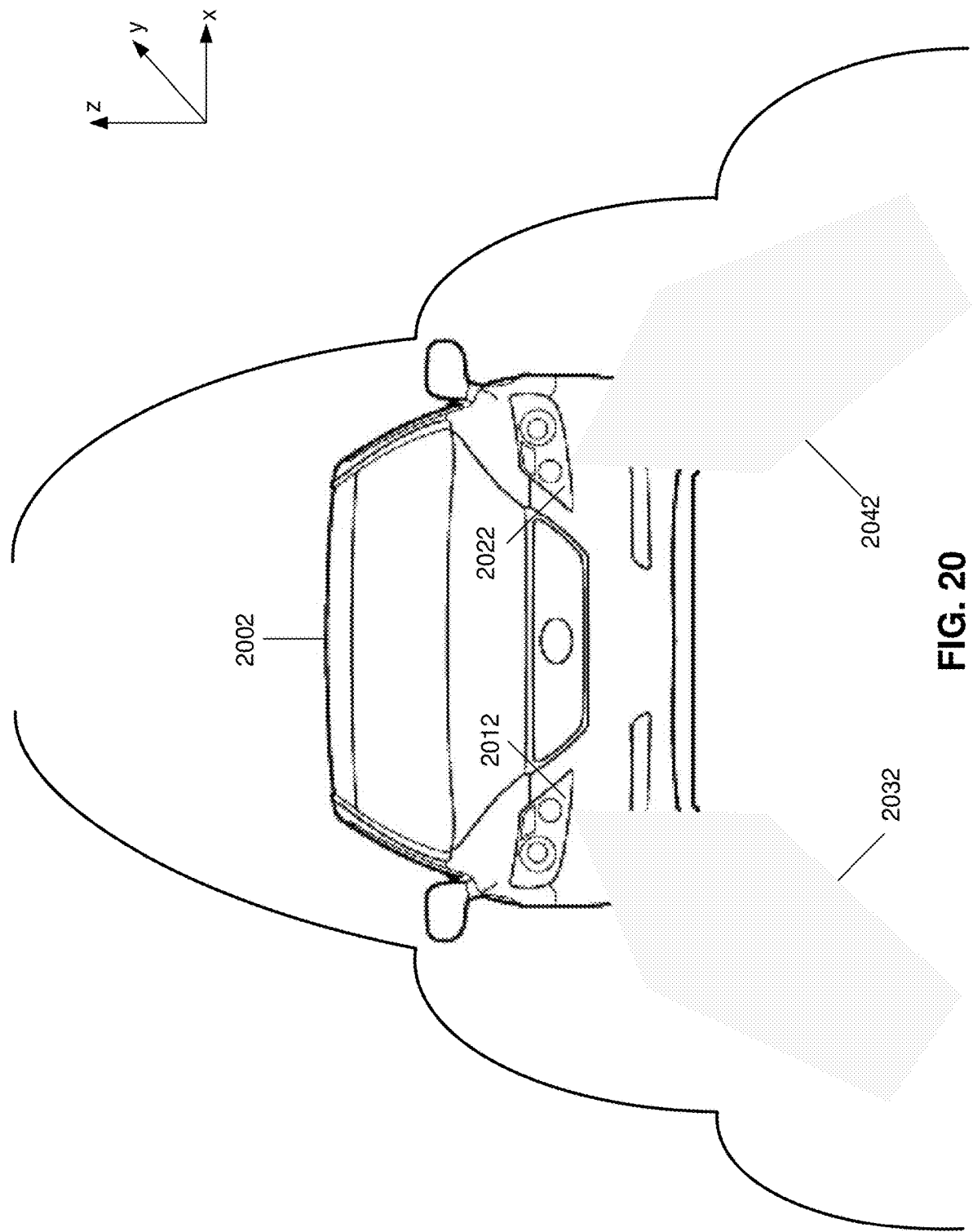
Figure 21:
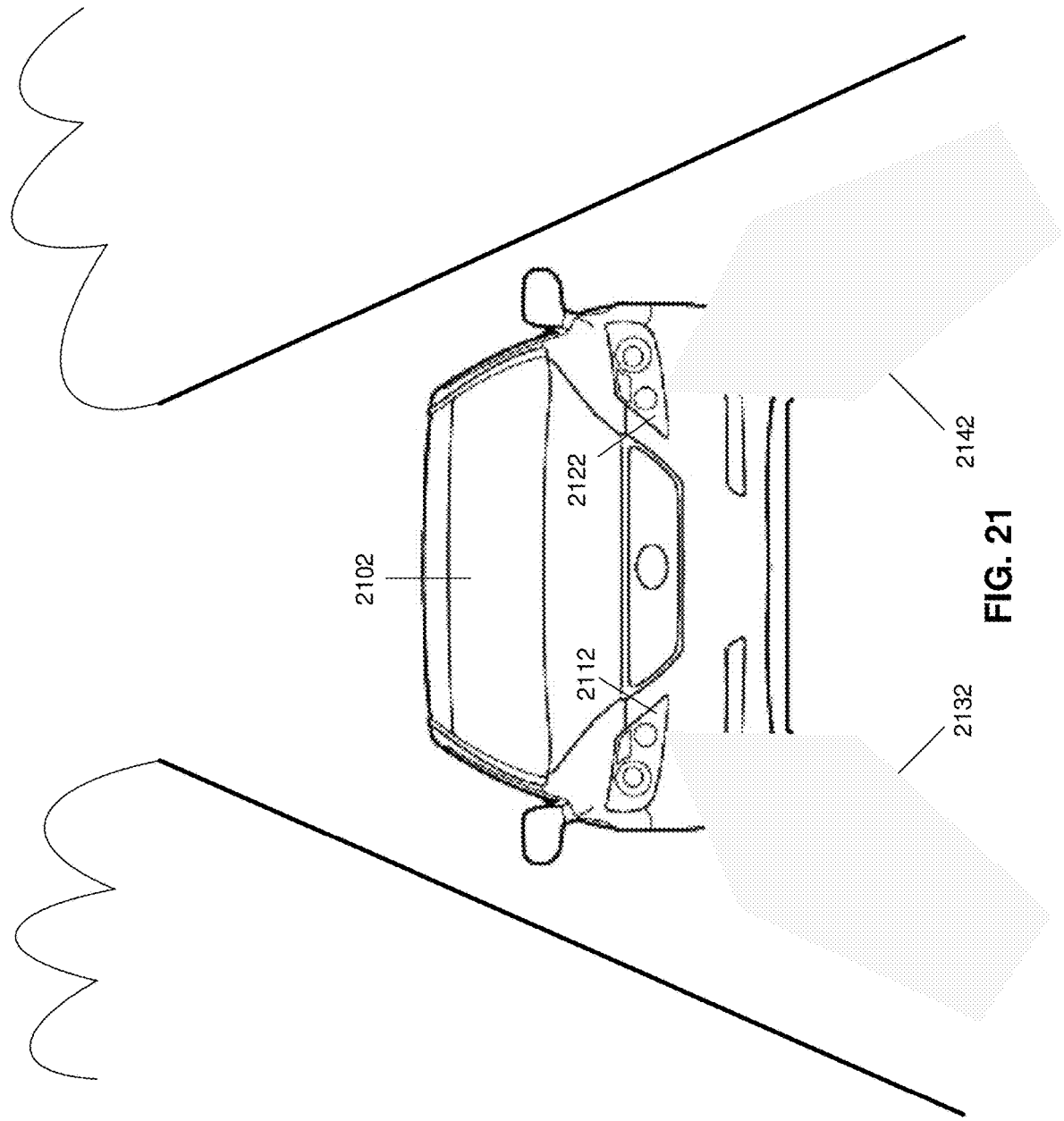
Figure 22:
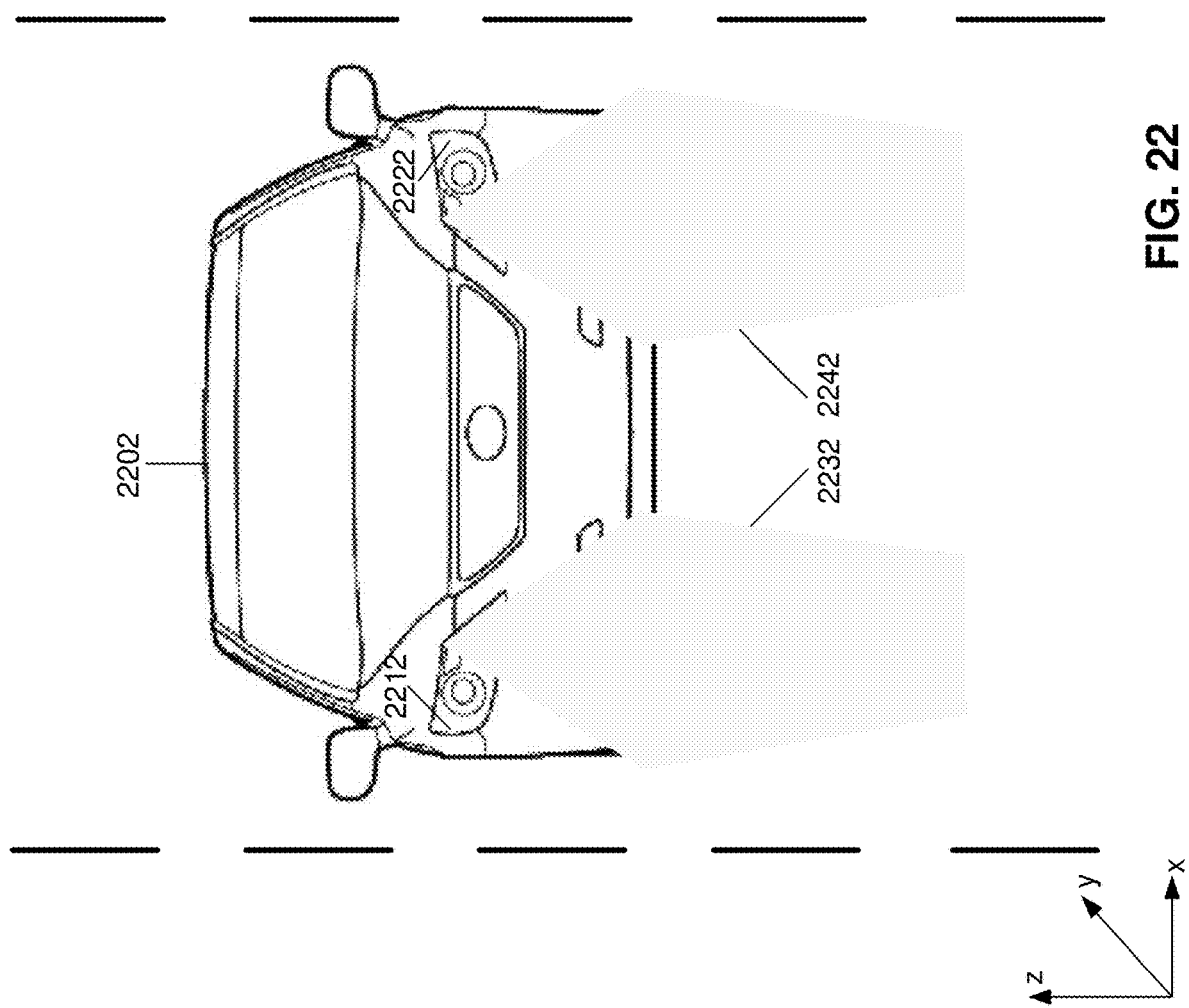

FIGS. 20-22 illustrate how a headlamp may, based on a predicted condition of the route, adjust a direction or field of view. In particular, in FIG. 20, a vehicle 2002 may be travelling on a bumpy road, for example, in which an International Roughness Index (IRI) is at least a threshold value. The vehicle 2002 may include a right headlamp 2012 and a left headlamp 2022, in which respective profiles 2032 and 2042 may be adjusted or changed as a result of a predicted IRI. In some embodiments, the corresponding AI processor of the left headlamp 2022 may predict or determine that a field of view of the emitted light from the left headlamp 2022 and indicated by the profile 2042 should be adjusted or rotated elevationally downwards to better illuminate a surface of the road. The corresponding AI processor of the right headlamp 2012 may perform a same or similar operation and determine to change the profile 2032 accordingly. The profiles 2032 and 2042 may also be further adjusted or rotated elevationally in accordance with the synchronization process as described in FIG. 5B or FIG. 6B.

In some embodiments, the AI processor may determine or predict an amount by which the field of view of the emitted light from the left headlamp 2022 is adjusted, based on the predicted IRI and/or an amount or density of traffic. For example, if the density of traffic is higher, then the amount of adjustment of the field of view may be lower so that the traffic can still be illuminated.

In FIG. 21, a vehicle 2102 may be travelling on a sloping road, for example, a downward sloping road. The vehicle 2102 may include a right headlamp 2112 and a left headlamp 2122, in which respective profiles 2132 and 2142 may be adjusted or changed as a result of a predicted slope. In some embodiments, the corresponding AI processor of the left headlamp 2122 may predict or determine that a field of view of the emitted light from the left headlamp 2122 and indicated by the profile 2142 should be adjusted or rotated elevationally downwards to match the predicted slope and better illuminate a surface of the road. Thus, if the road is sloping upwards, then the AI processor may predict or determine that a field of view of the emitted light from the left headlamp 2122 and indicated by the profile 2142 should be adjusted or rotated elevationally upwards. The corresponding AI processor of the right headlamp 2112 may perform a same or similar operation and determine to make an elevational adjustment or rotation of the field of view of light emitted from the right headlamp 2112. The profiles 2132 and 2142 may further be adjusted or rotated elevationally in accordance with the synchronization process as described in FIG. 5B or FIG. 6B.

In FIG. 22 a vehicle 2202 may be travelling on a straight road, for example, a highway. The vehicle 2202 may include a right headlamp 2212 and a left headlamp 2222, in which respective profiles 2232 and 2242 may be adjusted or changed. In some embodiments, the corresponding AI processor of the left headlamp 2222 may predict or determine that a field of view of the emitted light from the headlamp 2222 and indicated by the profile 2242 should be adjusted or rotated laterally towards a center of the vehicle 2202 if the road is straight. The corresponding AI processor of the right headlamp 2212 may perform a same or similar operation and adjust or rotate a field of view of the emitted light from the right headlamp 2212 elevationally downwards and decrease its intensity and/or duty cycle. The profiles 2232 and 2242 may also be adjusted or rotated elevationally in accordance with the synchronization process as described in FIG. 5B or FIG. 6B.

Figure 23:
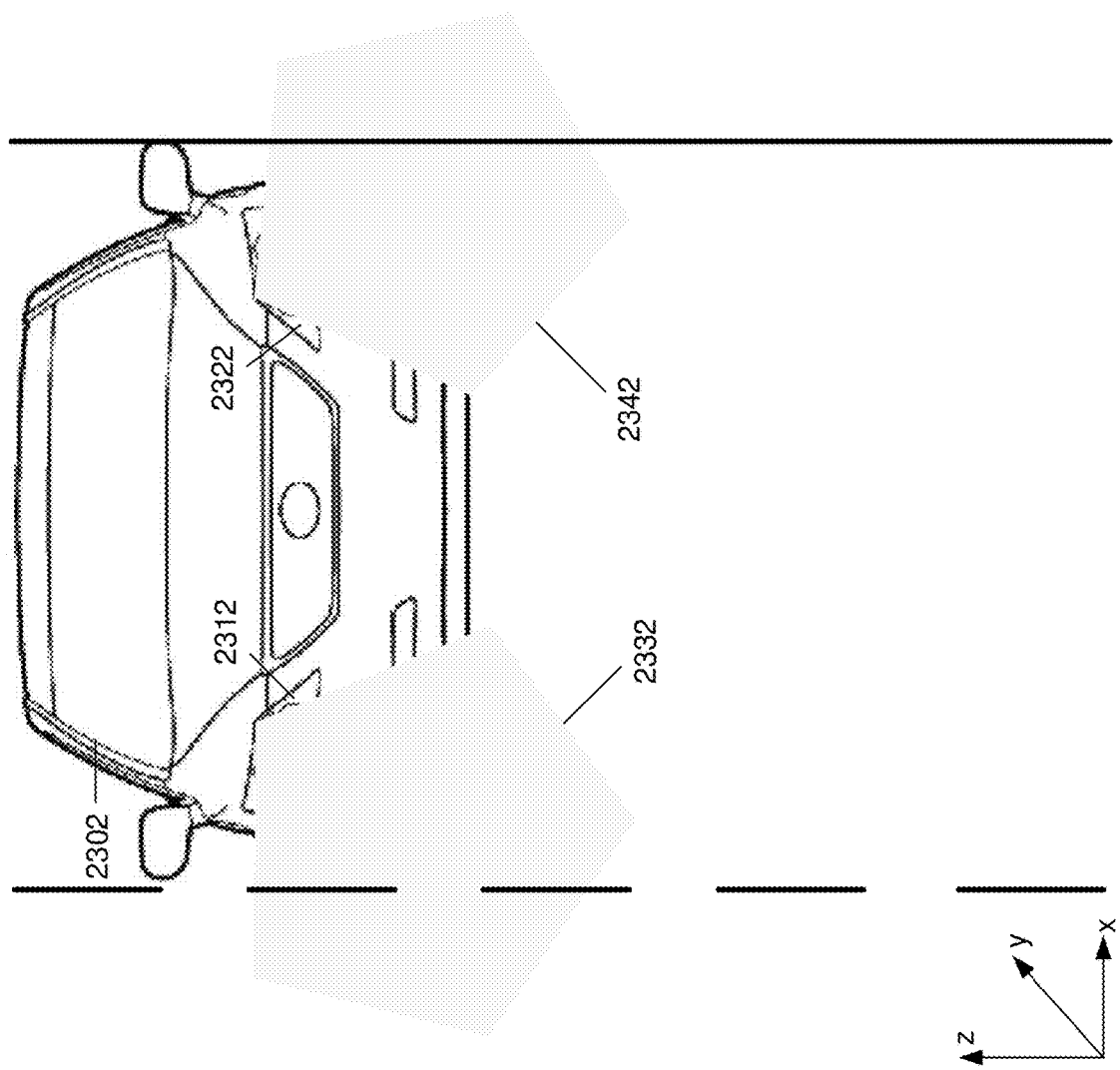

FIG. 23 illustrates how a headlamp may, in a particular driving scenario or situation, adjust a direction, field of view, intensity, and/or duty cycle of emitted light. In FIG. 23, a vehicle 2302 may be performing a parking operation. The vehicle 2302 may include a right headlamp 2312 and a left headlamp 2322, in which respective profiles 2332 and 2342 may be adjusted or changed during a parking operation. In some embodiments, the corresponding AI processor of the left headlamp 2322 may predict or determine that a field of view of the emitted light from the headlamp 2322 and indicated by the profile 2342 should be adjusted or rotated laterally to narrow the field of view and/or be decreased in intensity and/or duty cycle. These adjustments may avoid blinding other traffic and conserve energy, while signaling that the vehicle 2302 is planning to park. The corresponding AI processor of the right headlamp 2332 may perform a same or similar operation and adjust or rotate a field of view of the emitted light from the right headlamp 2332 elevationally downwards and decrease its intensity and/or duty cycle. The profile 2332 and the profile 2342 may also be further adjusted in accordance with the synchronization process as described in FIG. 5B or FIG. 6B.

In some embodiments, the amount of adjustment and/or decrease may be determined or predicted by the corresponding AI processors based on a density of traffic, including other vehicles and/or pedestrians. For example, if a density of traffic is higher, then the amount of adjustment and/or decrease may be lowered because the vehicle 2302 needs to be visible to the surrounding traffic.

Figure 24:
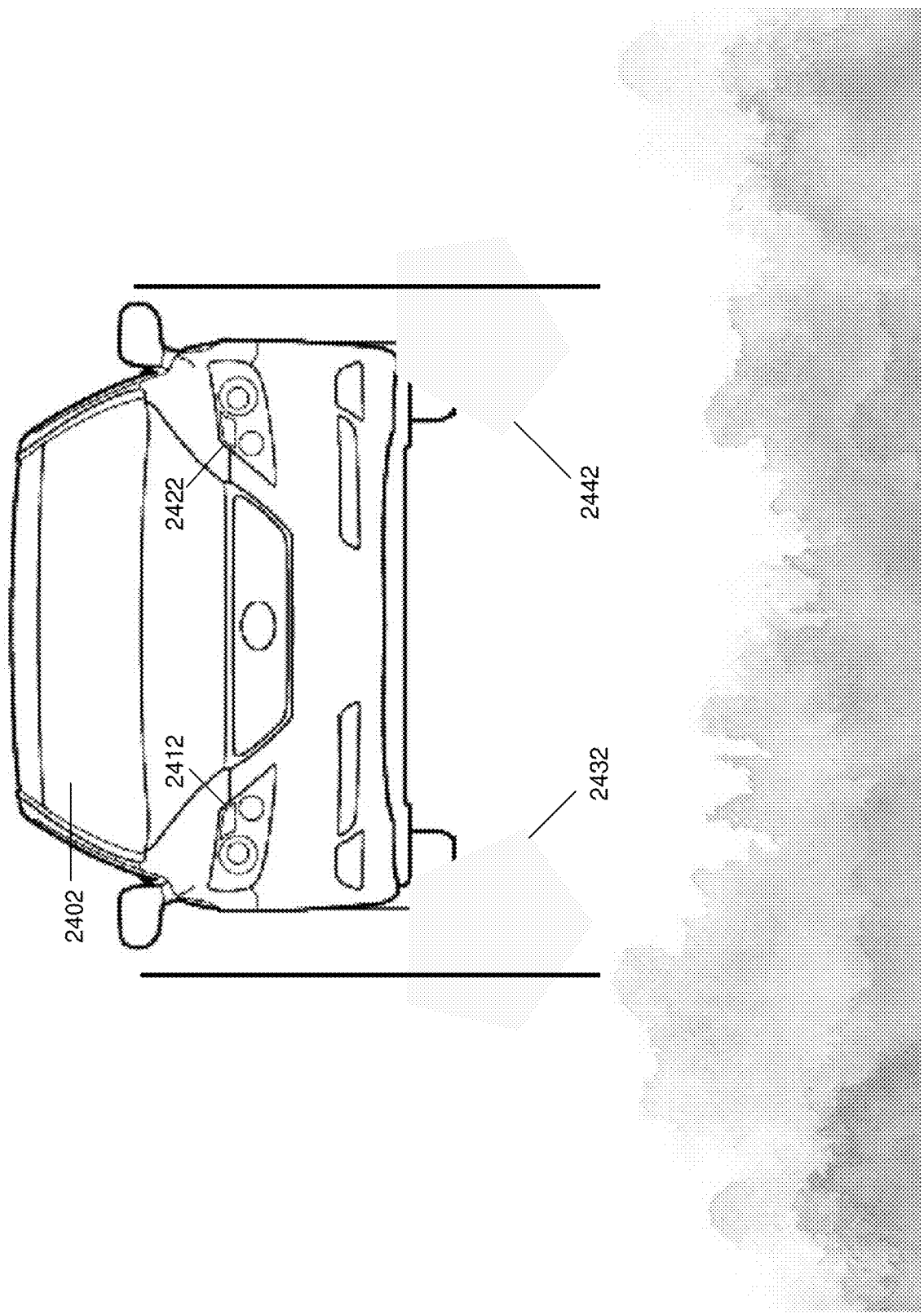

FIG. 24 illustrate how a headlamp may, in a particular environmental condition, adjust a direction, field of view, intensity, and/or duty cycle of emitted light, based on a visibility or a changing visibility condition. In FIG. 24 a vehicle 2402 may be driving in a reduced visibility condition such as fog. The vehicle 2402 may include a right headlamp 2412 and a left headlamp 2422, in which respective profiles 2432 and 2442 may be adjusted or changed. In some embodiments, the corresponding AI processor of the left headlamp 2422 may predict or determine that a field of view of the emitted light from the left headlamp 2422 and indicated by the profile 2442 should be adjusted or rotated elevationally downwards and/or be decreased in intensity and/or duty cycle. In some embodiments, the AI processor may predict or determine a distance of visibility, for example, a distance of how far objects may be detected. In some embodiments, an infrared (IR) beam may be shined to determine the distance of visibility. Based on the determined distance of visibility, the AI processor may predict that the field of view of the emitted light should shine no farther than the determined distance of visibility and accordingly reduce the intensity and/or duty cycle of the emitted light. The corresponding AI processor of the right headlamp 2412 may perform a same or similar operation and adjust or rotate a field of view of the emitted light from the right headlamp 2412 elevationally downwards and decrease its intensity and/or duty cycle. In some embodiments, the amount of adjustment and/or decrease may be determined or predicted by the corresponding AI processors based on a density of traffic, including other vehicles and/or pedestrians. For example, if a density of traffic is higher, then the amount of adjustment and/or decrease may be lowered because the vehicle 2402 needs to be visible to and illuminate the surrounding traffic. The profile 2432 and the profile 2442 may also be further adjusted in accordance with the synchronization process as described in FIG. 5B or FIG. 6B.

Figure 25:
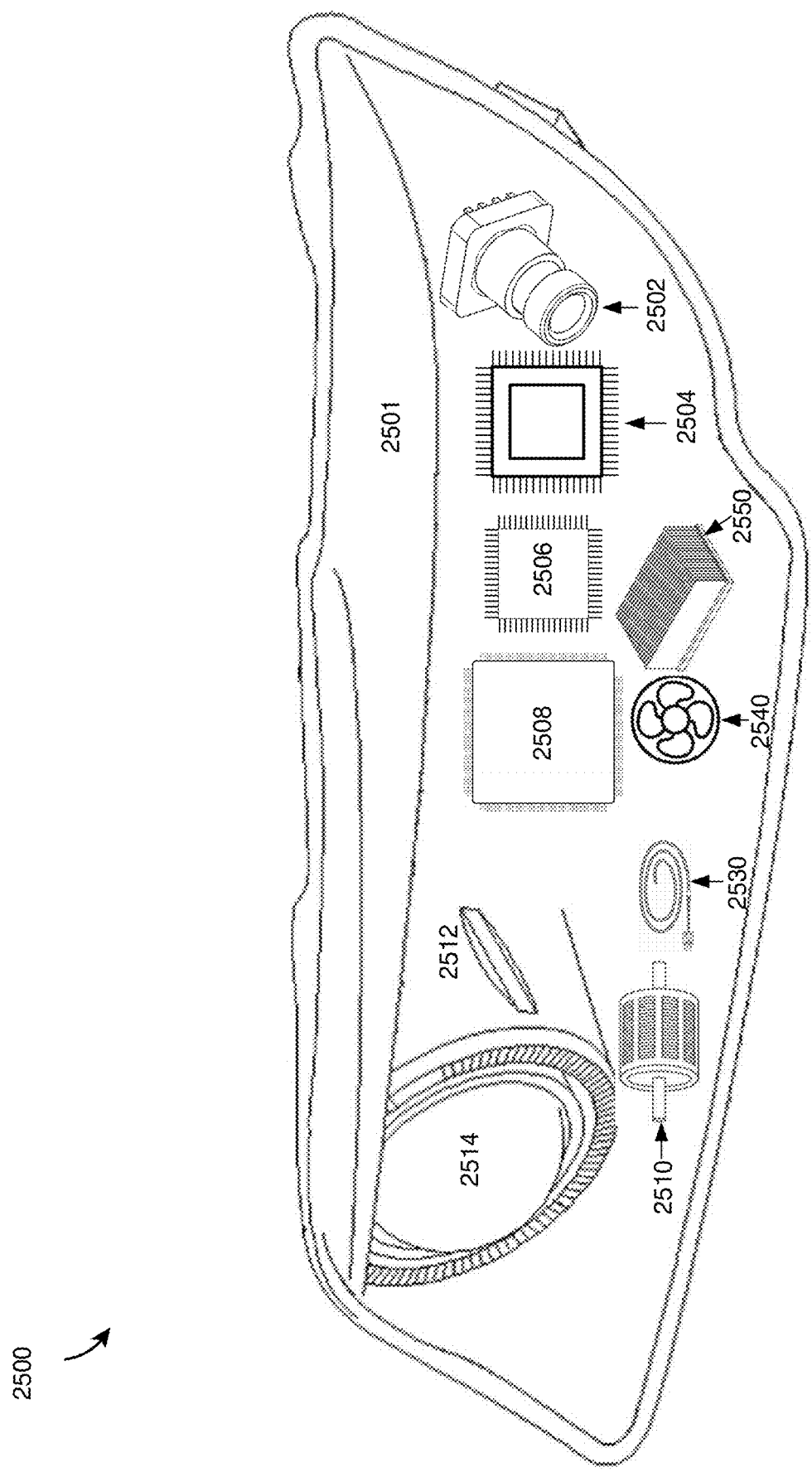
FIGS. 25-27 illustrate example diagrams of headlamp assemblies with additional components or features.
Figure 26:
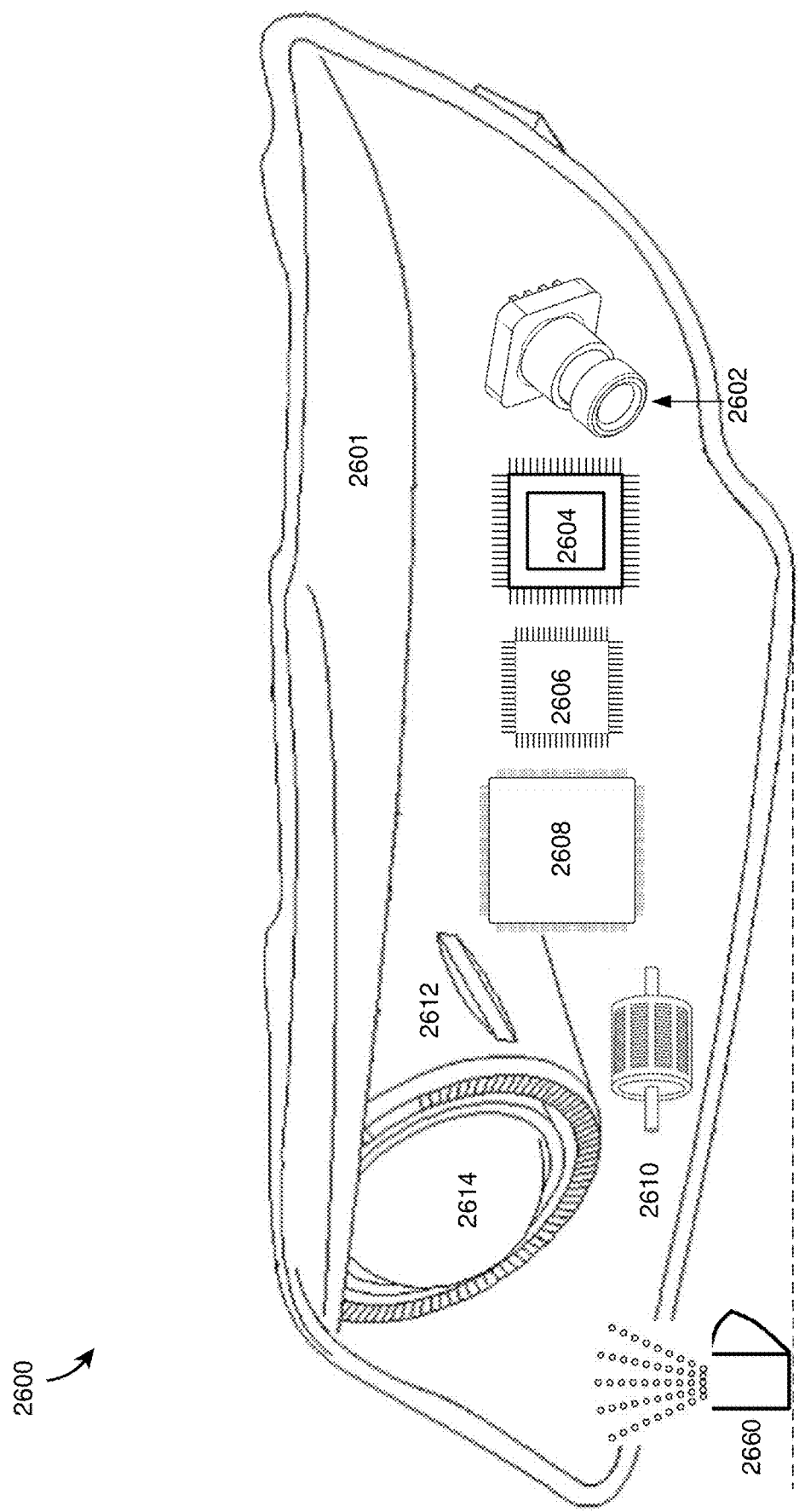
Figure 27:
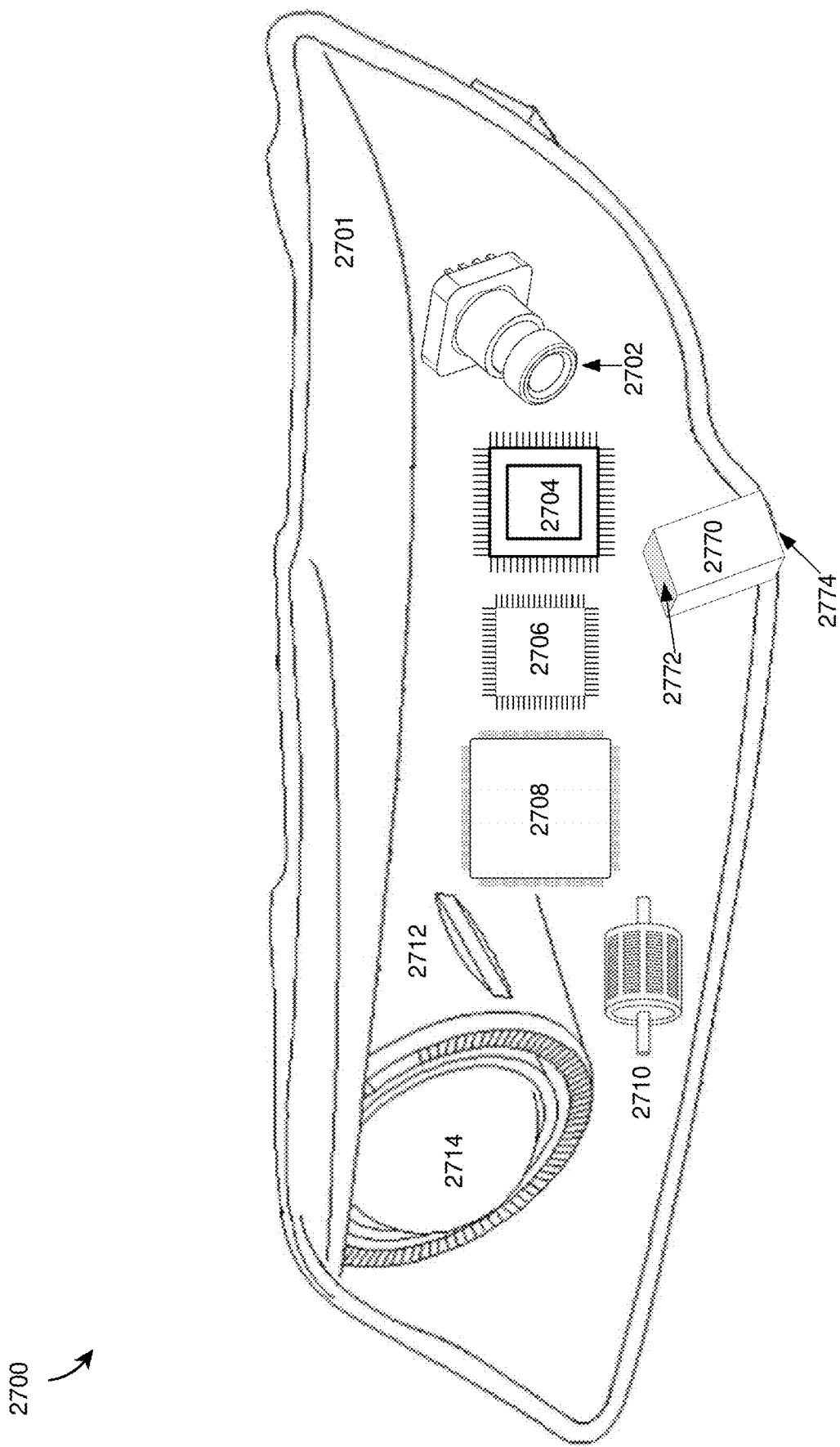

FIGS. 25-27 illustrate example diagrams of headlamp assemblies with additional components or features, and may be implemented in combination with any of the headlamp assemblies previously described, including 100, 200, 300, 400, 500, 600, 700, 800, 900, and 1100. In FIG. 25, a thermocouple, fan, and heat sink may be enclosed with a headlamp assembly 2500 in order to regulate temperature inside the headlamp assembly 2500. The headlamp assembly 2500 may include a hermetic housing or enclosure 2501 and components in an interior of the enclosure 2501. The components may include a sensor 2502 such as a camera sensor or a video camera sensor, which may include, for example, a CMOS sensor or a CCD sensor, an ISP 2504, an AI processor 2506, a controller 2508, a motor 2510, a headlight or light source 2512, and a projector 2514. These components may be implemented as previously described, and some of the components may be connected to a bus to facilitate communication, as previously described. The enclosure may also include a thermocouple 2530 that detects a temperature inside the enclosure 2501, a fan 2540 that cools the enclosure when a temperature reaches a certain threshold, and a heat sink 2550 that may be attached to the fan 2540 to divert away. Operations of the fan 2540 such as a speed, duty cycle, and/or duration of the fan 2540 may be regulated by the controller 2508. In some embodiments, the AI processor 2506 may predict an amount of cooling required based on a current temperature measured by the thermocouple 2530 and accordingly predict a speed, duration, power, and/or duty cycle of the fan 2540 to attain such an amount of cooling. The AI processor 2506 may be trained by previous inputs of temperatures and specific operational parameters of fans, and outputs of how much cooling was attained by the fans operating at the operational parameters. The controller 2508 may control the operations of the cooling based at least in part on the predictions by the AI processor.

In FIG. 26, a cleaner may be on an exterior of a headlamp assembly 2600 in order to clean a surface of the headlamp assembly 2600. The headlamp assembly 2600 may include a hermetic housing or enclosure 2601 and components in an interior of the enclosure 2601. The components may include a sensor 2602 such as a camera sensor or a video camera sensor, which may include, for example, a CMOS sensor or a CCD sensor, an ISP 2604, an AI processor 2606, a controller 2608, a motor 2610, a headlight or light source 2612, and a projector 2614. These components may be implemented as previously described, and some of the components may be connected to a bus to facilitate communication, as previously described. The enclosure may also include a cleaner 2660 that sprays water or a cleaning solution onto a surface or lens of the headlamp assembly 2600. The AI processor 2606 may analyze an image or data from the sensor 2602 and the ISP 2604 to determine whether dust and/or other particulates are present in the image or data. If the AI processor 2606 detects that a concentration of dust and/or other particulates is at least a threshold, the AI processor 2606 may predict an amount of cleaning required and accordingly predict parameters of the cleaner 2660 to attain such an amount of cleaning. The AI processor 2606 may be trained by previous inputs of dust or other particulates concentrations and cleaning parameters, and outputs of how much reduction of dust or other particulates was attained by operating under those cleaning parameters. The AI processor 2606 may predict parameters of the cleaning, such as, a duration, specific cycle, spray velocity, and/or type of solution to be applied during the cleaning. The controller 2608 may control the operations of the cleaning based at least in part on the predictions by the AI processor 2606.

In FIG. 27, a moisture remover or dehumidifier may be at least partially enclosed with a headlamp assembly 2700 in order to extract moisture away from an interior of the headlamp assembly 2700 and divert the moisture to the atmosphere, to reduce humidity and condensation within the headlamp assembly 2700. The headlamp assembly 2700 may include a hermetic housing or enclosure 2701 and components in an interior of the enclosure 2701. The components may include a sensor 2702 such as a camera sensor or a video camera sensor, which may include, for example, a CMOS sensor or a CCD sensor, an ISP 2704, an AI processor 2706, a controller 2708, a motor 2710, a headlight or light source 2712, and a projector 2714. These components may be implemented as previously described, and some of the components may be connected to a bus to facilitate communication, as previously described. The enclosure may also include a moisture remover or dehumidifier 2770 that removes moisture from an interior of the headlamp assembly 2700. The moisture remover or dehumidifier 2770 may include a surface 2772 within the interior of the enclosure 2701. The surface 2772 may include a semipermeable membrane. The moisture remover or dehumidifier 2770 may include a desiccant and a pump inside the moisture remover 2770 that, when turned on, extracts moisture from interior of the enclosure 2701. In some examples, a gate at the surface 2772 may be opened to extract the moisture to extract the moisture. A second surface 2774 may be exposed to the atmosphere and allow the moisture to be released into the atmosphere and/or to equalize pressure in the headlamp assembly 2700. In some examples, a gate at the second surface may expel the moisture to the atmosphere while the gate at the surface 2772 is closed. In some embodiments, the AI processor 2706 may predict operating parameters of the moisture remover or dehumidifier 2770 that should be implemented based on a moisture level inside of the enclosure 2701. The AI processor 2706 may be trained by previous inputs of moisture levels and specific operational parameters of the moisture remover, and outputs of how much moisture decrease was attained by the moisture remover operating at the operational parameters. The operational parameters may include at least, a duration, specific cycle, and/or amount of force exerted to remove moisture. In some examples, the operational parameters may be adjusted based on an amount of available desiccant inside the moisture remover or dehumidifier 2770. The controller 2708 may control the operations of the moisture removal or dehumidification based at least in part on the predictions by the AI processor 2706.

Figure 28:
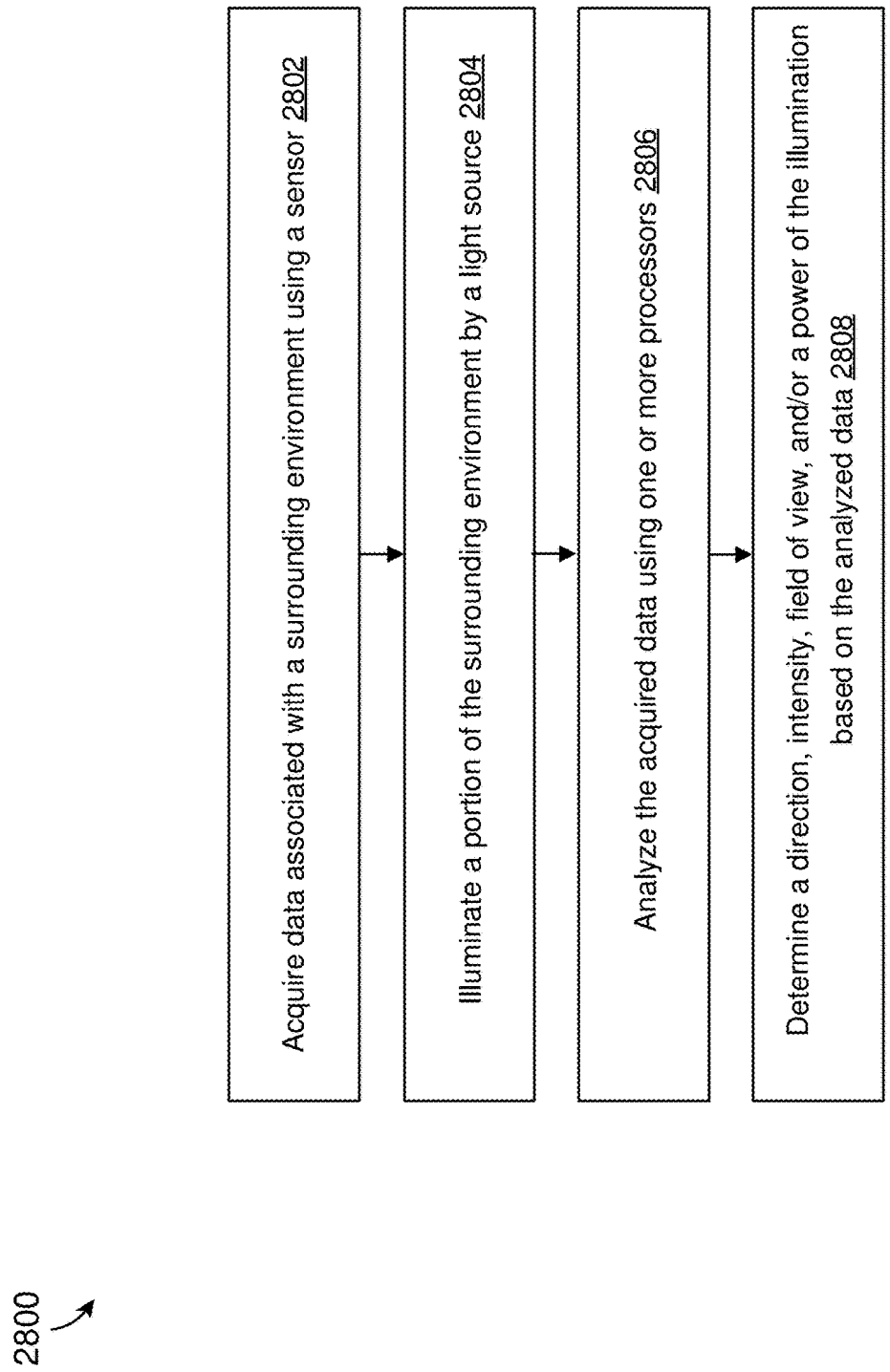
FIG. 28 illustrates a flowchart of an example of a method in accordance with the aforementioned disclosures.

FIG. 28 illustrates a flowchart of a method according to some embodiments. In this and other flowcharts, the flowchart 2800 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 28.

In step 2802, a sensor encapsulated or enclosed within a headlamp assembly may Acquire data associated with a surrounding environment. In step 2804, a light source may illuminate a portion of the surrounding environment. In step 2806, one or more processors may analyze the acquired data using one or more processors. In step 2808, one or more processors may determine a direction, intensity, field of view, and/or a power of the illumination based on the analyzed data. In some embodiments, the one or more processors may determine a change in the direction, intensity, field of view, and/or the power of the illumination based on the analyzed data.

The techniques described herein, for example, are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination.

Figure 29:
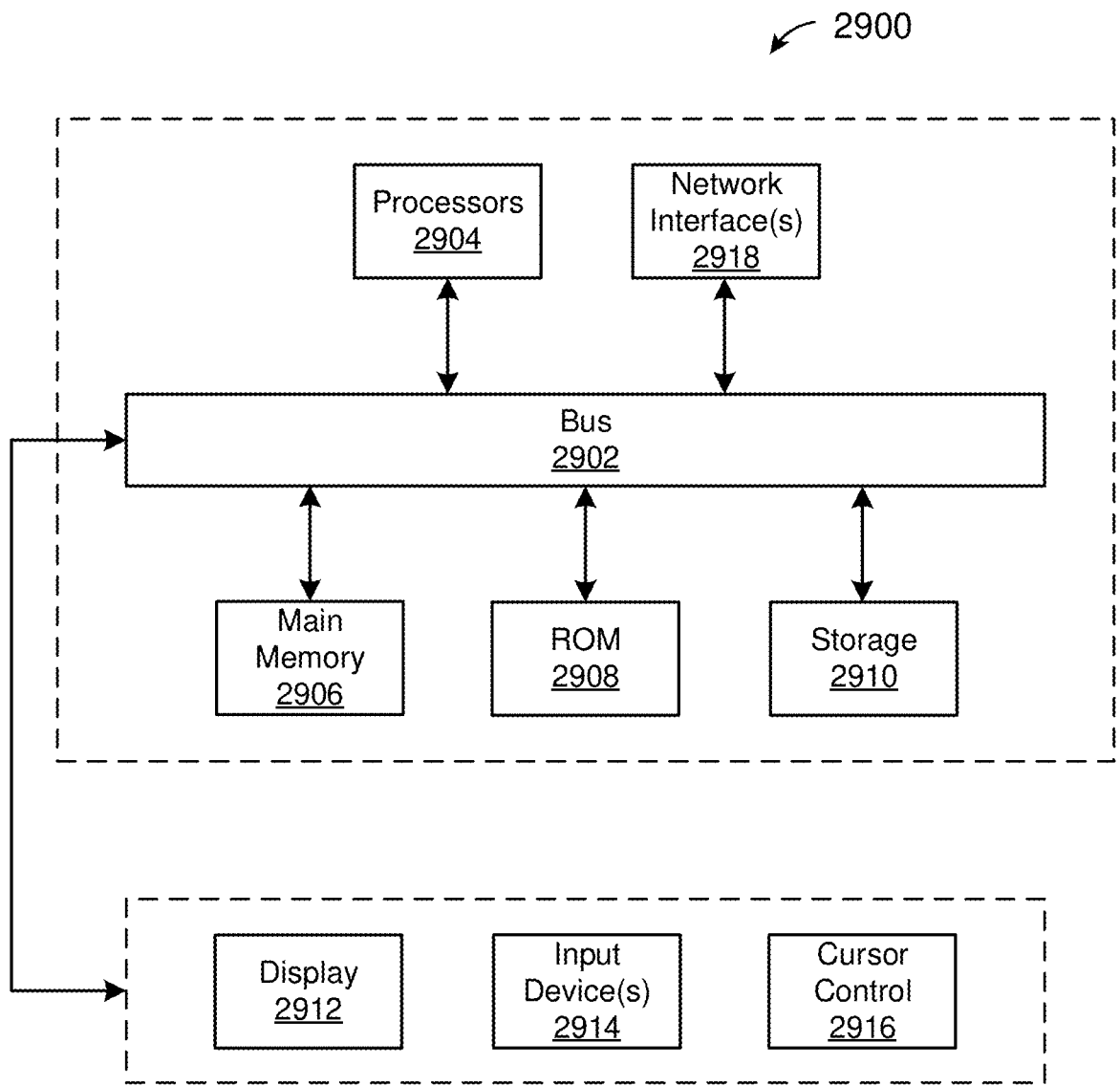
FIG. 29 is a diagram of an example computer system for implementing the features disclosed herein.

FIG. 29 is a block diagram that illustrates a computer system 2900 upon which any of the embodiments described herein may be implemented. The computer system 2900 includes a bus 2902 or other communication mechanism for communicating information, one or more hardware processors 2904 coupled with bus 2902 for processing information. A description that a device performs a task is intended to mean that one or more of the hardware processor(s) 2904 performs.

The computer system 2900 also includes a main memory 2906, such as a random access memory (RAM), cache and/or other dynamic storage devices, coupled to bus 2902 for storing information and instructions to be executed by processor 2904. Main memory 2906 also may be used for storing temporary variables or other intermediate information during execution of instructions to be executed by processor 2904. Such instructions, when stored in storage media accessible to processor 2904, render computer system 2900 into a special-purpose machine that is customized to perform the operations specified in the instructions.

The computer system 2900 further includes a read only memory (ROM) 2908 or other static storage device coupled to bus 2902 for storing static information and instructions for processor 2904. A storage device 2910, such as a magnetic disk, optical disk, or USB thumb drive (Flash drive), etc., is provided and coupled to bus 2902 for storing information and instructions.

The computer system 2900 may be coupled via bus 2902 to output device(s) 2912, such as a cathode ray tube (CRT) or LCD display (or touch screen), for displaying information to a computer user. Input device(s) 2914, including alphanumeric and other keys, are coupled to bus 2902 for communicating information and command selections to processor 2904. Another type of user input device is cursor control 2916. The computer system 2900 also includes a communication interface 2918 coupled to bus 2902.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as the another component, and/or comprising same or similar features, characteristics, and parameters as the another component.

The invention claimed is:

1. A headlamp assembly comprising a housing that encloses:
   a sensor that acquires data associated with a surrounding environment;
   a first light source and a second light source that illuminates a portion of the surrounding environment; and
   one or more processors that:
      analyze the acquired data to determine a density of entities, the entities comprising one or more vehicles, obstacles, or pedestrians in the surrounding environment;
      determine a degree to which to synchronize an intensity of the first light source with an intensity of the second light source based on the density of entities, wherein the synchronization of the respective intensities of the first light source and the second light source comprises:
         determining a first intensity of the first light source;
         determining a second intensity of the second light source;
         determining an adjusted first intensity of the first light source based on a difference between the first intensity and the second intensity;
         determining a difference between the first intensity and the adjusted first intensity;
         based on the density of entities, determining a weight indicative of a factor to adjust the first intensity, wherein the weight is less than one; and
         applying the weight to the difference to adjust the first intensity; and
      synchronize the respective intensities based on the applied weight to the difference.

2. The headlamp assembly of claim 1, wherein the determining of the weight comprises determining the weight to be correlated with the density of entities, wherein the weight is determined to decrease if the density of entities decreases and to increase if the density of entities increases.

3. The headlamp assembly of claim 1, wherein the determining of the weight is based on a relative difference between a first density of entities within a first region illuminated by the first light source and a second density of entities within a second region illuminated by the second light source.

4. The headlamp assembly of claim 1, wherein the entities comprise one or more traffic signs.

5. The headlamp assembly of claim 4, wherein the one or more processors:
   determine a first initial direction of illumination of the first light source;
   determine a second initial direction of illumination of the second light source;
   adjust the first initial direction of illumination by a first amount based on the density of entities and one or more types of the entities;
   adjust the second initial direction of illumination by a second amount based on the density of entities and one or more types of the entities; and
   synchronize the adjusted first initial direction and the adjusted second initial direction.

6. The headlamp assembly of claim 5, wherein the synchronizing of the adjusted first initial direction and the adjusted second initial direction is based on an average of the first amount and the second amount.

7. The headlamp assembly of claim 5, wherein the adjusting of the first initial direction of illumination by the first amount is based on respective directions of movement of the entities.

8. The headlamp assembly of claim 1, wherein the determining of the weight is based on a density of entities travelling in an opposite direction compared to a direction of travel of the vehicle.

9. The headlamp assembly of claim 1, wherein the one or more processors:
   cause a first field of view of the first light source or a second field of view of the second light source to be narrower in response to determining that the vehicle is carrying out a parking function.

10. The headlamp assembly of claim 1, wherein the headlamp assembly comprises a cleaner and a sensor, and the one or more processors comprise:
    an artificial intelligence (AI) processor that:
       obtains an image from a sensor;
       analyzes the image to determine a concentration of particulates;
       predicts parameters of a cleaning operation to be implemented by the cleaner based on the concentration of particulars, wherein the parameters comprise a duration, a cycle, and a spray velocity of the cleaning operation, wherein the AI processor is trained based on previous training examples of concentrations of particulates and parameters.

11. A method implemented by a headlamp processor, the method comprising:
by a sensor, acquiring data associated with a surrounding environment;
by a first light source and a second light source, illuminating a portion of the surrounding environment;
by one or more processors:
analyzing the acquired data to determine a density of entities, the entities comprising one or more vehicles, obstacles, or pedestrians in the surrounding environment;
determining a degree to which to synchronize an intensity of the first light source with an intensity of the second light source based on the density of entities, wherein the synchronization of the respective intensities of the first light source and the second light source comprises:
determining a first intensity of the first light source;
determining a second intensity of the second light source;
determining an adjusted first intensity of the first light source based on a difference between the first intensity and the second intensity;
determining a difference between the first intensity and the adjusted first intensity;
based on the density of entities, determining a weight indicative of a factor to adjust the first intensity, wherein the weight is less than one; and
applying the weight to the difference to adjust the first intensity; and
synchronizing the respective intensities based on the applied weight to the difference.

12. The method of claim 11, wherein the determining of the weight comprises determining the weight to be correlated with the density of entities, wherein the weight is determined to decrease if the density of entities decreases and to increase if the density of entities increases.

13. The method of claim 11, wherein the determining of the weight is based on a relative difference between a first density of entities within a first region illuminated by the first light source and a second density of entities within a second region illuminated by the second light source.

14. The method of claim 12, wherein the entities comprise one or more traffic signs.

15. The method of claim 14, further comprising, by the one or more processors:
determining a first initial direction of illumination of the first light source;
determining a second initial direction of illumination of the second light source;
adjusting the first initial direction of illumination by a first amount based on the density of entities and one or more types of the entities;
adjusting the second initial direction of illumination by a second amount based on the density of entities and one or more types of the entities; and
synchronizing the adjusted first initial direction and the adjusted second initial direction.

16. The method of claim 15, wherein the synchronizing of the adjusted first initial direction and the adjusted second initial direction is based on an average of the first amount and the second amount.

17. The method of claim 15, wherein the adjusting of the first initial direction of illumination by the first amount is based on respective directions of movement of the entities.

18. The method of claim 11, wherein the determining of the weight is based on a density of entities travelling in an opposite direction compared to a direction of travel of the vehicle.

19. The method of claim 11, further comprising, by the one or more processors:
causing a first field of view of the first light source or a second field of view of the second light source to be narrower in response to determining that the vehicle is carrying out a parking function.

20. The method of claim 11, further comprising, by an AI processor of the one or more processors:
obtaining an image from a sensor of the headlamp assembly;
analyzing the image to determine a concentration of particulates;
predicting parameters of a cleaning operation to be implemented by a cleaner of the headlamp assembly based on the concentration of particulars, wherein the parameters comprise a duration, a cycle, and a spray velocity of the cleaning operation, wherein the AI processor is trained based on previous training examples of concentrations of particulates and parameters.

* * * * *